(12) United States Patent
Lee

(10) Patent No.: US 10,728,754 B2
(45) Date of Patent: Jul. 28, 2020

(54) PORTABLE DEVICE ACESSORY

(71) Applicant: ConfiVox Inc., Toronto (CA)

(72) Inventor: John David Lee, Toronto (CA)

(73) Assignee: CONFIVOX INC., Toronto (CA)

( * ) Notice: Subject to any disclaimer, the term of this patent is extended or adjusted under 35 U.S.C. 154(b) by 0 days.

(21) Appl. No.: 16/393,262

(22) Filed: Apr. 24, 2019

(65) Prior Publication Data
US 2019/0253886 A1 Aug. 15, 2019

Related U.S. Application Data

(63) Continuation of application No. 15/953,401, filed on Apr. 13, 2018, which is a continuation-in-part of application No. 15/893,690, filed on Feb. 11, 2018, now abandoned, which is a continuation of application No. 15/285,812, filed on Oct. 5, 2016, now abandoned.

(Continued)

(51) Int. Cl.
H04W 12/02 (2009.01)
H04M 1/02 (2006.01)
H04M 1/18 (2006.01)
H04M 1/04 (2006.01)

(52) U.S. Cl.
CPC .......... *H04W 12/02* (2013.01); *H04M 1/026* (2013.01); *H04M 1/185* (2013.01); *H04M 1/04* (2013.01)

(58) Field of Classification Search
CPC ........ H04M 1/026; H04M 1/04; H04M 1/185; H04W 12/02
See application file for complete search history.

(56) References Cited

U.S. PATENT DOCUMENTS 4,537,276 A 8/1985 Confer
5,778,062 A 7/1998 Vanmoor
(Continued)

FOREIGN PATENT DOCUMENTS

EP 1536269 A1 6/2005
GB 2439765 A 1/2008

OTHER PUBLICATIONS

Pham, Timothy X, , Non-Final Office Action, Issued in US. Appl. No. 15/893,690, dated Apr. 18, 2018, 15 pages.
(Continued)

*Primary Examiner* — Timothy X Pham
(74) *Attorney, Agent, or Firm* — Bereskin & Parr LLP/S.E.N.C.R.L., s.r.l.

(57) ABSTRACT

A portable device accessory includes an attachment mechanism, a hinge member, and a privacy shield. The attachment mechanism is for attaching the accessory to a rear face of the portable device. The rear face is opposite a front face of the portable device. The front face includes the screen of the portable device. The hinge member is pivotably attached to the attachment mechanism. The privacy shield is pivotably attached to the hinge member and movable between a storage position and a blocking position. When the privacy shield is in the blocking position, the privacy shield extends over the front face of the portable device and blocks at least a portion of the screen. When the privacy shield is in the storage position, the privacy shield extends over the rear face of the portable device and is positioned proximate to the attachment mechanism.

23 Claims, 35 Drawing Sheets

Related U.S. Application Data

(60) Provisional application No. 62/304,550, filed on Mar. 7, 2016, provisional application No. 62/240,840, filed on Oct. 13, 2015.

(56) References Cited

U.S. PATENT DOCUMENTS

| | | | |
|---|---|---|---|
| 5,818,924 A | | 10/1998 | King et al. |
| 5,848,152 A | * | 12/1998 | Slipy .................. H04M 1/0216 |
| | | | 379/433.13 |
| 5,881,150 A | * | 3/1999 | Persson ............... H04M 1/0216 |
| | | | 379/433.13 |
| 6,075,977 A | * | 6/2000 | Bayrami .................. A61N 1/16 |
| | | | 343/841 |
| 6,185,529 B1 | | 2/2001 | Chen et al. |
| 6,510,311 B1 | | 1/2003 | Stitt |
| 7,515,708 B1 | | 4/2009 | Doty, III et al. |
| 7,747,008 B2 | | 6/2010 | Snodgrass |
| 8,560,031 B2 | | 10/2013 | Barnett et al. |
| 8,996,382 B2 | | 3/2015 | McClung, III |
| 9,049,283 B1 | | 6/2015 | Kim |
| 9,097,382 B1 | | 8/2015 | Leech et al. |
| 9,124,792 B2 | | 9/2015 | Barangan et al. |
| D782,488 S | | 3/2017 | Kim |
| 9,590,683 B2 | | 3/2017 | Greiner |
| 9,596,332 B2 | | 3/2017 | Gander et al. |
| 9,806,756 B1 | | 10/2017 | Jacobs et al. |
| 2002/0077838 A1 | | 6/2002 | Dutta |
| 2002/0180694 A1 | * | 12/2002 | Isaacson ............... G06F 1/1626 |
| | | | 345/156 |
| 2004/0259602 A1 | | 12/2004 | Zack |
| 2005/0241972 A1 | | 11/2005 | Hassett |
| 2006/0215835 A1 | | 9/2006 | Snodgrass |
| 2007/0127659 A1 | | 6/2007 | McClory et al. |
| 2009/0202064 A1 | | 8/2009 | Snodgrass |
| 2013/0280463 A1 | | 10/2013 | On et al. |
| 2013/0300985 A1 | | 11/2013 | Bulda |
| 2014/0051480 A1 | | 2/2014 | Cruz |
| 2014/0361130 A1 | | 12/2014 | Fenton |
| 2015/0249478 A1 | | 9/2015 | Greiner |
| 2015/0381785 A1 | * | 12/2015 | Gander .................... A45F 5/00 |
| | | | 455/575.1 |
| 2016/0088752 A1 | | 3/2016 | Zaccaria |
| 2016/0227663 A1 | * | 8/2016 | Holmes ................. G06F 1/1603 |
| 2016/0323002 A1 | * | 11/2016 | Cho ..................... H04B 1/3888 |
| 2017/0105118 A1 | | 4/2017 | Lee |
| 2019/0072996 A1 | | 3/2019 | Pickens |

OTHER PUBLICATIONS

Pham, Timothy X, Non-Final Office Action, Issued in U.S. Appl. No. 15/285,812, dated Aug. 10, 2017, 15 pages.

Nighfly. "Cell Phone Stand, 2Pack Cellphone Holder for Desk Lightweight Portable Foldable Tablet Stands Desktop Dock Cradle for iPhone Android Smartphone iPad Office Supplies Pop Accessories Gray Silver," Date First Available: Mar. 18, 2019. URL https://www.amazon.ca/Cellphone-Lightweight-Portable-Smartphone-accessories/dp/B07P8CK47X/ref=sr_1_3?keywords=kokobi&qid=1583852692&sr=8-3.%20Date%20first%20available%20-%20March%2018,%202019. 3 pages.

UGREEN, "UGREEN Phone Stand Multi-Angle Cell Phone Stand Desk Stand Holder Tablet Stand Compatible for iPhone XS Max, XR, X, 8 7 6 Plus, Samsung Galaxy S10 S9 S8 S7 S6 Plus, Note 9 8, LG G7, OnePlus 5T, Xiaomi Mi A2 Lite, Mi 8 Lite (Small, Black)" Date first available: Apr. 19, 2019. URL https://www.amazon.ca/UGREEN-Multi-Angle-Compatible-Samsung-Tablets/dp/B07BK5P5ST/ref=sr_1_19?keywords=ugreen&qid=1583853159&sr=8-19.%20Date%20first%20available%20-%20April%2019,%202019. 3 pages.

Lamicall, "Lamicall S1 Cell Phone Stand for iPhone X 8 7 Plus 6s other Smartphones—Silver," Date first available: Jun. 1, 2016. URL https://www.amazon.ca/Lamicall-Phone-Stand-iPhone-Smartphones/dp/B014INJCT4/ref=sr_1_2?keywords=lamicall&qid=1583853184&sr=8-2.%20Date%20first%20available%20-%20June%201,%202016. 3 pages.

* cited by examiner

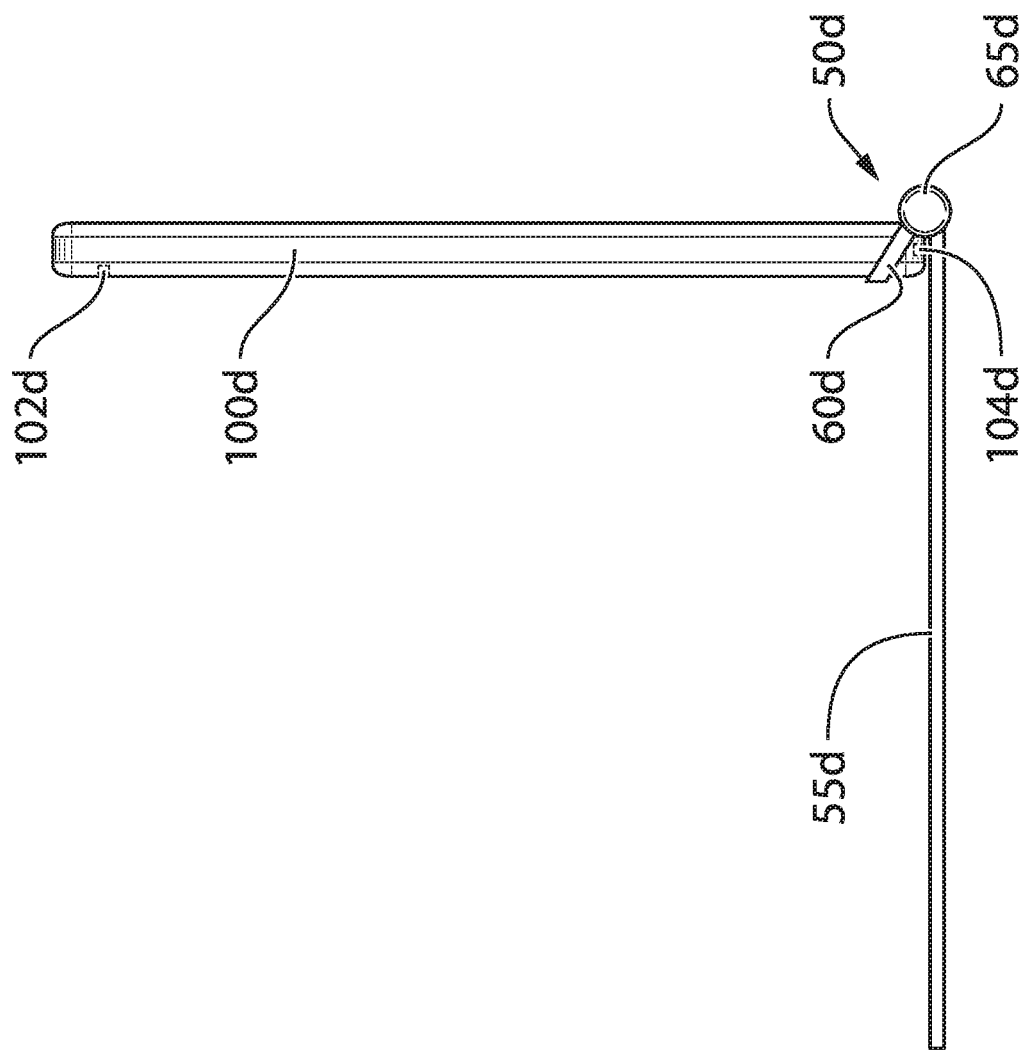
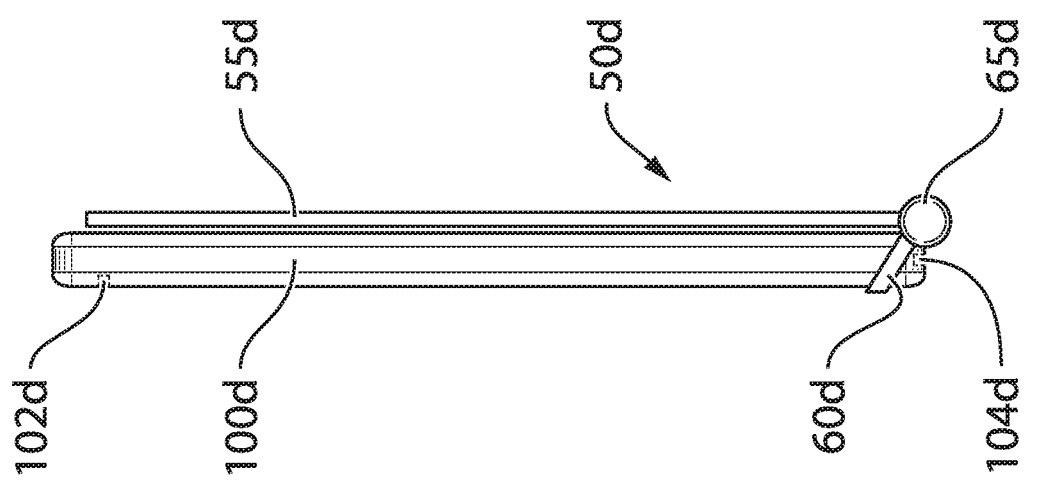
FIG. 11b
FIG. 11a

PORTABLE DEVICE ACESSORY

CROSS-REFERENCE TO RELATED APPLICATIONS

This application is a continuation of U.S. application Ser. No. 15/953,401, filed Apr. 13, 2018, which is a continuation-in-part of U.S. application Ser. No. 15/893,690, filed Feb. 11, 2018, which is a continuation of U.S. application Ser. No. 15/285,812, filed Oct. 5, 2016, which claims the benefit of U.S. Provisional Application No. 62/304,550, filed Mar. 7, 2016, and claims the benefit of U.S. Provisional Application No. 62/240,840, filed Oct. 13, 2015. The complete disclosure of each of U.S. application Ser. No. 15/953,401, U.S. application Ser. No. 15/893,690, U.S. application Ser. No. 15/285,812, U.S. Provisional Application No. 62/304,550, and U.S. Provisional Application No. 62/240,840 are incorporated herein by reference.

FIELD

The described embodiments relate to portable device accessories, and in particular to portable device accessories for blocking the screen of the portable device.

BACKGROUND

The evolution of computers is currently quite active in the portable electronic device environment. As the portable electronic devices evolve, portable electronic devices have adopted various different forms and functionality. One general trend is that portable electronic devices configured for mobile communications, such as mobile phones, are being put into ever smaller cases as microphone and other technology allows for the portable electronic devices to be physically further from a sound source without substantial degradation of sound quality.

Portable electronic devices such as mobile phones and tablet computers are ubiquitous. According to one source, there are 2.5 billion smartphone users and 1.2 billion tablet users worldwide.

Many people purchase cases for portable devices to protect the portable devices from damage, if and when they are dropped or otherwise subject to external shocks.

Some people purchase stands for portable devices to prop them up in orientations to facilitate viewing videos or otherwise operating the device.

SUMMARY

In one aspect, some embodiments provide a portable device accessory for blocking at least a portion of a screen of a portable device. The accessory includes an attachment mechanism, a hinge member, and a privacy shield. The attachment mechanism is for attaching the accessory to a rear face of the portable device. The rear face is opposite a front face of the portable device. The front face includes the screen of the portable device. The hinge member is pivotably attached to the attachment mechanism. The privacy shield is pivotably attached to the hinge member and movable between a storage position and a blocking position. When the privacy shield is in the blocking position, the privacy shield extends over the front face of the portable device and blocks at least a portion of the screen. When the privacy shield is in the storage position, the privacy shield extends over the rear face of the portable device and is proximate to the attachment mechanism.

In some embodiments, when the privacy shield is in the storage position, the privacy shield extends over the rear face of the portable device and is positioned against the attachment mechanism.

In some embodiments, the accessory further includes at least one flap. Each flap is pivotably attached to the privacy shield and movable between a storage position and a blocking position. When a flap is in the blocking position, that flap extends away from the privacy shield and blocks at least at least a portion of the screen. When a flap is in the storage position, that flap is positioned against the privacy shield.

In some embodiments, the privacy shield includes at least one recess located on the privacy shield. When a flap is in the storage position, that flap is positioned within a recess of the privacy shield.

In some embodiments, the at least one flap includes two flaps.

In some embodiments, the privacy shield has a first thickness, the at least one flap has a second thickness, and the first thickness is greater than the second thickness.

In some embodiments, the privacy shield is further movable to a stand position. When the privacy shield is in the stand position, the privacy shield extends over the rear face of the portable device and is positioned away from attachment mechanism.

In some embodiments, the privacy shield is further movable to a screen protector position. When the privacy shield is in the screen protector position, the privacy shield is positioned against the front face of the portable device.

In some embodiments, the privacy shield has a first length, the portable device has a second length, and the first length is less than the second length.

In some embodiments, the attachment mechanism is removably attachable to the rear face of the portable device.

In some embodiments, the attachment mechanism includes a case for attaching the accessory to the rear face of the portable device and encasing at least a portion of the portable device.

In some embodiments, the attachment mechanism includes at least one of a clip, a hook and pile fastening system, and a magnetic attachment system.

In some embodiments, the attachment mechanism includes a moveable element for moving the hinge member and the privacy shield relative to the attachment mechanism.

In some embodiments, the attachment mechanism includes a mounting plate and the moveable element allows the hinge member and the privacy shield to move relative to the mounting plate.

In some embodiments, the accessory further includes a cloth removably attached to the privacy shield. When the privacy shield is in the blocking position, the cloth extends away from the privacy shield and blocks at least at least a portion of the screen.

In some embodiments, the attachment mechanism has a first length, the portable device has a second length, and the first length is less than the second length.

In some embodiments, the portable device includes a camera positioned on the rear face of the portable device. The attachment mechanism includes a camera opening for permitting light to enter the camera through the camera opening.

In some embodiments, the portable device includes a camera positioned on the rear face of the portable device. The privacy shield includes a camera opening for permitting light to enter the camera through the camera opening when the privacy shield is in the storage position.

In some embodiments, the hinge member includes at least one pin-type hinge.

In some embodiments, the hinge member includes at least one stop for restricting a movement of the privacy shield relative to the attachment mechanism.

In some embodiments, the accessory further includes at least one magnet for holding the privacy shield in the blocking position.

In some embodiments, the accessory further includes at least one of a spring, a clip, and an adhesive for holding the privacy shield in the blocking position.

In some embodiments, the portable device includes a portable device case. The attachment mechanism is attachable to the rear face of the portable device case.

BRIEF DESCRIPTION OF THE DRAWINGS

Reference will now be made, by way of example only, to the accompanying drawings in which:

FIGS. 11a-b is a representation of an apparatus for a portable electronic device in accordance with another embodiment;

Figure 1:
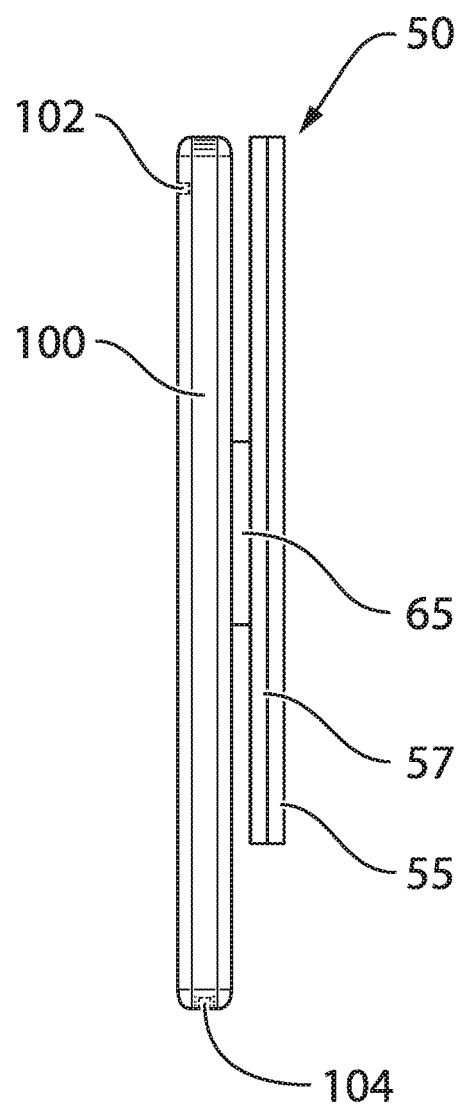
FIG. 1 is a representation of an apparatus for a portable electronic device in a storage position in accordance with an embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXEMPLARY EMBODIMENTS

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that the term "coupled" used herein indicates that two elements can be directly coupled to one another or coupled to one another through one or more intermediate elements.

As used herein, any usage of terms that suggest an absolute orientation (e.g. "top", "bottom", "front", "back", etc.) are for illustrative convenience and refer to the orientation shown in a particular figure. However, such terms are not to be construed in a limiting sense as it is contemplated that various components will, in practice, be utilized in orientations that are the same as, or different than those described or shown.

Referring to FIG. 1, a representation of an apparatus 50 for enhancing privacy during operation of a portable electronic device 100 is generally shown. It is to be understood that the apparatus 50 is purely exemplary and it will be apparent to those skilled in the art that variations are contemplated. In the present embodiment, the apparatus 50 includes a privacy shield 55, a moveable element 57, a sound guide 60, and an attachment mechanism 65.

It is to be appreciated that the portable electronic device 100 is not particularly limited and that the apparatus 50 can be configured for use on a wide variety of portable electronic devices 100. For example, the portable electronic device 100 can include, without limitation, a cellular telephone, a portable email paging device, a portable audio recorder/player, a portable video recorder/player, a personal digital assistant, a tablet computer or any other device where enhancing privacy may be desired. In the present embodiment, the portable electronic device 100 includes a speaker 102 generally configured to output audio to an ear of a user and a microphone 104 for receiving audio input from a user. In other embodiments where audio output is not required, such as for an audio recording device, a person of skill in the art with the benefit of this description will recognize that the portable electronic device 100 can be modified such that the speaker 102 is omitted.

The privacy shield 55 is generally configured to block sound from the mouth of a user. Accordingly, the privacy shield 55 is generally positioned directly in front of the mouth in close proximity. In the present embodiment, the privacy shield 55 is made of plastic, but other materials can be used. In particular, the privacy shield 55 is made from an opaque plastic material. It is to be appreciated by a person of skill in the art with the benefit of this description that by using an opaque material, the privacy shield 55 can cover the mouth of a user to limit the range of angles from which the lips can been read to further enhance privacy. It is to be understood that the privacy shield 55 is not particularly limited and that variations are contemplated. As an example of a variation, the privacy shield can be modified to include sound absorbing materials to dampen sounds from the mouth. For example, the privacy shield can be lined with the sound absorbing material.

In the present embodiment, it is to be appreciated by a person of skill in the art that the privacy shield 55 can be additionally configured to reduce external noise, such as environmental noise, from reaching the microphone 104. For example, the privacy shield 55 can include sound absorbing materials on the exterior surface or be shaped to deflect sound away from the microphone 104.

In the present embodiment, the optional moveable element 57 is generally configured to connect the privacy shield 55 to the attachment mechanism 65. The moveable element 57 provides a translational motion along a track as well as pivot point such that the privacy shield 55 can move from the storage position shown in FIG. 1 to the blocking position shown in FIG. 2. It is to be appreciated that the moveable element 57 is not particularly limited and that variations are contemplated. For example, the moveable element 57 can include a linear guide with ball bearings to provide translational motion and a hinge disposed proximate to the bottom end of the moveable element 57 to provide the pivotal motion. As an example of a variation, the moveable element 57 can alternatively include a track that provides for frictional sliding. It is to be appreciated by a person of skill in the art with the benefit of this description that additional features can be added to hold the moveable element 57 in one or both of the storage position or the blocking position, such as by using magnets, clips, or an over the top mechanism. For example, two sturdy and flexible plastic bands which can roll up/extend when one device moves can be used to hold a position.

In the present embodiment, when the moveable element 57 is in the storage position, the apparatus 50 is generally configured to allow access to substantially most of the input and output devices of the portable electronic device 100. For example in the present embodiment, the microphone 104 is not obstructed when the moveable element 57 is in the storage position such that the portable electronic device 100 can be used without moving the privacy shield 55, such as for convenience when a conversation that does call for a high level of privacy.

It is to be appreciated by a person of skill in the art with the benefit of this description that the moveable element 57 is optional and can be omitted. For example, in some embodiments, the apparatus can be a separate add-on device that can be attached in the blocking position and removed when not in use.

The sound guide 60 is disposed on the privacy shield 55 and generally configured to direct sound from the mouth of the user to the microphone 104 of the portable electronic device 100. It is to be appreciated that the sound guide is not particularly limited. For example, in the present embodiment, the sound guide 60 comprises the surface of the privacy shield 55 that is configured to reflect sound waves and angled such that sound would generally be reflected from the mouth and directed toward the microphone 104. It is to be appreciated by a person of skill in the art that in embodiments where a sound absorbing material is used in the privacy shield 55, the sound guide 60 is used to reduce the dampening effect for the microphone 104. In other embodiments, the sound guide 60 can include a plurality of ridges configured to direct sound from the mouth to the microphone 104.

The attachment mechanism 65 is generally configured to attach the privacy shield 55 to the portable electronic device 100. The manner by which the attachment mechanism 65 attaches the privacy shield 55 to the portable electronic device 100 is not particularly limited. The attachment mechanism 65 can allow for rapid attachment to or detachment from the portable electronic device 100. For example, the attachment mechanism 65 can include a hook and pile fastening system, or a magnetic attachment system. Alternatively, attachment mechanism 65 can provide a more permanent attachment of the apparatus 50 to the portable electronic device 100. For example, the attachment mechanism 65 can include a screw for securing the apparatus 50 to the portable electronic device. It is to be appreciated by a person of skill in the art with the benefit of this description that the attachment mechanism 65 can be configured to be universally operable with a large number of portable electronic devices or to be specifically designed for one type of device.

Figure 3:
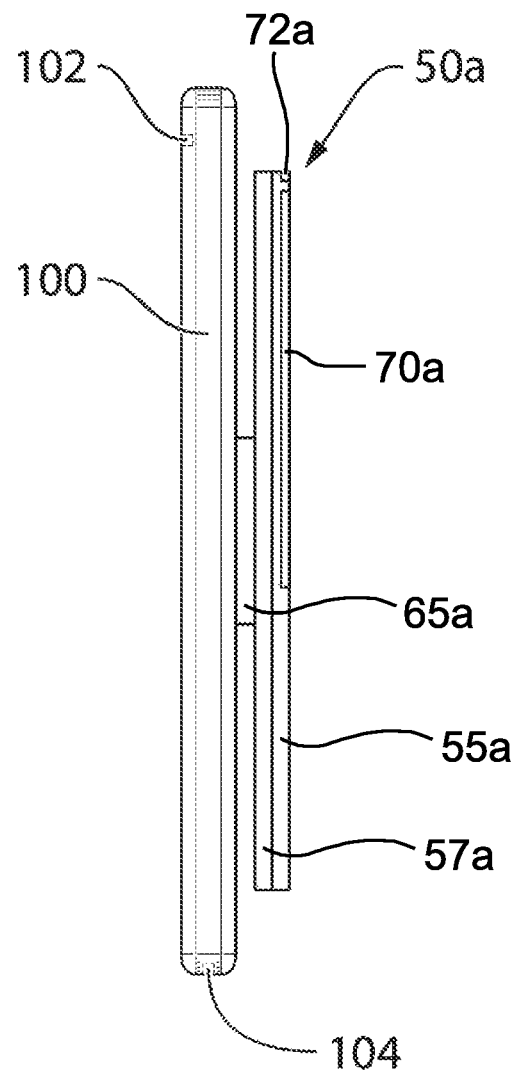
FIG. 3 is a representation of an apparatus of a portable electronic device in a storage position in accordance with another embodiment.
Figure 4:
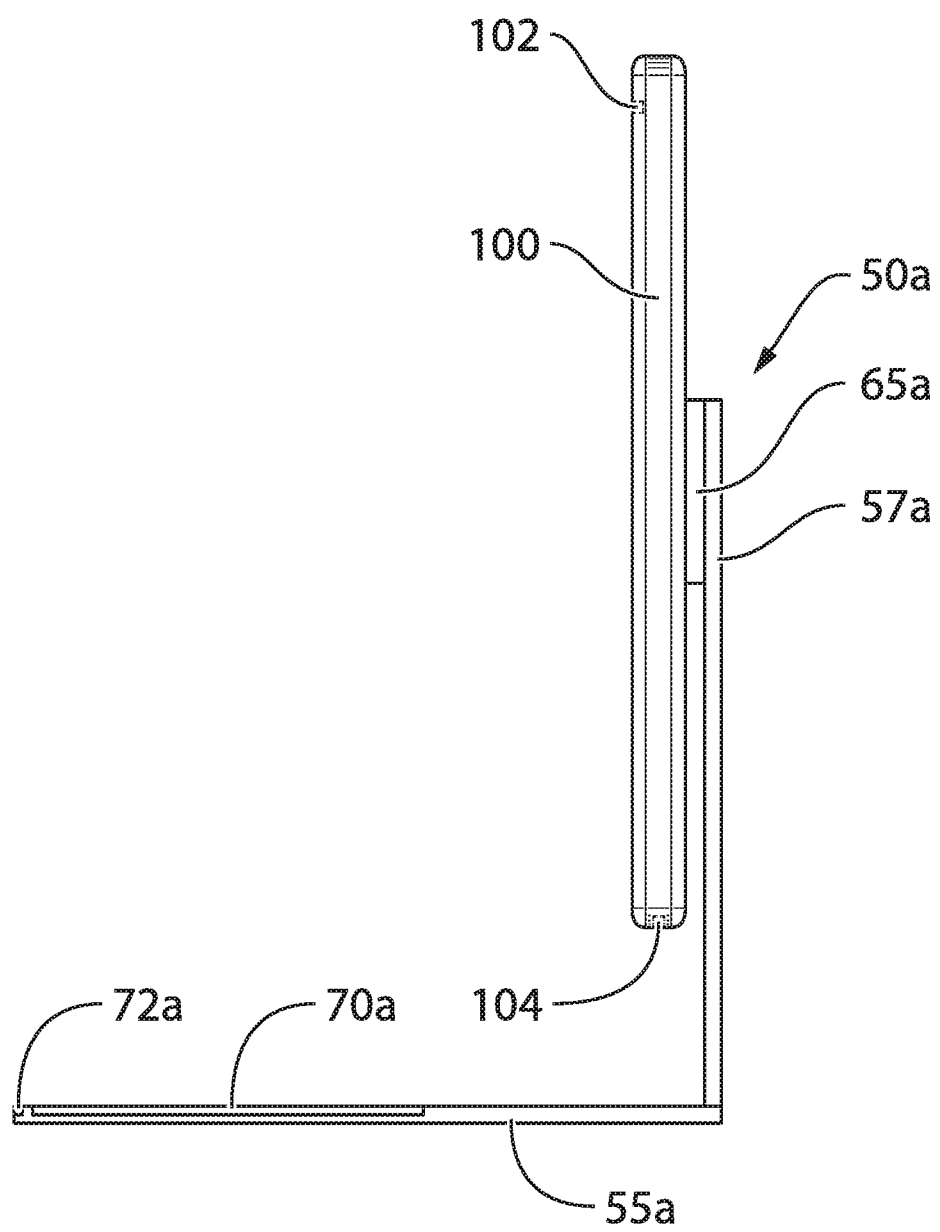
FIG. 4 is a representation of the apparatus shown in FIG. 3 in an intermediate position.
Figure 5:
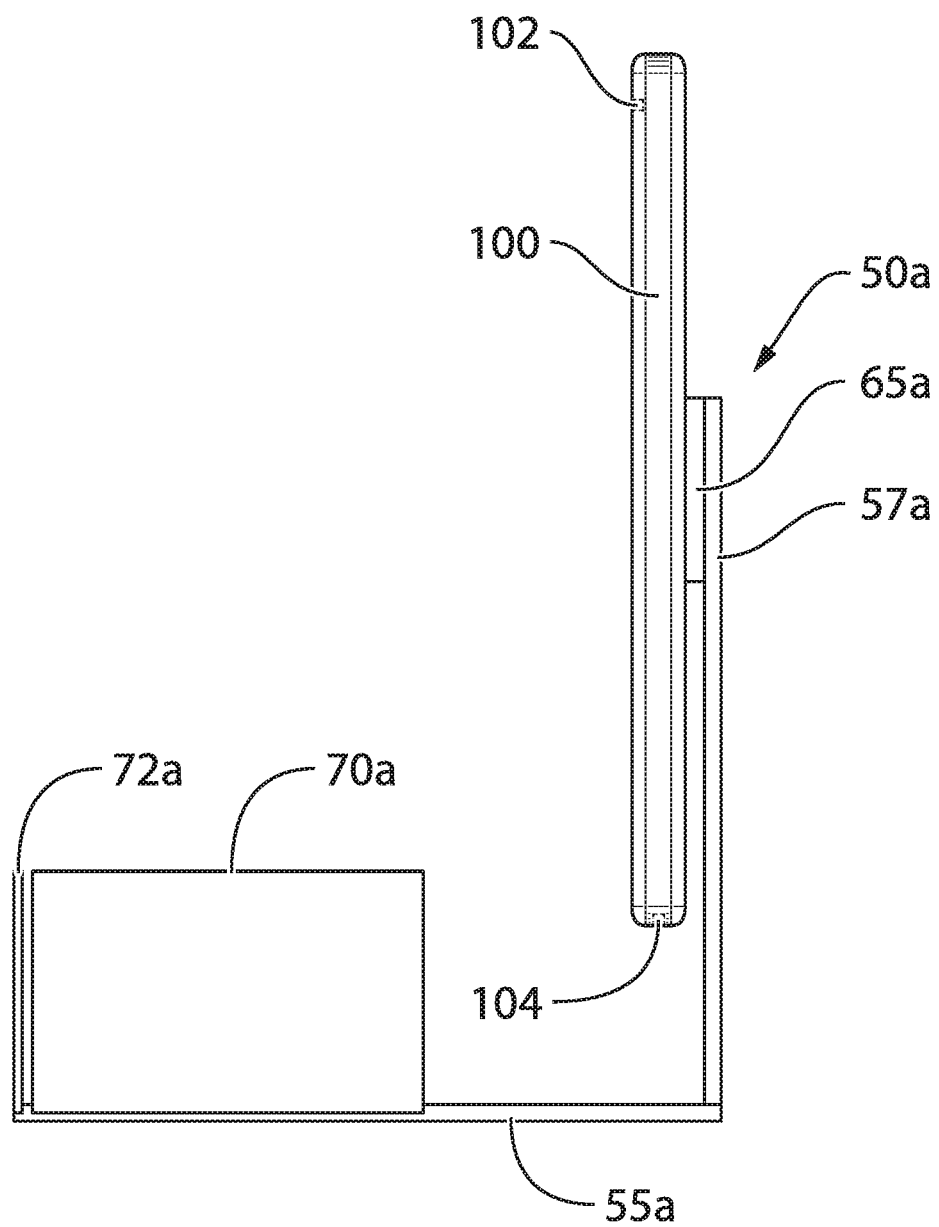
FIG. 5 is a representation of the apparatus shown in FIG. 3 in a blocking position.

Referring now to FIGS. 3 to 5, another embodiment of an apparatus 50a for enhancing privacy during operation of a portable electronic device 100 is generally shown. Like components of the apparatus 50a bear like reference to their counterparts in the apparatus 50, except followed by the suffix "a". For example, the apparatus 50a includes a privacy shield 55a, a moveable element 57a, a sound guide 60a, and an attachment mechanism 65a. In addition, the privacy shield 55a further includes a top flap 70a and an end flap 72a.

It is to be appreciated by person of skill in the art with the benefit of this description that the apparatus 50a is substantially similar to the apparatus 50 with the addition of the top flap 70a and the end flap 72a disposed on the main portion of the privacy shield 55a. The top flap 70a is not particularly limited and can be constructed from similar materials as the privacy shield and generally configured to block sound from the mouth of the user that may escape around the main portion of the privacy shield 55a. Similarly, the end flap 72a is not particularly limited and can be constructed from similar materials as the privacy shield and generally configured to block sound from the mouth of the user that may escape around the main portion of the privacy shield 55a.

In the present embodiment, the top flap 70a and the end flap 72a are both pivotally attached to the main portion of the privacy shield 55a such that the top flap 70a and the end flap 72a can be folded to allow the privacy shield 55a to be collapsed for storage. Accordingly, in the present embodiment, the moveable element 57a provides a translational motion along a track as well as pivot point such that the privacy shield 55a can move from the storage position shown in FIG. 3 to an intermediate position shown in FIG. 4. The top flap 70a and the end flap 72a can be pivoted open so that the apparatus is converted to the blocking position shown in FIG. 5.

Figure 6:
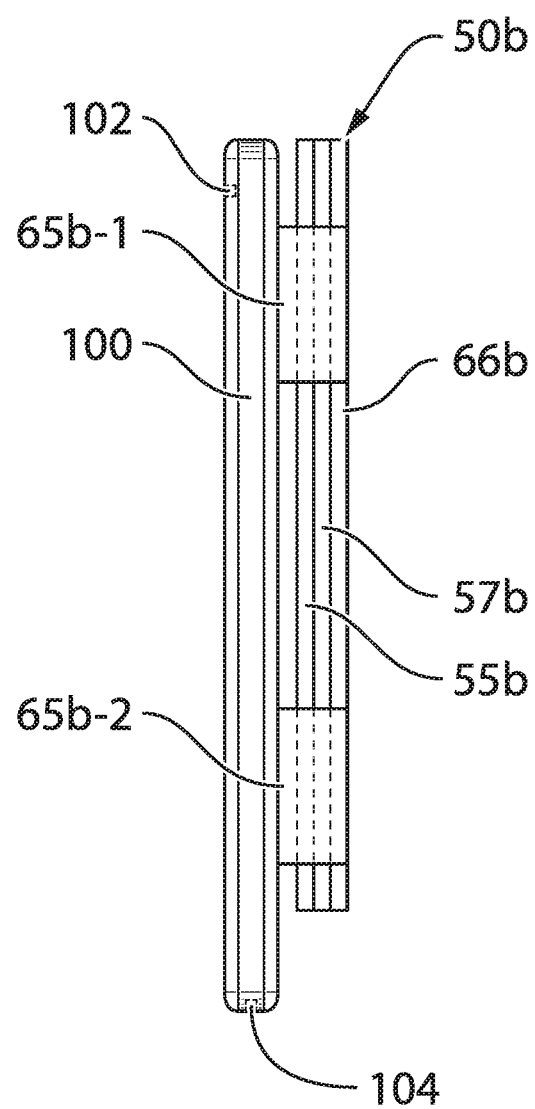
FIG. 6 is a representation of an apparatus for a portable electronic device in a storage position in accordance with another embodiment.
Figure 7:
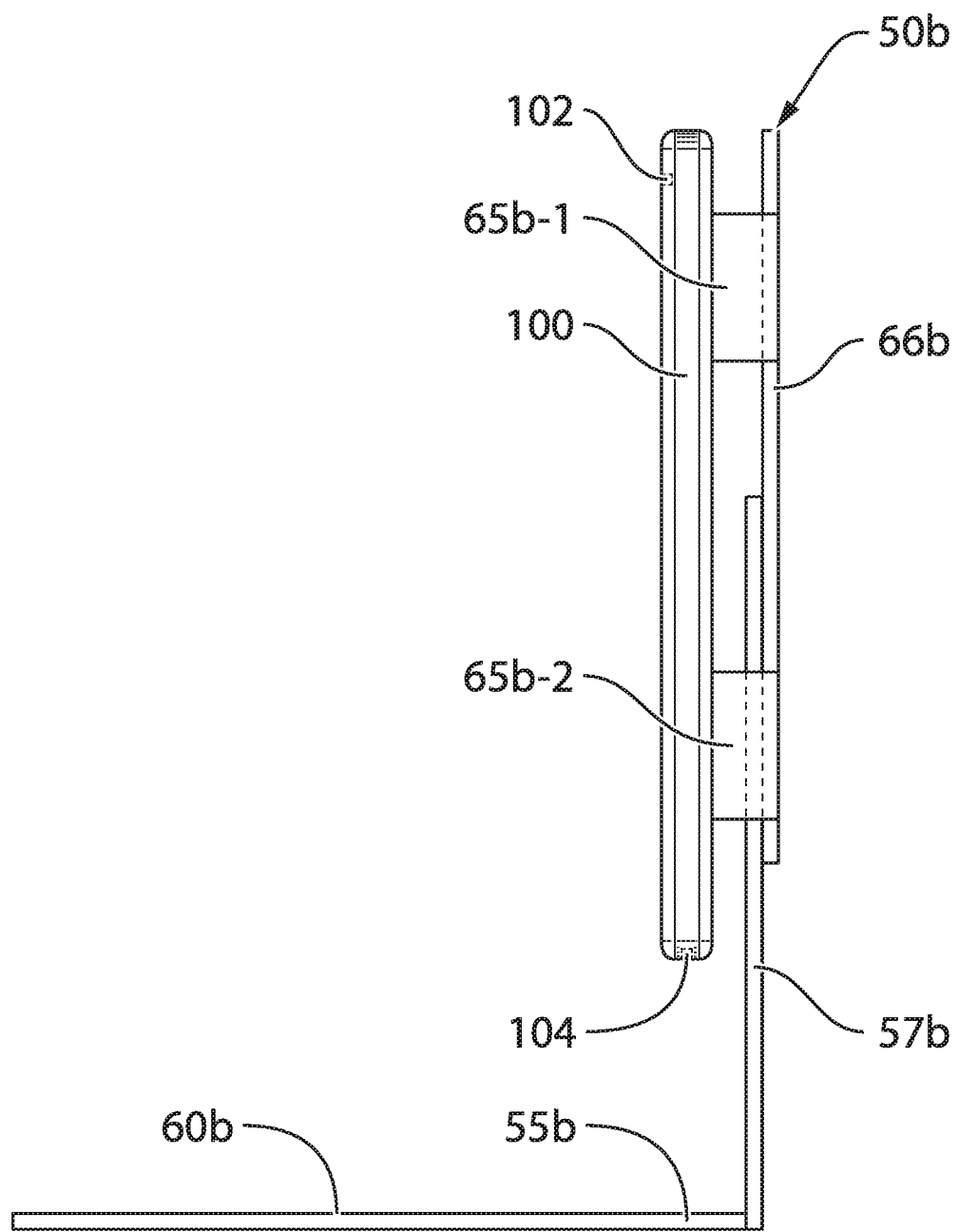
FIG. 7 is a representation of the apparatus shown in FIG. 6 in an intermediate position.

Referring now to FIGS. 6 and 7, another embodiment of an apparatus 50b for enhancing privacy during operation of a portable electronic device 100 is generally shown. Like components of the apparatus 50b bear like reference to their counterparts in the apparatus 50, except followed by the suffix "b". For example, the apparatus 50b includes a privacy shield 55b, a moveable element 57b, and a sound guide 60b. In the present embodiment, the apparatus 50b includes a pair of attachment mechanisms 65b-1 and 65b-2 for attaching a mounting plate 66b.

It is to be appreciated by person of skill in the art with the benefit of this description that the apparatus 50b is substantially similar to the apparatus 50 except that the moveable element is slidably connected to the mounting plate 66b instead of directly to the portable electronic device 100.

In the present embodiment, the top flap 70a and the end flap 72a are both pivotally attached to the main portion of the privacy shield 55a such that the top flap 70a and the end flap 72a can be folded to allow the privacy shield 55a to be collapsed for storage. Accordingly, in the present embodiment, the moveable element 57a provides a translational motion along a track as well as pivot point such that the privacy shield 55a can move from the storage position shown in FIG. 3 to an intermediate position shown in FIG. 4. The top flap 70a and the end flap 72a can be pivoted open so that the apparatus is converted to the blocking position shown in FIG. 5.

It is to be re-emphasized that the structures described are a non-limiting representation only. In particular, it is to be understood that various features of the embodiments described can be combined or modified. For example, it is to be appreciated by a person of skill in the art with the benefit of this description that either one of the top flap 70a or the end flap 72a of the apparatus 50a can be omitted. As another example of a variation, the top flap 70a and/or the end flap 72a of the apparatus 50a can be incorporated into the apparatus 50b. Further variations can include the addition of more flaps and sound guides to the apparatus.

As another example of a variation, it is to be appreciated that the apparatus 50 can be directly built into a portable electronic device as an additional feature of the device. In such a variation, it may be possible to omit the attachment mechanism 65 if the apparatus were to be formed on a unitary body of the portable electronic device 100.

As another example of a variation, it is to be appreciated that the apparatus 50 can be converted from a storage position to a blocking position or vice versa using other means, such as a motor, or a spring. Furthermore, the other means can either be manually operated or via an electronic signal from the portable electronic device.

Various advantages will now be apparent to a person of skill in the art. Of note is the ability to carry out a conversation in a public place with enhanced privacy. It is to be understood that the apparatus 50 can be designed to be sufficiently compact to fit within standard carrying cases. Accordingly, the apparatus 50 provides a compact solution that does not require substantial additional storage when carrying a portable electronic device. Therefore, it is to be appreciated that this ability would be especially beneficial when, for example, conducting a business call while on public transit, while walking down a public street, or while in an airport waiting area.

Another advantage would be that background noise can be substantially reduced during a phone call to improve call quality. Furthermore, in embodiments with a moveable element 57, it is to be appreciated with the benefit of this description that the moveable element 57 can be used to provide adjustments of the privacy shield 55 to accommodate for various users as well as portable electronic devices.

Figure 8:
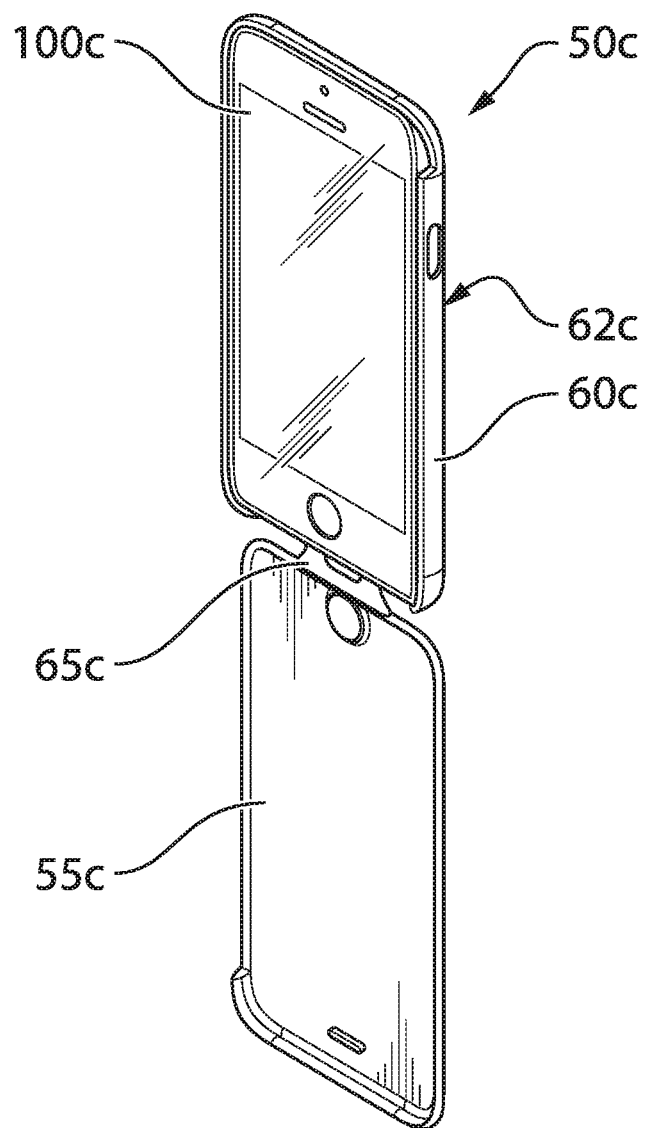
FIG. 8 is a representation of an apparatus for a portable electronic device in accordance with another embodiment.

Referring to FIG. 8, a representation of another embodiment of an apparatus 50c for enhancing privacy during operation of a portable electronic device is generally shown. It is to be understood that the apparatus 50*c* is purely exemplary and it will be apparent to those skilled in the art that variations are contemplated. In the present embodiment, the apparatus 50*c* includes a privacy shield 55*c*, an attachment mechanism 60*c*, and a hinge 65*c*.

The privacy shield 55*c* is generally configured to block sound from the mouth of a user of the portable electronic device. Accordingly, the privacy shield 55*c* is generally positioned directly in front of the mouth of the user and in close proximity. In the present embodiment, the privacy shield 55*c* is moveable between a position for storage and a position for covering the mouth of the user. In the present embodiment, the privacy shield 55*c* is made from a tinted poly carbonate plastic. However, it is to be appreciated by a person of skill in the art that the material of the privacy shield 55*c* is not particularly limited. For example, the privacy shield 55*c* can be modified to be made from rubber, metal, or other composite material capable of blocking and/or dampening sound. In other embodiments, the privacy shield 55*c* can be opaque or clear.

The attachment mechanism 60*c* is generally configured to attach the privacy shield 55*c* to a portable electronic device 100*c*. The manner by which the attachment mechanism 60*c* attaches to the portable electronic device is not particularly limited. In the present embodiment, the attachment mechanism 60*c* is made from a flexibly resilient material that is configured to wrap around the edge of the portable electronic device. For example, the attachment mechanism 60*c* can be made from the same plastic material as the privacy shield 55*c*. In other embodiments, the attachment mechanism 60*c* can be made from different materials such as rubber, silicone, or metal. Furthermore, the attachment mechanism 60*c* can be connected to an optional casing 62*c* for protecting the portable electronic device.

In the present embodiment, the attachment mechanism 60*c* is designed for a specific portable electronic device 100*c* and includes openings to allow for access to various controls of the portable electronic device 100*c*. It is to be appreciated that the attachment mechanism 60*c* is not particularly limited and can be modified for other portable electronic devices. For example, several modified attachment mechanisms can be designed such that each design is dimensioned accordingly and configured to attach to a specific portable electronic device. In other embodiments, the attachment mechanism 60*c* can be configured to be universally adaptable to multiple portable electronic devices. For example, the attachment mechanism 60*c* can include various adjustments that allow it to wrap around portable electronic devices within a specified range of length, width, and/or thickness. Accordingly, but allowing the attachment mechanism 60*c* to be adjustable, most common models of portable electronic devices, such as smartphones, can be fitted with the apparatus 50*c*.

The hinge 65*c* connects the privacy shield 55*c* and the attachment mechanism 60*c*. Furthermore, the hinge 65*c* is generally configured to provide pivotal movement of the privacy shield 55*c* relative to the portable electronic device between at least two positions. In the present embodiment, the hinge 65*c* is a flexible material connecting the privacy shield 55*c* and the attachment mechanism 60*c* and provides a substantially pivotal motion by deforming. The material of the hinge 65*c* is not particularly limited and can include any material with the proper mechanical properties to allow for a rotational motion between the privacy shield 55*c* and the attachment mechanism 60*c*. For example, the hinge 65*c* can be made from a plastic, rubber, or silicone. In other embodiments, the hinge 65*c* can include a pin-type hinge.

Figure 9:
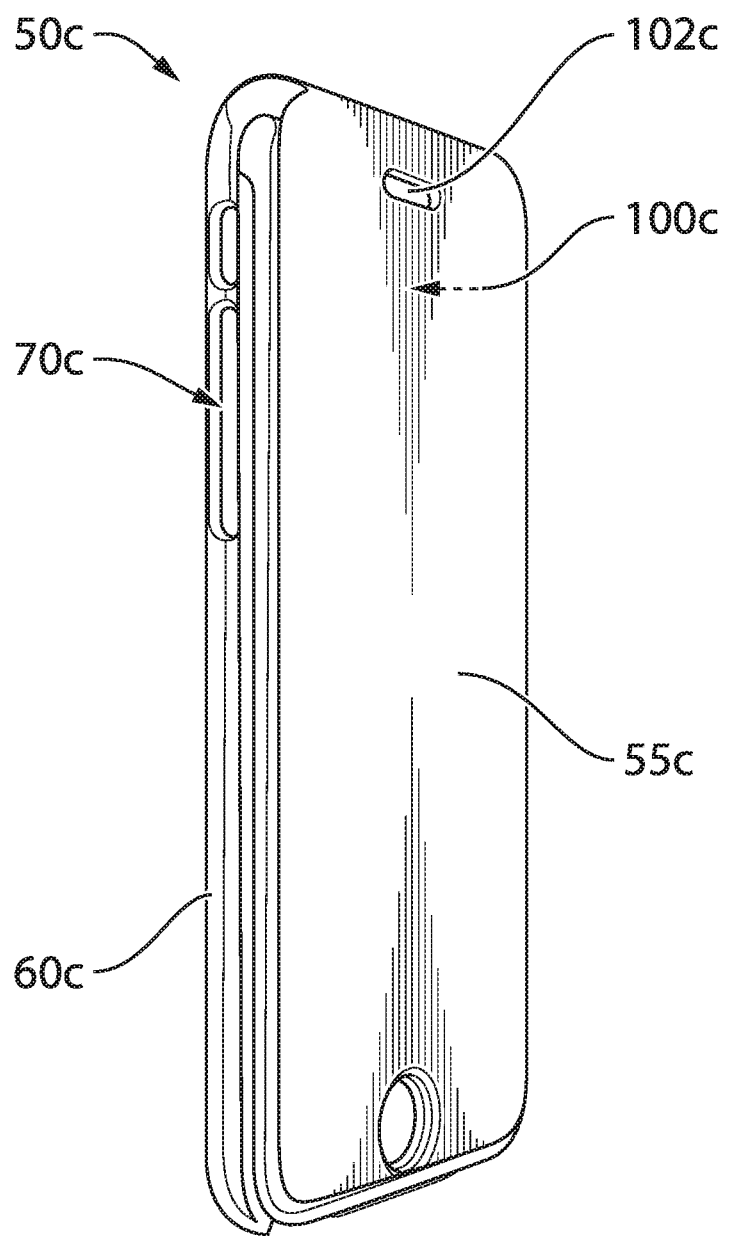
FIG. 9 is a representation of an apparatus shown in FIG. 8 in use with a portable electronic device in a first configuration.

Referring to FIG. 9, the apparatus 50*c* is generally shown in use with a portable electronic device 100*c* where the privacy shield 55*c* is in a position for storage. It is to be appreciated that the portable electronic device 100*c* is not particularly limited and that the apparatus 50*c* can be configured for use on a wide variety of portable electronic devices 100*c* as discussed above. For example, the portable electronic device 100*c* can include, without limitation, a cellular telephone, a portable email paging device, a portable audio recorder/player, a portable video recorder/player, a personal digital assistant, a tablet computer or any other device where enhancing privacy may be desired. In the present embodiment, the portable electronic device 100*c* includes a speaker 102*c* generally configured to output audio to an ear of a user and a microphone 104*c* for receiving audio input from a user. In other embodiments where audio output is not required, such as for an audio recording device, a person of skill in the art with the benefit of this description will recognize that the portable electronic device 100*c* can be modified such that the speaker 102*c* is omitted.

In the present embodiment, the privacy shield 55*c* is stored against a touchscreen of the portable electronic device 100*c* as shown in FIG. 9. Accordingly, the privacy shield 55*c* also serves as a screen protector for the touchscreen of the portable electronic device 100*c*. For example, when in this storage position, the privacy shield 55*c* can protect the portable electronic device 100*c* from scratches as well as dampen any shock to the portable electronic device 100*c*, such as from a fall. It is to be appreciated by a person of skill in the art with the benefit of this description that when the apparatus 50*c* includes the optional casing 62*c*, the apparatus 50*c* can form a shell encasing the portable electronic device 100*c* when the privacy shield 55*c* is in the storage position shown in FIG. 2 to provide protection on substantially all sides of the portable electronic device 100*c*. In the present embodiment, the apparatus 50*c* can also include an opening 70*c* for allowing access to portions of the portable electronic device 100*c*. For example, the opening 70*c* can allow for access to various control buttons, such as a volume control, of the portable electronic device 100*c*. Other openings can also allow sound to be emitted from a speaker 102*c* or for sound to be received by a microphone 104*c*. In addition, the privacy shield 55*c* can be made from a material that allows for the operation of the touchscreen through the privacy shield 55*c*. For example, the tinted polycarbonate plastic can be tinted such that light from the touchscreen is still easily viewable by a user through the privacy shield 55*c* while the polycarbonate plastic allows for touch inputs to be detectable by the touchscreen underneath.

In the present embodiment, the privacy shield 55*c* is generally configured to couple with the attachment mechanism 60*c* to encase the portable electronic device 100*c* as shown in FIG. 9. The manner by which the privacy shield 55*c* couples to the attachment mechanism is not particularly limited. For example, the privacy shield 55*c* can snap into place using a resiliently deformable lip (not shown) disposed on at least either one of the privacy shield 55*c* or the attachment mechanism 60*c*. In other embodiments, the hinge 65*c* can be configured to bias the privacy shield 55*c* to seal against the attachment mechanism 60*c*. In further embodiments, the privacy shield 55*c* can be magnetically coupled to the attachment mechanism 60*c*.

Figure 10A:
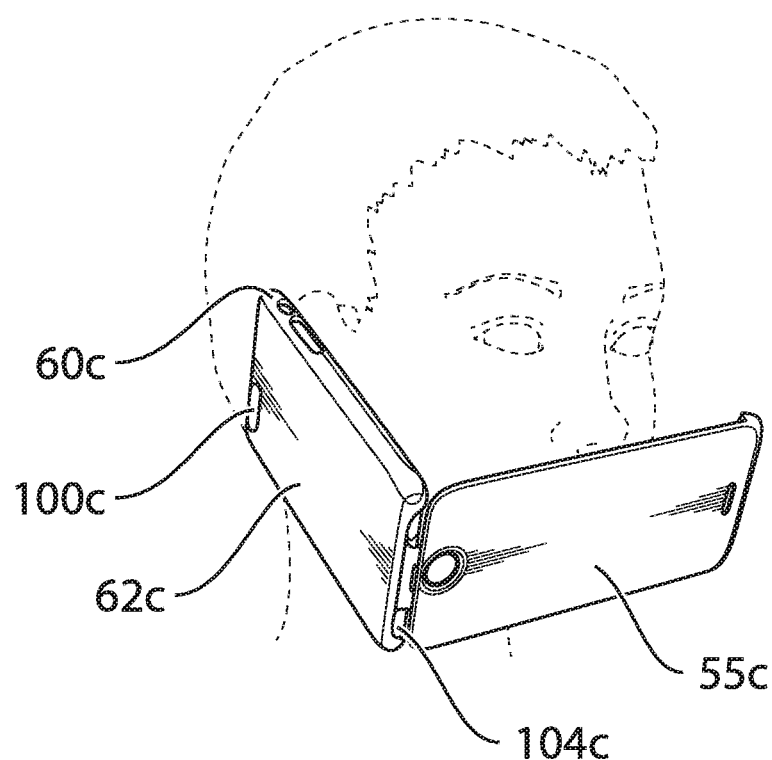
FIGS. 10a-b is a representation of an apparatus shown in FIG. 8 in use with a portable electronic device in other configurations.

Referring to FIG. 10*a*, the apparatus 50*c* is generally shown in use with a portable electronic device 100*c* where the privacy shield 55*c* is in a position for covering the mouth of a user of the portable electronic device 100c. In the present embodiment, it is to be appreciated by a person of skill in the art with the benefit of this description that the tint of the privacy shield 55c allowing for operation of the touchscreen can be sufficiently dark obscure the mouth of the user from view. Accordingly, in addition to providing a physical barrier to dampen sound escaping to the ambient environment, the tinting can provide additional protection against third parties being able to read the lips of the user by covering the lips of the user and obstructing the view of the lips. The manner by which the privacy shield 55c remains in the position shown in FIG. 10a is not particularly limited. For example, the privacy shield 55c can be biased toward the position shown in FIG. 9 and that the privacy shield 55c rests on the face of the user.

Figure 10B:
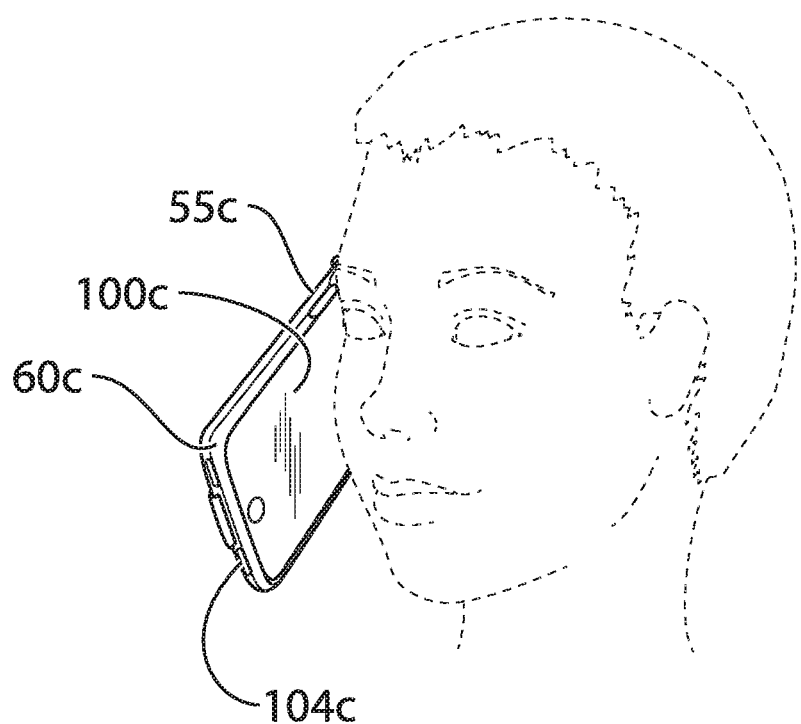

Referring to FIG. 10b, the apparatus 50c is generally shown in use with a portable electronic device 100c where the privacy shield 55c is in an optional position for storing the privacy shield 55c against the back of the portable electronic device 100c. It is to be appreciated by a person of skill in the art with the benefit of this description that this additional position allows for the user to directly interact with the portable electronic device 100c, such as for operating the touchscreen. The manner by which the privacy shield 55c remains in the position shown in FIG. 10b is not particularly limited. For example, the hinge 65c can be configured to bias the privacy shield 55c toward this position. In further embodiments, the privacy shield 55c can be magnetically coupled, such as to either the portable electronic device 100c, the attachment mechanism 60c, or the casing 62c.

It is to be re-emphasized that the apparatus 50c described above is a schematic, non-limiting representation only and that variations are contemplated. Furthermore, the method of manufacturing the apparatus 50c is not particularly limited. Some examples of manufacturing include using a molding technique and 3D printing. Furthermore, the design of the apparatus 50c can be varied as well. For example, the apparatus 50c can be of a universal design or a device specific design. It is to be appreciated by a person of skill in the art with the benefit of this description that although a universal design can be more versatile, the additional components that allow for adjustability can make the manufacturing process more complicated. In contrast, the manufacturing process for a single rigid design compatible with a specific device may be simply, but the device specific design can become obsolete quickly if the portable electronic device manufacturer changes the dimensions of subsequent new devices.

Referring now to FIGS. 11a and 11b, another embodiment of an apparatus 50d for enhancing privacy during operation of a portable electronic device 100d is generally shown. Like components of the apparatus 50d bear like reference to their counterparts in the apparatus 50c, except followed by the suffix "d". For example, the apparatus 50d includes a privacy shield 55d, a clip 60d, and a hinge 65d.

It is to be appreciated by person of skill in the art with the benefit of this description that the apparatus 50d is substantially similar to the apparatus 50c. In the present embodiment, the privacy shield 55d can be dimensioned differently from the privacy shield 55c; however, the general functionality of the privacy shield 55d remains the same.

In the present embodiment, the attachment mechanism is a clip 60d configured to attach to a portion of the portable electronic device 100d. The manner by which the clip 60d attaches to the portable electronic device 100d is not particularly limited and the clip 60d can be designed for specific device models or can be a universal clip capable of attaching to most portable electronic devices. As shown in FIG. 11a, the clip 60d attaches to the bottom portion of the portable electronic device 100d from the side. It is to be appreciated by a person of skill in the art with the benefit of this description that the clip 60d can be modified to attach from the bottom instead of the side. In the present embodiment, the clip 60d is generally configured for quick attachment and removal.

The hinge 65d is generally configured to allow the privacy shield 55d to move from a storage position against the back of the portable electronic device 100d as shown in FIG. 5 to a position for covering the mouth of the user as shown in FIG. 11b. Since the privacy shield 55d is positioned in front of the mouth of a user, it is possible that the surface of the privacy shield 55d can accumulate saliva droplets as well as other potential debris from the user's mouth. Accordingly, by folding the privacy shield 55d against the back of the portable electronic device 100d, the unclean surface of the privacy shield 55d would not be placed against the touchscreen of the portable electronic device 100d.

Figure 12B:
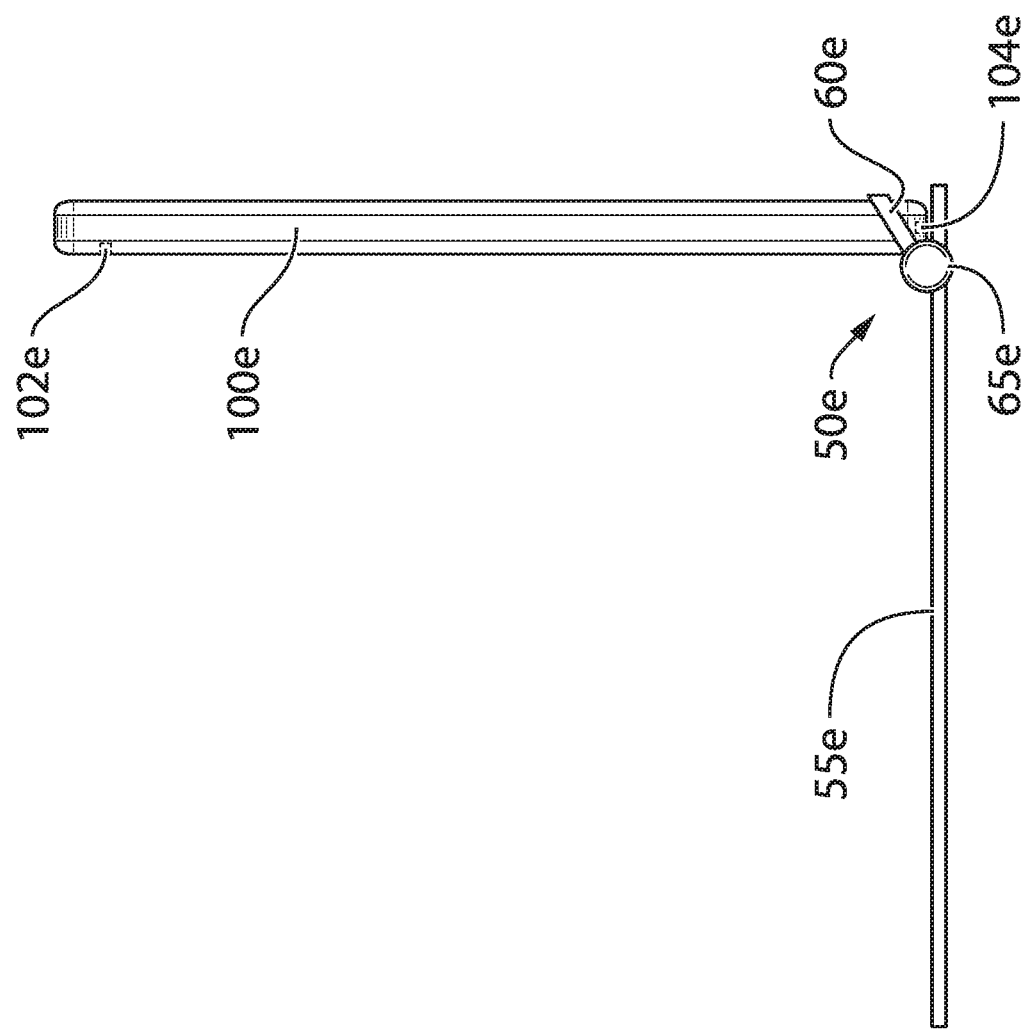
FIGS. 12a-b is a representation of an apparatus for a portable electronic device in accordance with another embodiment.
Figure 12A:
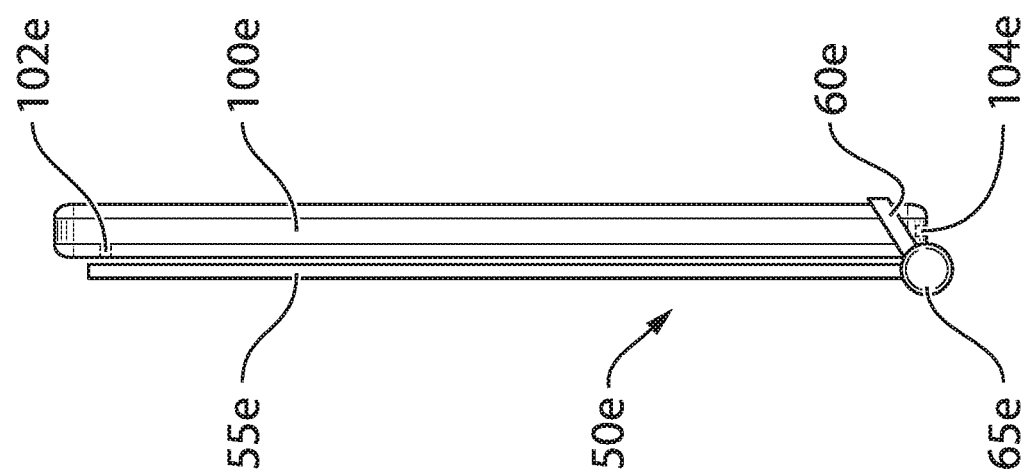

Referring now to FIGS. 12a and 12b, another embodiment of an apparatus 50e for enhancing privacy during operation of a portable electronic device 100e is generally shown. Like components of the apparatus 50e bear like reference to their counterparts in the apparatus 50c, except followed by the suffix "e". For example, the apparatus 50e includes a privacy shield 55e, a clip 60e, and a hinge 65e.

It is to be appreciated by a person of skill in the art with the benefit of this description that the apparatus 50e is substantially similar to both the apparatus 50c and the apparatus 50d. In particular, the apparatus 50e includes a clip 60e for easy removal and attachment to a portable electronic device 100e. In addition, the privacy shield 55e is stored on the front of the portable electronic device similar to the apparatus 50c.

Figure 13:
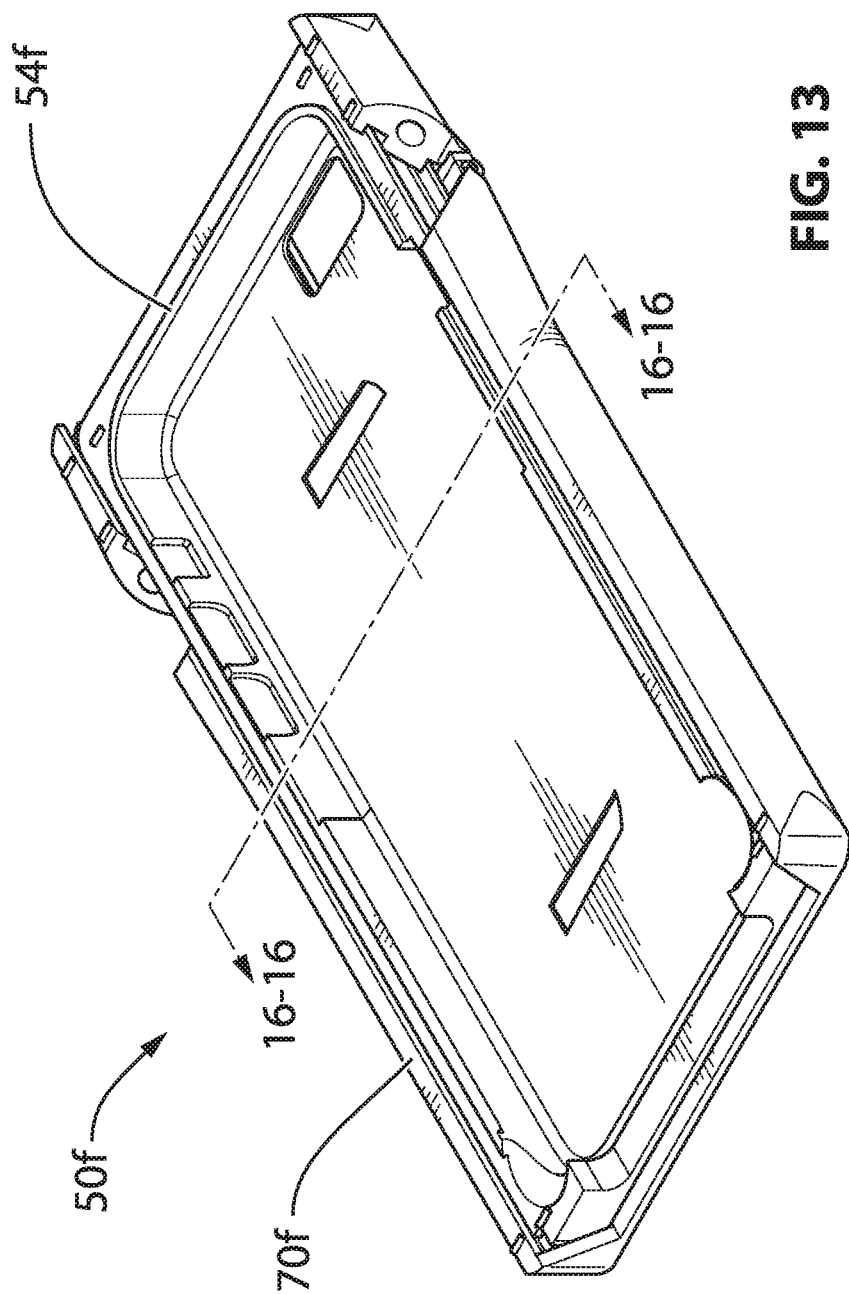
FIG. 13 is a representation of an apparatus for a portable electronic device in accordance with another embodiment.

Referring to FIG. 13, a representation of another embodiment of an apparatus 50f for enhancing privacy during operation of a portable electronic device is generally shown. It is to be understood that the apparatus 50f is purely exemplary and it will be apparent to those skilled in the art that variations are contemplated. In the present embodiment, the apparatus 50f includes a phone holder 54f, and a privacy shield 70f.

Figure 14:
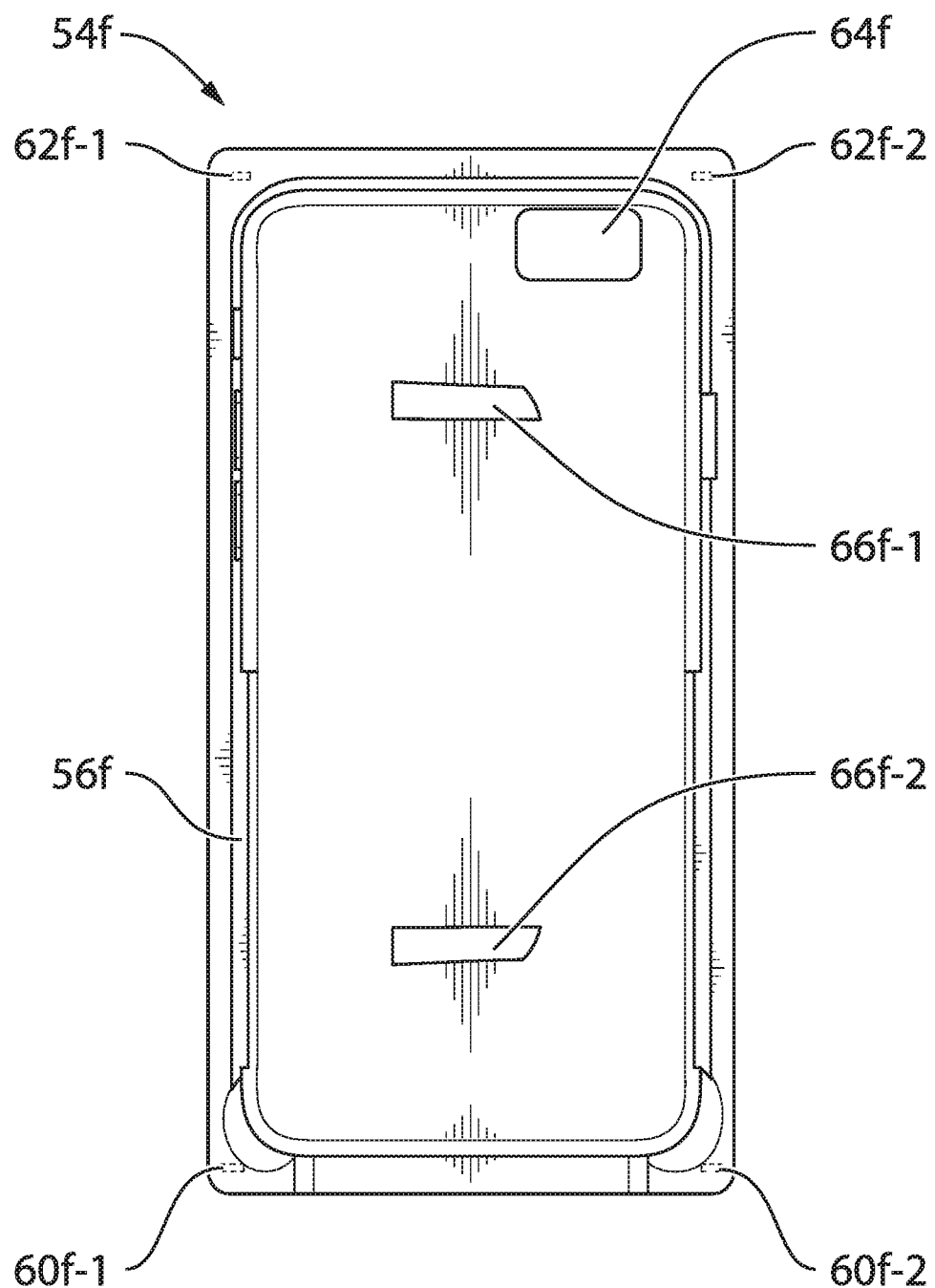
FIG. 14 is a view of the phone holder of the embodiment shown in FIG. 13.

Referring to FIG. 14, the phone holder 54f is shown in greater detail. It is to be understood that the phone holder 54f is purely exemplary and it will be apparent to those skilled in the art that variations are contemplated including other embodiments discussed herein. In the present embodiment, the phone holder 54f includes a lip 56f, extraction dimples 58f, a plurality of case magnets 60f-1, 60f-2, 62f-1, and 62f-2 a camera opening 64f and openings 66f-1 and 66f-2.

The lip 56f is generally configured to attach the phone holder 54f to the portable electronic device 100f. The manner by which the lip 56f attaches the phone holder 54f to the portable electronic device 100f is not particularly limited. In the present embodiment, the lip 56f is made of a flexibly resilient material to snap over an edge of the portable electronic device 100f. It is to be appreciated that this allows for rapid attachment to and/or detachment from the portable electronic device 100f. The lip 56f can be configured to be universally operable with a large number of portable electronic devices having similar dimensions or to be specifically designed for one type of device where the specific dimensions of the device are known. In embodiments, the lip 56f can be substituted with other attachment mechanisms, such as a clip or hooking mechanism. The lip 56f can also be omitted in other embodiments where the portable electronic device can be secured using a friction fit.

In the present embodiment, the optional extraction dimples 58f are generally configured to provide a means for easily removing the portable electronic device 100f from the phone holder 54f. The extraction dimples 58f are not particularly limited and can be disposed at any location around the portable electronic device 100f to allow for greater access with a finger and/or tool for removing the portable electronic device 100f. Although the present embodiment shows two extraction dimples 58f, it is to be appreciated that more of less extraction dimples 58f can be included.

The plurality of case magnets 60f-1, 60f-2, 62f-1, and 62f-2 is embedded within or attached to the phone holder 54f and generally configured to interact with the magnets 76f, 78f, and 80f in the privacy shield 70f to position the phone holder 54f relative to the privacy shield 70f. It is to be appreciated that the case magnets 60f-1, 60f-2, 62f-1, and 62f-2 are not particularly limited and can be any type of ferromagnetic material. For example, the case magnets 60f-1, 60f-2, 62f-1, and 62f-2 can be a rare earth magnet or another type of permanent magnet. In other embodiments, the case magnets 60f-1, 60f-2, 62f-1, and 62f-2 can be substituted with other ferromagnetic materials capable of coupling with the magnets 76f, 78f, and 80f in the privacy shield 70f. In further embodiments, the magnetic positioning system can be omitted or substituted with another mechanism capable of positioning the phone holder 54f relative to the privacy shield 70f.

The camera opening 64f of the phone holder 54f is generally configured to provide an unobstructed line of sight to the camera of the portable electronic device 100f. It is to be appreciated that the position and the dimensions of the camera opening 64f is not particularly limited and would be varied depending on the portable electronic device 100f.

The openings 66f-1 and 66f-2 of the phone holder 54f is generally configured to receive the tabs 89f-1 and 89f-2 of the privacy shield 70f when used in a horizontal stand position as discussed in greater detail below. It is to be appreciated that the position and the dimensions of the openings 66f-1 and 66f-2 not particularly limited and can be varied depending on the dimensions of the privacy shield. In other embodiments, the openings 66f-1 and 66f-2 can be substituted with another attachment mechanism, or omitted in other embodiments.

Figure 15:
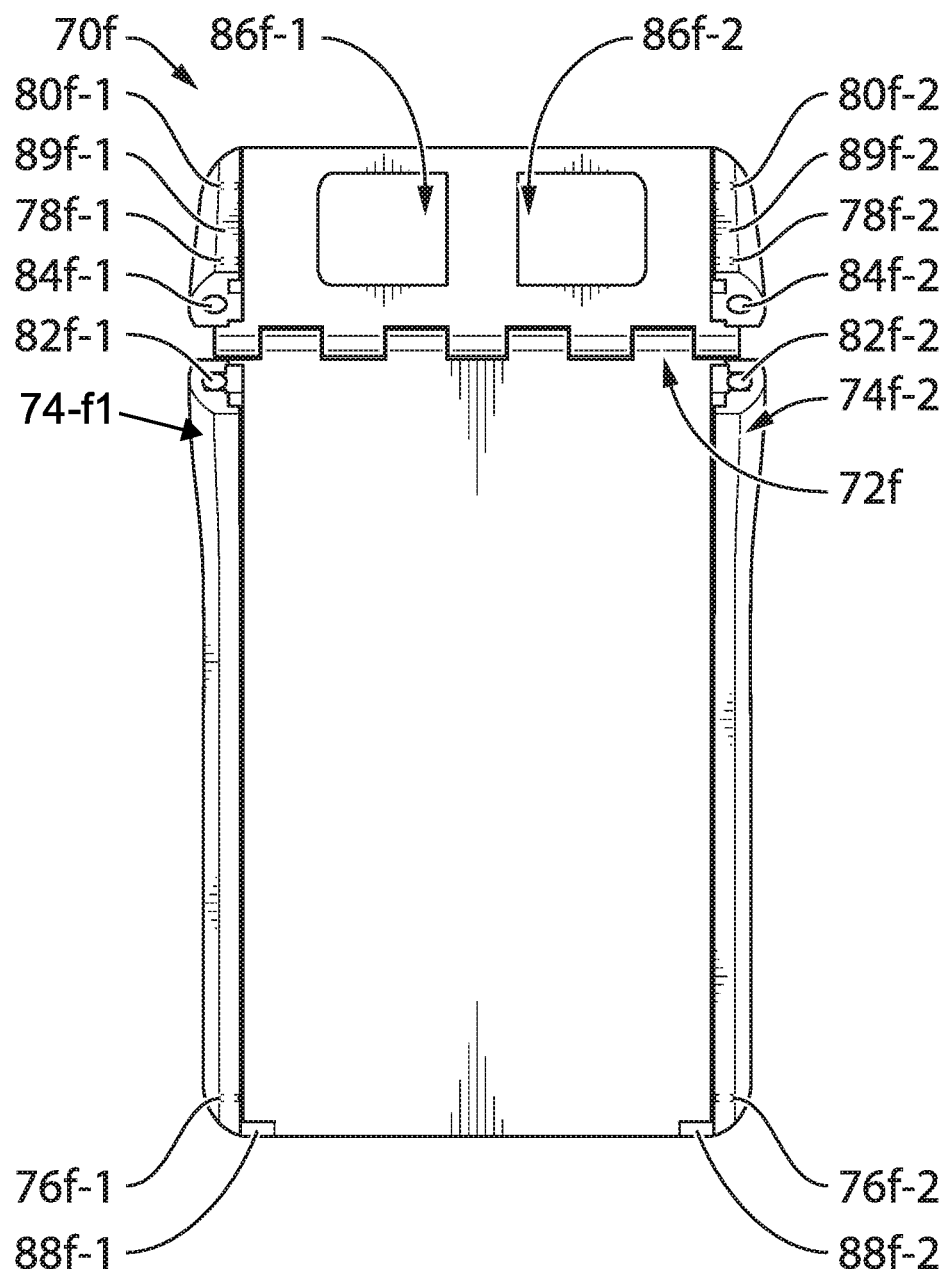
FIG. 15 is a view of the privacy shield of the embodiment shown in FIG. 13.

Referring to FIG. 15, the privacy shield 70f is shown in greater detail. It is to be understood that the privacy shield 70f is purely exemplary and it will be apparent to those skilled in the art that variations are contemplated including other embodiments discussed herein. In the present embodiment, the privacy shield 70f includes a hinge 72f, protrusions 74f, a plurality of shield magnets 76f-1, 76f-2, 78f-1, 78f-2, 80f-1, and 80f-2, hinge magnets 82f-1, 82f-2, 84f-1, and 84f-2, camera openings 86f-1 and 86f-2, and stops 88f-1 and 88f-2 to stop the phone holder 54f from moving too far.

The hinge 72f connects two portions of the privacy shield 70f and is generally configured to provide pivotal movement of the privacy shield 70f between at least two positions. In the present embodiment, the hinge 72f is a pin-type hinge. It is to be appreciated that the hinge is not particularly limited and that in other embodiments, the hinge 72f can be a flexible material, such as plastic, rubber, or silicone, connecting the two portions of the privacy shield 70f to provide a substantially pivotal motion by deforming.

In the present embodiment, the optional protrusions 74f are disposed on the side of the privacy shield 70f and are generally configured to provide for a comfortable grip of the apparatus 50f. In particular, the protrusions 74f allow for the hand to ergonomically hold the apparatus 50f when the portable electronic device is in use. The protrusions 74f are not particularly limited and can be disposed at alternative locations or be modified to be depressions. Although the present embodiment shows two protrusions 74f, it is to be appreciated that more of less protrusions 74f can be included.

The plurality of shield magnets 76f-1, 76f-2, 78f-1, 78f-2, 80f-1, and 80f-2 is embedded within or attached to the privacy shield 70f and generally configured to interact with the case magnets 60f-1, 60f-2, 62f-1, and 62f-2 in the phone holder 54f to position the phone holder 54f relative to the privacy shield 70f. It is to be appreciated that the shield magnets 76f-1, 76f-2, 78f-1, 78f-2, 80f-1, and 80f-2 are not particularly limited and can be any type of ferromagnetic material. For example, the shield magnets 76f-1, 76f-2, 78f-1, 78f-2, 80f-1, and 80f-2 can be a rare earth magnet or another type of permanent magnet. In other embodiments, the shield magnets 76f-1, 76f-2, 78f-1, 78f-2, 80f-1, and 80f-2 can be substituted with other ferromagnetic materials capable of coupling with the case magnets 60f-1, 60f-2, 62f-1, and 62f-2 of the phone holder 54f. In further embodiments, the magnetic positioning system can be omitted or substituted with another mechanism capable of positioning the phone holder 54f relative to the privacy shield 70f.

The hinge magnets 82f-1, 82f-2, 84f-1, and 84f-2 are disposed proximate to the hinge 72f and generally configured to hold the privacy shield 70f in a bent position. When the two portions of the privacy shield 70f are pivoted to an angle, such as 90 degrees in the present embodiment, the hinge magnets 82f-1 and 82f-2 magnetically couple with the hinge magnets 84f-1 and 84f-2 to hold the privacy shield 70f at the angle. It is to be appreciated that the hinge 72f and the privacy shield 70f are not particularly limited and that the angle can be greater or less than 90 degrees in other embodiments. Furthermore, it is to be appreciated that the hinge magnets 82f-1, 82f-2, 84f-1, and 84f-2 are not particularly limited and can be any type of ferromagnetic material. For example, the hinge magnets 82f-1, 82f-2, 84f-1, and 84f-2 can be a rare earth magnet or another type of permanent magnet. In other embodiments, some of the hinge magnets 82f-1, 82f-2, 84f-1, and 84f-2 can be substituted with other ferromagnetic materials capable of coupling with each other. In further embodiments, the hinge 72f can be held in place using mechanical means, such as a spring, a clip, or an adhesive.

The camera openings 86f-1 and 86f-2 of the privacy shield 70f is generally configured to provide an unobstructed line of sight to the camera of the portable electronic device 100f. It is to be appreciated that the position and the dimensions of the camera openings 86f-1 and 86f-2 is not particularly limited and would be varied depending on the portable electronic device 100f. Furthermore, each of the camera openings 86f-1 and 86f-2 are configured to work in conjunction with the camera opening 64f as will be discussed in greater detail below. For example, when the apparatus 50f is in the configuration shown in FIG. 13, the camera opening 64f is substantially in line with the camera opening 86f-2.

Figure 16:
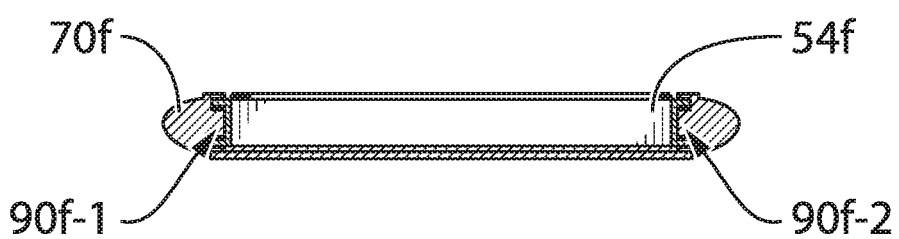
FIG. 16 is a cross sectional view of the apparatus of the embodiment shown in FIG. 13 about the line 16-16.

Referring to FIG. 16, the tracks 90f-1 and 90f-2 for guiding the phone holder 54f along the privacy shield 70f is shown in greater detail. In the present embodiment, the tracks 90f-1 and 90f-2 are similar. The privacy shield 70f includes a channel with a ridge substantially in the center. The phone holder 54f is generally configured to fit within the channel and includes a groove into which the ridge can slidably mate. It is to be appreciated that the tracks 90f-1 and 90f-2 are not particularly limited to this design and variations are contemplated. For example, the tracks 90f-1 and 90f-2 can be modified to have more ridges/grooves, include ball bearings for improved slidability.

Figure 17:
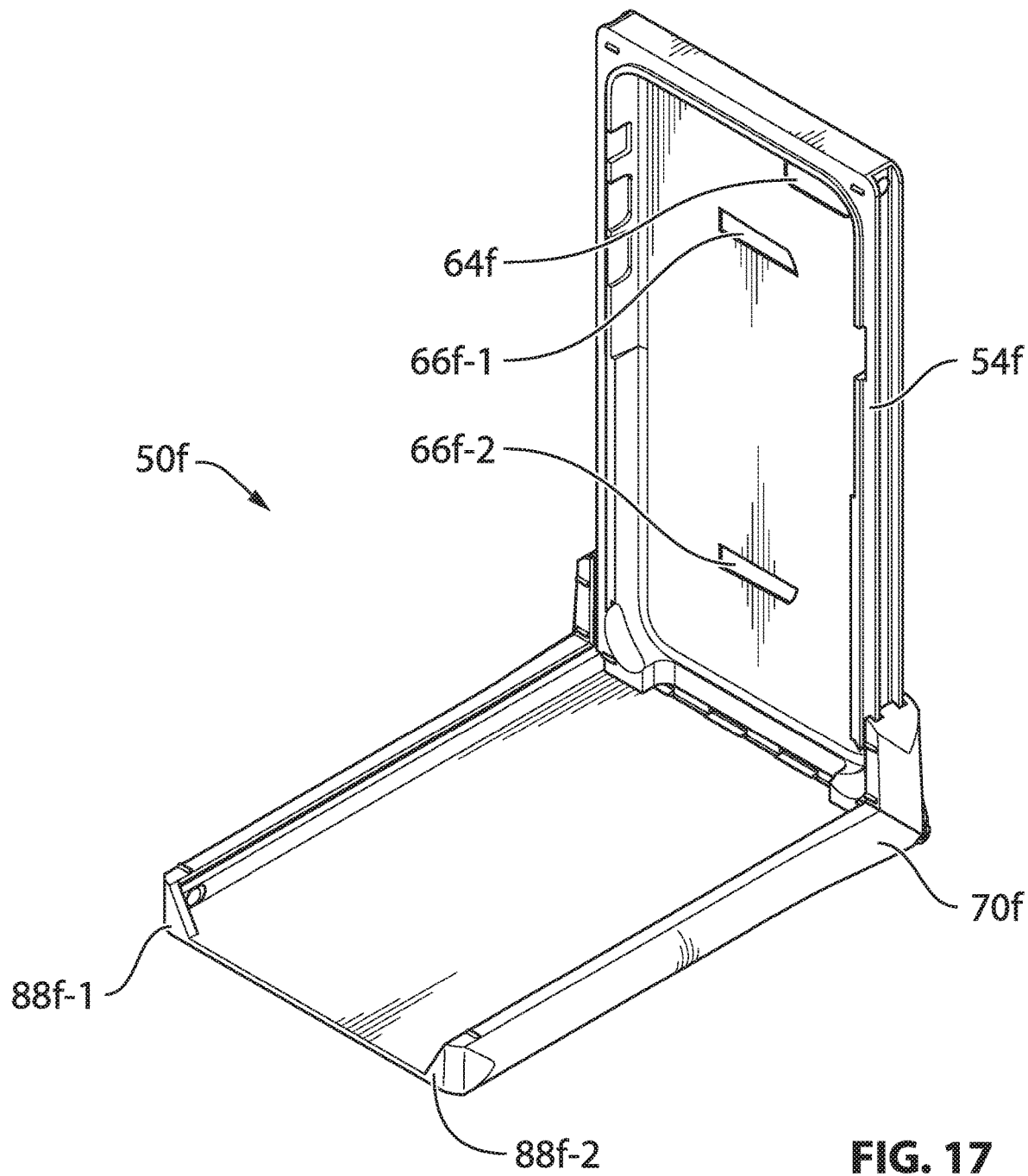
FIG. 17 is a representation of an apparatus shown in FIG. 13 in a first configuration.

Referring to FIG. 17, the apparatus 50f is generally shown in a position for covering the mouth of a user of the portable electronic device 100f. In the present embodiment, it is to be appreciated by a person of skill in the art with the benefit of this description that the privacy shield 70f also functions to obscure the mouth of the user from view. Accordingly, in addition to providing a physical barrier to dampen sound escaping to the ambient environment, the tinting can provide additional protection against third parties being able to read the lips of the user by covering the lips of the user and obstructing the view of the lips. In the present configuration, the hinge magnets 82f-1 and 82f-2 magnetically couple with the hinge magnets 84f-1 and 84f-2 to hold the privacy shield 70f in the shown position. In addition, the phone holder 54f is held in place by having the case magnets 60f-1 and 60f-2 magnetically couple with the shield magnets 78f-1 and 78f-2, respectively. It is to be appreciated by a person of skill in the art, with the benefit of this description, that the privacy shield 70f can also function as stand to hold the portable electronic device 100f substantially upright.

Figure 18A:
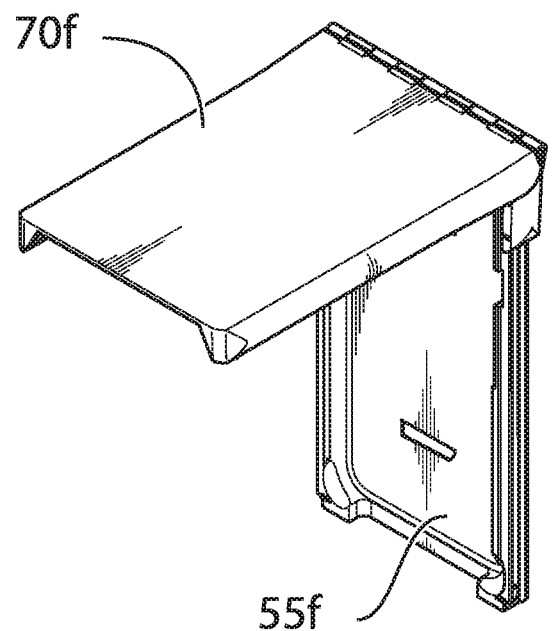
FIGS. 18a-e is a representation of an apparatus shown in FIG. 13 in other configurations.

Referring to FIG. 18a, the apparatus 50f is generally shown in another position for protecting the privacy of the portable electronic device 100f by shielding the screen. In particular, it can be used to prevent a person positioned in front of the user from reading the screen of the portable electronic device 100f. In the present configuration, it is to be appreciated by a person of skill in the art with the benefit of this description that the privacy shield 70f can also block out glare or other elements such as rain when used outdoors. In the present configuration, the hinge magnets 82f-1 and 82f-2 magnetically couple with the hinge magnets 84f-1 and 84f-2 to hold the privacy shield 70f in the shown position. In addition, the phone holder 54f is held in place by having the case magnets 62f-1 and 62f-2 magnetically couple with the shield magnets 78f-2 and 78f-1, respectively. It is to be appreciated by a person of skill in the art, with the benefit of this description, that the camera opening 64f is substantially in line with the camera opening 86f-1 to allow for use of the camera on the portable electronic device 100f.

Figure 18B:
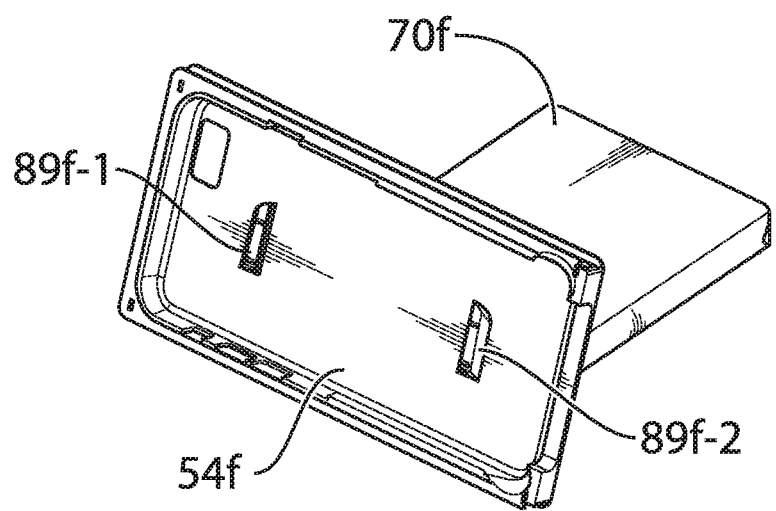

Referring to FIG. 18b, the apparatus 50f is generally shown in another position for as a horizontal stand. In the present configuration, it is to be appreciated by a person of skill in the art with the benefit of this description that the tabs 89f-1 and 89f-2 of the privacy shield 70f can rotated upward an engaged with the openings 66f-1 and 66f-2.

Figure 18C:
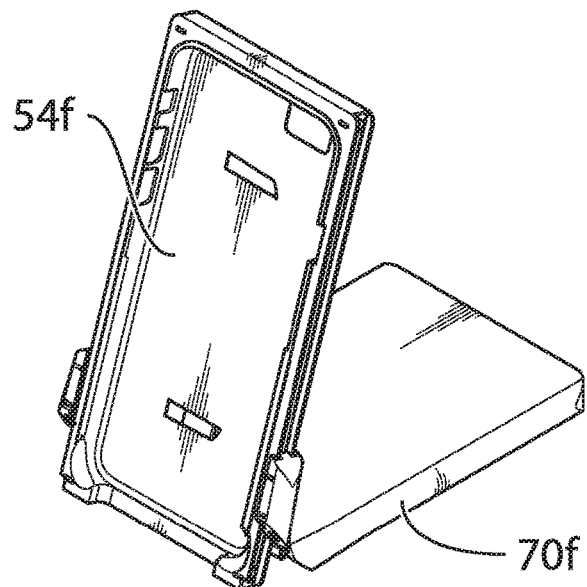

Referring to FIG. 18c, the apparatus 50f is generally shown in another position for as a vertical stand. In the present configuration, it is to be appreciated by a person of skill in the art with the benefit of this description that the phone holder 54f is using a portion of the tracks 90f-1 and 90f-2 of the privacy shield 70f. It is to be appreciated by a person of skill in the art that the angle of the phone holder 54f is not particularly limited and can be modified such the phone holder 54f is at a smaller or greater angle.

Figure 18D:
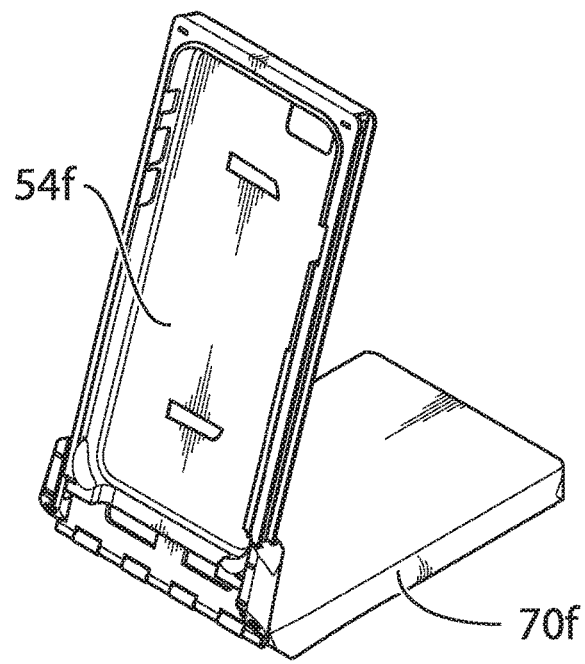

Referring to FIG. 18d, the apparatus 50f is generally shown in another position for as a vertical stand. In the present configuration, it is to be appreciated by a person of skill in the art with the benefit of this description that the phone holder 54f is supported above the surface by having the case magnets 60f-1 and 60f-2 magnetically couple with the shield magnets 80f-1 and 80f-2, respectively. It is to be appreciated by a person of skill in the art that by raising the phone holder 54f, it allows for access to the bottom of the portable electronic device 100f, such as for connecting a wire for charging.

Figure 18E:
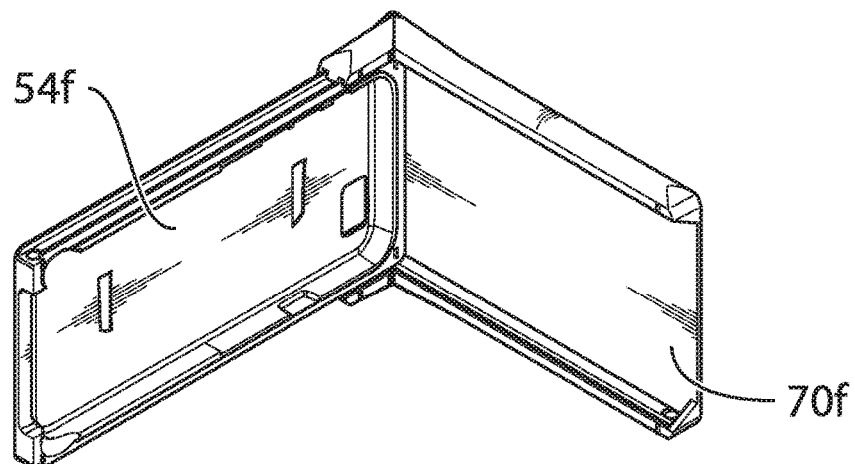

Referring to FIG. 18e, the apparatus 50f is generally shown in another position for protecting the privacy of the portable electronic device 100f by shielding the screen. In particular, it can be used to prevent a person positioned in at a side of the user from reading the screen of the portable electronic device 100f. In the present configuration, it is to be appreciated by a person of skill in the art with the benefit of this description that the privacy shield 70f can also block out glare or other elements such as rain from the side when used outdoors. In the present configuration, the hinge magnets 82f-1 and 82f-2 magnetically couple with the hinge magnets 84f-1 and 84f-2 to hold the privacy shield 70f in the shown position. In addition, the phone holder 54f is held in place by having the case magnets 62f-1 and 62f-2 magnetically couple with the shield magnets 78f-2 and 78f-1, respectively. Alternatively, in another configuration, the phone holder 54f can be held in place by having the case magnets 60f-1 and 60f-2 magnetically couple with the shield magnets 78f-1 and 78f-2, respectively. It is to be appreciated by a person of skill in the art, with the benefit of this description, that the camera opening 64f is substantially in line with the camera opening 86f-1 to allow for use of the camera on the portable electronic device 100f.

Figure 19:
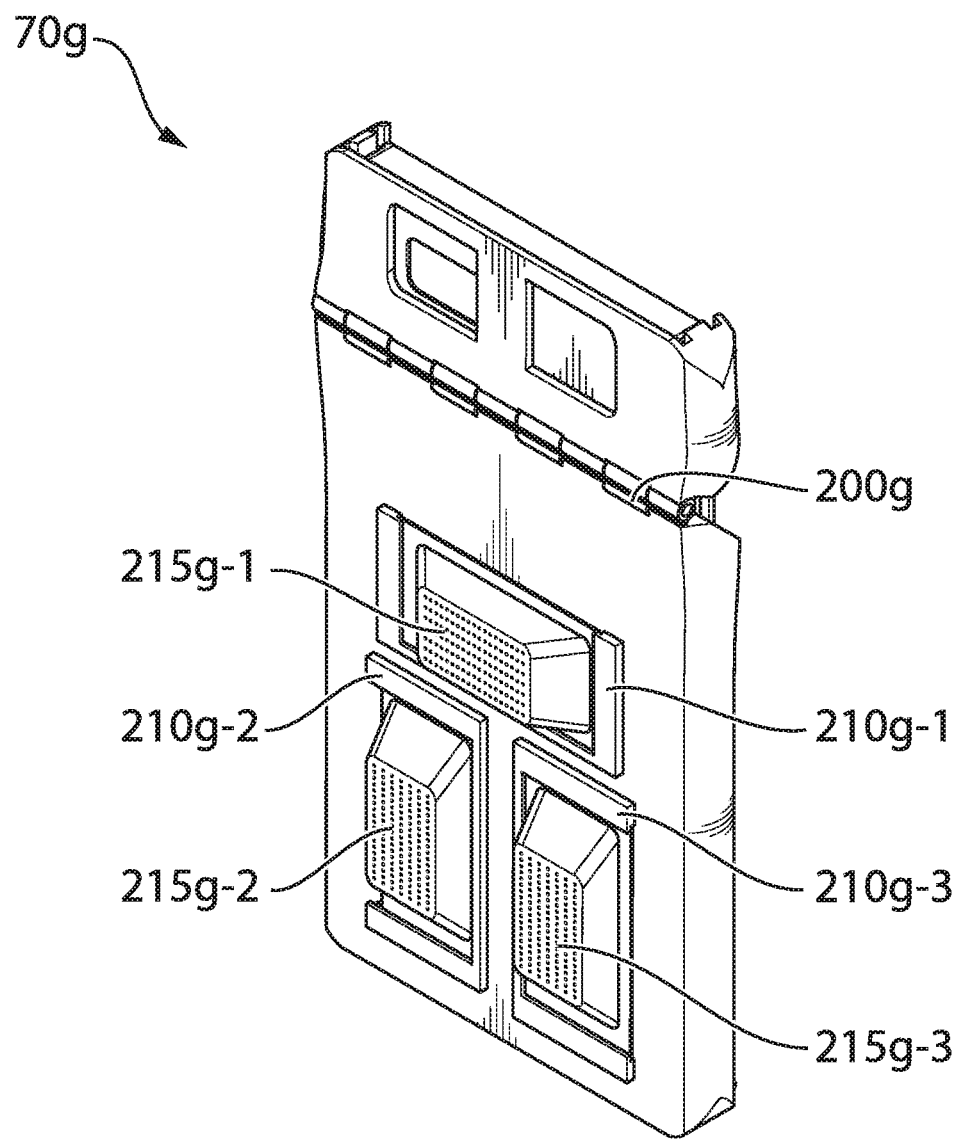
FIG. 19 is a representation of an apparatus for a portable electronic device in accordance with another embodiment.

Referring to FIG. 19, another embodiment of a privacy shield 70g is shown. In the present embodiment, the privacy shield 70g includes all the features discussed above in connection the privacy shield 70f and can be used in combination with the phone holder 54f. In the present embodiment, the privacy shield 70g includes stops 200g at the hinge to restrict the angle of movement. In addition, the privacy shield 70g also includes a plurality of clips 210g-1, 210g-2, and 210g-3 for holding items 215g-1, 215g-2, and 215g-3, respectively. In the present embodiment the items 215g-1, 215g-2, and 215g-3 are pillboxes where the portable electronic device 100f can be used to provide notifications and reminders for a user to take medications that would then be conveniently stored on the device providing the reminder. However, it is to be appreciated that the items 215g-1, 215g-2, and 215g-3 are particularly not limited and can be anything else associated with a reminder system. In other embodiments, the items 215g-1, 215g-2, and 215g-3 can be modified to store other essential items, such as credit and bank cards.

Various advantages will now be apparent to a person of skill in the art. Of note is the ability to carry out a conversation in a public place with enhanced privacy. It is to be understood that any of the above describe apparatus can be designed to also function as a carrying case with a clip for a belt. Accordingly, the apparatus provides a compact solution to enhancing privacy and reducing background noise for phone calls that does not require substantial additional storage when carrying a portable electronic device. Therefore, it is to be appreciated that this ability would be especially beneficial when conducting a business call on public transit.

Referring now to FIGS. 20-45, shown therein is an apparatus for use with a portable device. In preferred embodiments, the apparatus is a case for a mobile phone or tablet device. In other embodiments, the apparatus is configured for use with portable devices other than mobile phones or tablets.

Some portable devices have a display. A user may configure the case according to a configuration as described herein to view the display.

Some portable devices have a keyboard, or a touch-sensitive display configurable as an electronic keyboard. A user may configure the case according one configuration as described herein to use the keyboard.

In some embodiments, the case may be used as a stand to hold the portable device in various portrait or landscape orientations on various surfaces such as a desk or table, or more unusual surfaces such as on a blanket, leg, or backpack.

The case includes an inner member 1102 and an outer member 1103. The outer member includes a base member pivotally coupled to an extension member.

In a preferred embodiment, the inner member 1102 retains a portable device within a cavity and is configured to slide within the outer member 1103 through an opening at the periphery of the base member or the extension member.

When the base member 1104 and the extension member 1105 receive the inner member 1102, it is through outer member tracks 1115 which mate with and guide the inner member's rails 1112.

Figure 20:
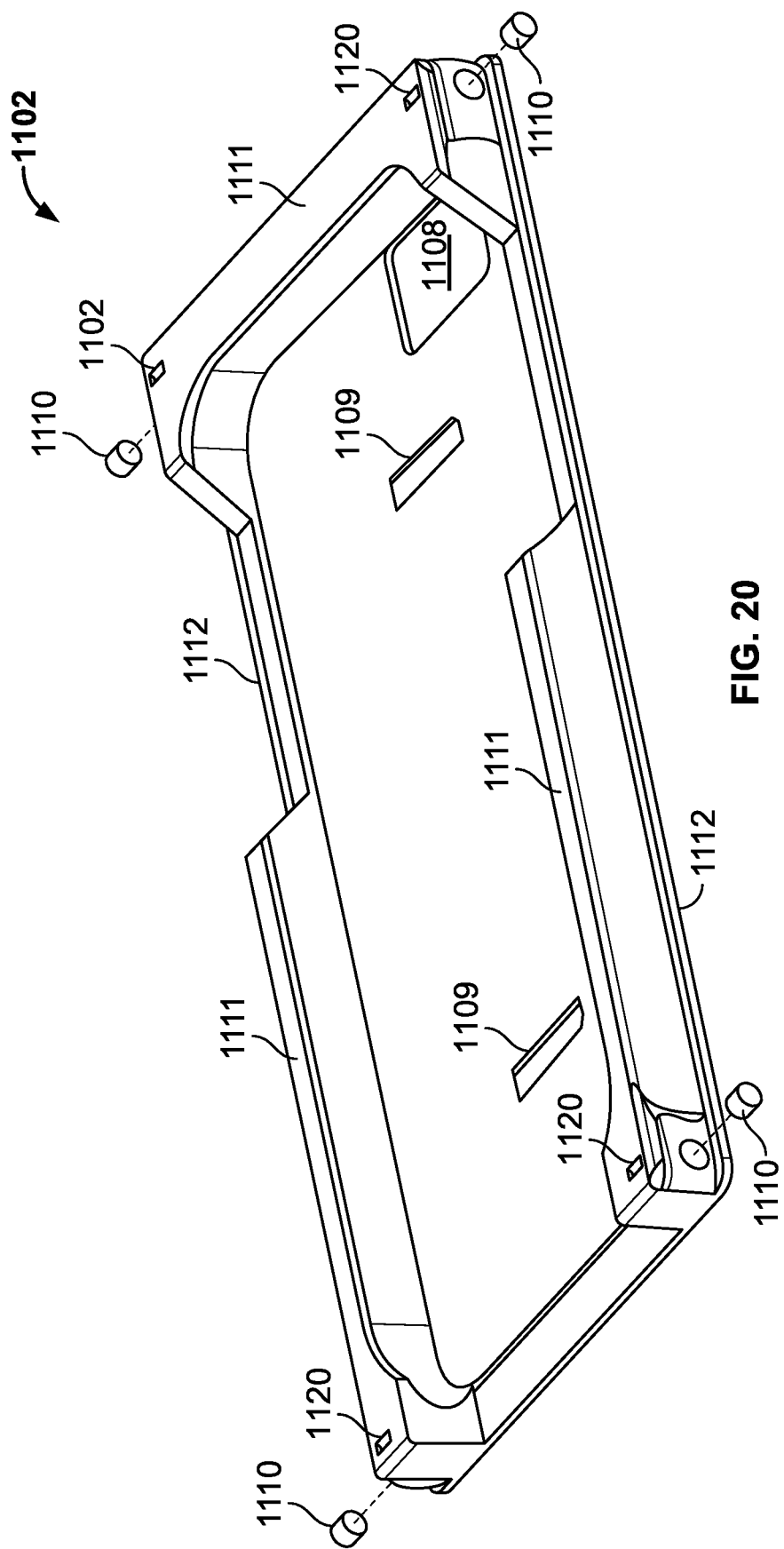
FIG. 20 illustrates an exploded view of one embodiment of an inner member.

FIG. 20 shows one embodiment of an inner member 1102.

The inner member 1102 has a cavity configured to receive a portable device (not shown) and one or more lips 1111 surrounding the cavity that retains the portable device within the inner member 1102. The lips 1111 extend up from the back of the inner member and over a portable device 1101 (not shown).

The lips 1111 surround an opening in the inner member 1102 configured to expose a display and/or keyboard on the portable device 1101.

In preferred embodiments, the inner member 1102 has rails 1112 extending laterally outward for slideably engaging with opposing tracks 1115 (not shown) on the lateral sides of the interior surface of the outer member 1103 (described herein).

The inner member 1102 has a camera opening 1108 positioned to allow for a rear camera on the portable device 1101 to capture images through the camera opening 1108 while the portable device is contained within the inner member 1102 in one or more of the exemplary configurations described herein.

Gaps between the lips 1111 on the periphery of the inner member 1102, and other openings on the inner member 1102, may be positioned to allow for operation of various features of the portable device 1101 while it is contained in the case in one or more of the configurations described herein. These features include but are not limited to buttons 1113, ports 1114 for data and power, microphones, speakers, ambient light sensors and fingerprint sensors.

Case magnets 1110 are positioned near four corners of the inner member 1102. These case magnets 1110 are positioned to magnetically couple with case magnets 1110 arranged on the interior surface of the outer member 1103 as the inner member 1102 slides along the tracks 1106 at one or more positions within the outer member 1103 as described herein. The case magnets 1110 of the inner member 1102 are oriented to have a polarity that attracts the case magnets 1110 of the outer member 1103 as they approach each other.

The magnetic attraction causes some "stickiness" at the positions where one or more case magnets 1110 are adjacent to each other. This stickiness does not prevent a user from moving the inner member 1102 past those positions within the outer member 1103, but may tend to hold the inner member 1102 in the position as described herein. The force is dependent on the strength of the selected case magnets 1110.

In some embodiments, the case magnets 1110 are secured within the inner member 1102 using glue. In other embodiments, the shape of the case magnets 1110 have one or more lateral protrusions such that when it is inserted into the inner member 1102 the protrusions snap into a receptacle within inner member 1102 that secures the case magnet 1110 in place. In other embodiments, the case magnets 1110 are secured using a spring or clip.

Magnet indicators 1120 are marks on the top of the lips 1111 at points along the rails 1112 that provide a visual indicator as to where the case magnet 1110 is located. This makes it easier for a user to align the case magnets 1110 of the inner member 1102 and the outer member 1103 when sliding the inner member 1102 on the tracks 1115.

The inner member 1102 has a pair of base connectors 1109. In some embodiments, the base connectors 1109 are openings within the inner member 1102 shaped to receive hinge protrusions from the extension member 1103 as described herein.

The lips are generally configured to secure the portable device within the inner member 1102. In some embodiments, the lip is made of flexibly resilient materials to snap over an edge of the portable device to retain it within the inner member 1102. In some embodiments, the portable device 1101 is removed from the inner member 1102 by peeling back the sides of the inner member 1102 with fingers or a tool.

In other embodiment, the lips can be substituted with a clip or hooking mechanism. The lip can also be omitted in other embodiments where the portable device can be secured using a friction fit.

Figure 21:
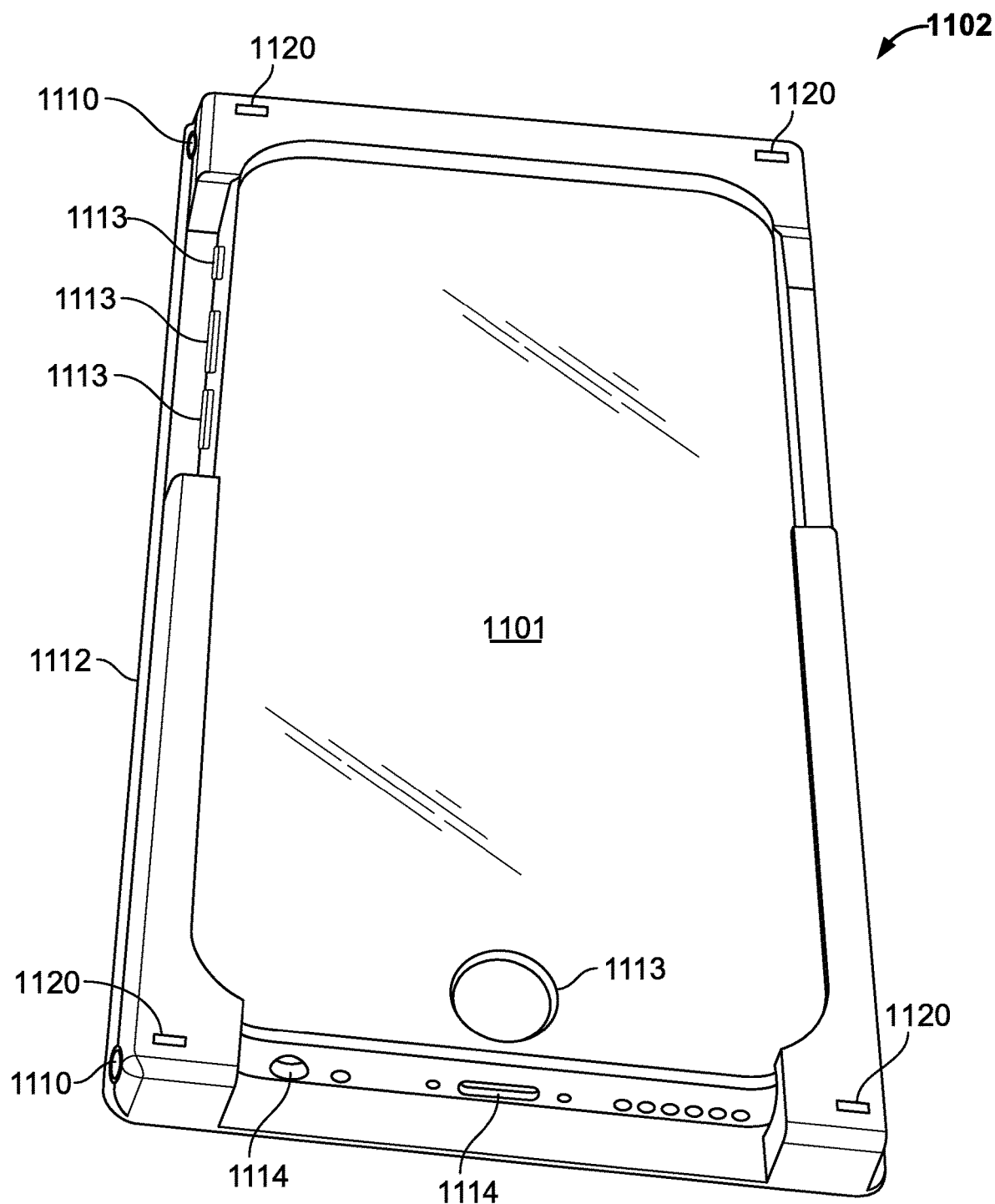
FIG. 21 illustrates one embodiment of an inner member containing a portable electronic device.

FIG. 21 illustrates an inner member 1102 containing a portable device 1101 having buttons 1113 and ports 1114 made accessible through gaps and openings in the inner member 1102. In some embodiments, the positions of the gaps and openings are designed to accommodate the features of one or more particular models of portable devices.

Case magnets 1110 are positioned within the inner member 1102 on the periphery near each of the four corners of the inner member 1102.

In preferred embodiments, the inner member 1102 has rails 1112 extending laterally outward for slideably engaging with opposing tracks 1115 (not shown) on the lateral sides of the interior surface of the outer member 1103 (described herein).

Figure 22:
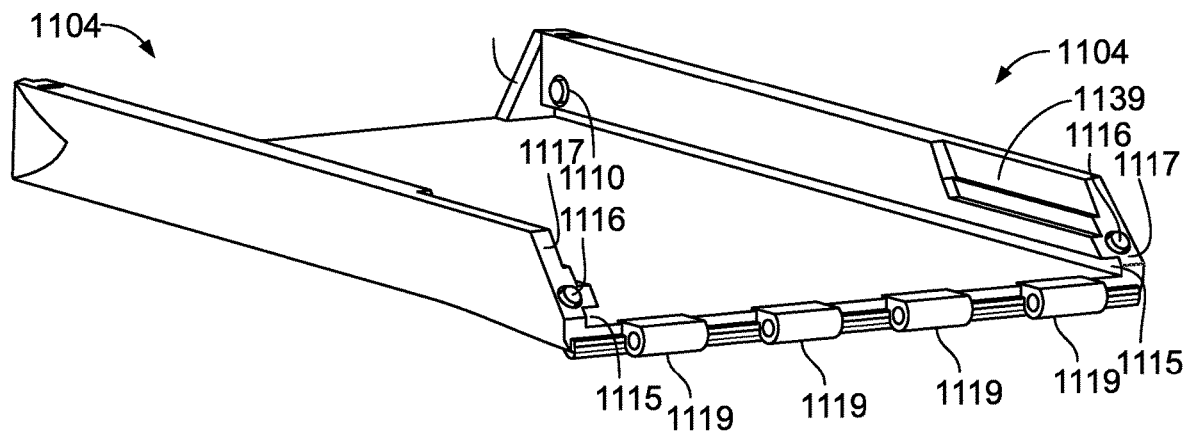
FIG. 22 illustrates one embodiment of a base member, the inner cavity being face up in the illustration.

FIG. 22 illustrates one embodiment of the base member 1104.

The outer member 1103 includes a base member 1104 and an extension member 1105 coupled so that the rails 1112 of the base member 1104 and the rails 1112 of the extension member 1105 can be substantially aligned with each other in one configuration and at substantially right angles to each other in a second configuration.

In a preferred embodiment, the base member and extension member are coupled to each other using a hinge rotating around an axis that is substantially perpendicular to the axis along the length of the tracks on lateral sides of outer member 1103.

The base member 1104 includes tracks 1115 along opposing interior lateral sides of the base member 1104. Each track 1115 is positioned to receive a rail 1112 from the inner member 1102 so that the inner member 1102 is slideable along the track 1115 within the base member 1104.

At one end of each of the lateral sides of the outer member are bumpers 1122 that are positioned to stop the inner member 1102 from sliding in the direction of the bumper 1122 when the edge of the inner member runs up against the bumper 1122.

At the other end of the lateral sides of the outer member are knuckles 1119. The knuckles 1119 of the base member 1104 are laterally spaced apart to allow for knuckles 1119 of the extension member 1105 and the knuckles 1119 of the base member 1104 to be interleaved. A hinge pin 1137 is inserted through the core of the interleaved knuckles 1119 to form a hinge. The core of the interleaved knuckles can be sealed with a cover to prevent the hinge pin 1137 from sliding out.

Hinge stops 1117 of the base member 1104 are positioned to butt up against corresponding hinge stops 1117 on the extension member 1105 when the extension member 1105 is at an angular position with respect to the base member 1104. This first angular position associated with the hinge stops is used for configurations as described below.

Hinge magnets 1116 are positioned within each hinge stop 1117. In some embodiments, the hinge magnets 116 are secured within the hinge stop 1117 using glue. In other embodiments, the shape of the hinge magnets 1116 have one or more lateral protrusions such that when it is inserted into the hinge stop 1117, the protrusions snap into a receptacle that retains the hinge magnet 1116.

The hinge magnets 1116 of the extension member 1105 are oriented to have a polarity that attracts the corresponding hinge magnets 1116 of the base member 1104 as the hinge magnets butt up against each other. In a preferred embodiment, the hinge magnets 1116 are stronger than the case magnets 1110.

Figure 23:
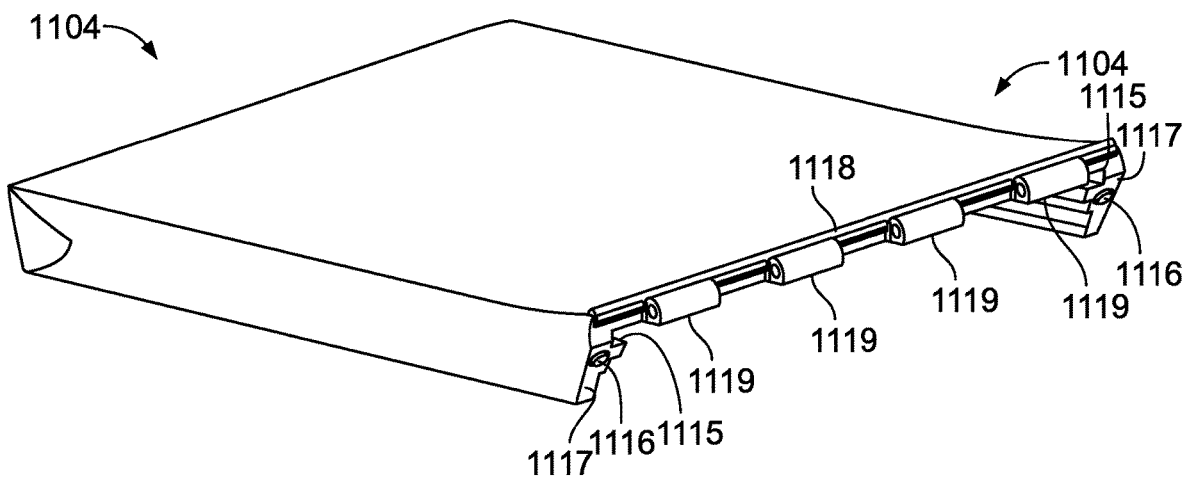
FIG. 23 illustrates one embodiment of a base member, the inner cavity being face down in the illustration.

FIG. 23 shows a perspective view of the back side of one embodiment of the base member 1104. This perspective view shows the knuckles 1119, the hinge stops 1117 and the hinge magnets 1116.

A hinge stops 1118 limit the angular motion of the hinge in the opposite angular direction as the hinge stops 1117. In the illustrated embodiment, the hinge stop 1118 is a long narrow protrusion across the width of the hinge. The operation of the hinge stop 1118 is described below. This second angular position associated with the hinge stops is used for configurations as described below.

A ledge 1139 is positioned at lateral sides adjacent to each of the two hinge stops 1117. The ledge 1139 opens up the area around the gaps in between the lips 1111 in the inner member 1102 when the inner member 1102 is fully inserted into the outer member 1103. This allows for easier access for fingers to reach buttons 1113 on the side of the portable device 1101.

The ledge 1139 also acts as a hinge stop in certain configurations. This third angular position associated with the hinge stops is used for configurations as described below.

Figure 24:
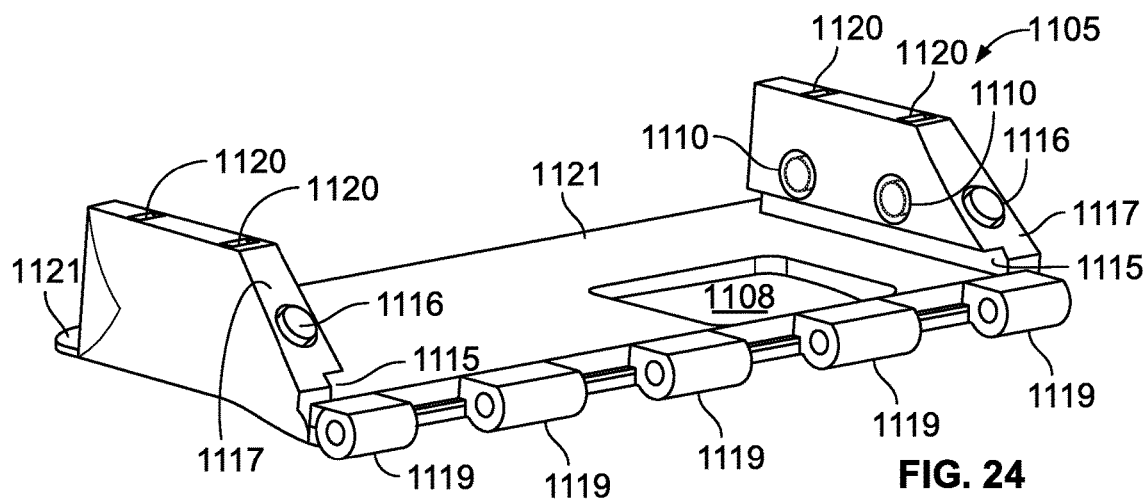
FIG. 24 illustrates one embodiment of an extension member, the inner cavity being face up in the illustration.

FIG. 24 shows a perspective view of one embodiment of the extension member 1105.

The extension member 1105 has knuckles 1119 positioned to interleave with the knuckles 1119 of the base member 1104.

In some embodiments, the extension member 1105 is at substantially 90 degree angle relative to the base member 1104 at the first angular stop position.

In a preferred embodiment, adjacent to the hinge on lateral sides of the base member and adjacent to the hinge on lateral sides of the extension member are pairs of hinge stops 1117 each containing a magnet. When the extension member 1105 is at a substantially right angle to the base member 1104, the corresponding magnets of the base member 1104 and the extension member 1105 on lateral sides of the outer member 1103 are magnetically coupled to each other to hold the extension member 1105 at a substantially right angle relative to the base member 1104. The strength of the selected hinge magnets 1116 are a matter of design choice depending on factors such as the weight of the portable device 1101 and the separation forces expected in the ordinary use of the device as described herein. Separation forces are forces that tend to separate the hinge magnets 1116 during normal operation in various configurations. These separation forces might be the result of shocks and impacts on the case containing the portable device.

In a preferred embodiment, the extension member 1105 has a length (measured parallel to the track) about one-fifth the length of the base member 1104. This relationship is a matter of design choice to be optimized for the size and weight of the portable device 1101, and the range of configurations to be used with that portable device 1101.

A camera opening 1108 is positioned to allow for a rear camera on the portable device 1101 to capture images through the camera opening 1108 while the portable device is contained within the inner member 1102 in one or more of the exemplary configurations described herein.

The dimensions of the inner cavity of the inner member 1102, and the size and position of various openings of the inner member 1102 may be customized for particular brands and models of mobile phone and tablet devices. In some embodiments, several versions of inner members 1102 are developed each having an inner cavity that is designed to accommodate more than one brand and/or models of portable devices, while the outer dimensions are compatible with an outer member 1103 that is configured to work with several of the various versions of the inner members. This may reduce the number of stock keeping units required to support broad compatibility with many portable devices.

A rail guide 1121 extends past the end of the tracks 1115 opposite the hinge on the extension member 1105 to help guide the inner member into the tracks 1115. The rail guide 1121 is at one of the openings used to receive the inner member 1102 into the extension member 1105.

Figure 25:
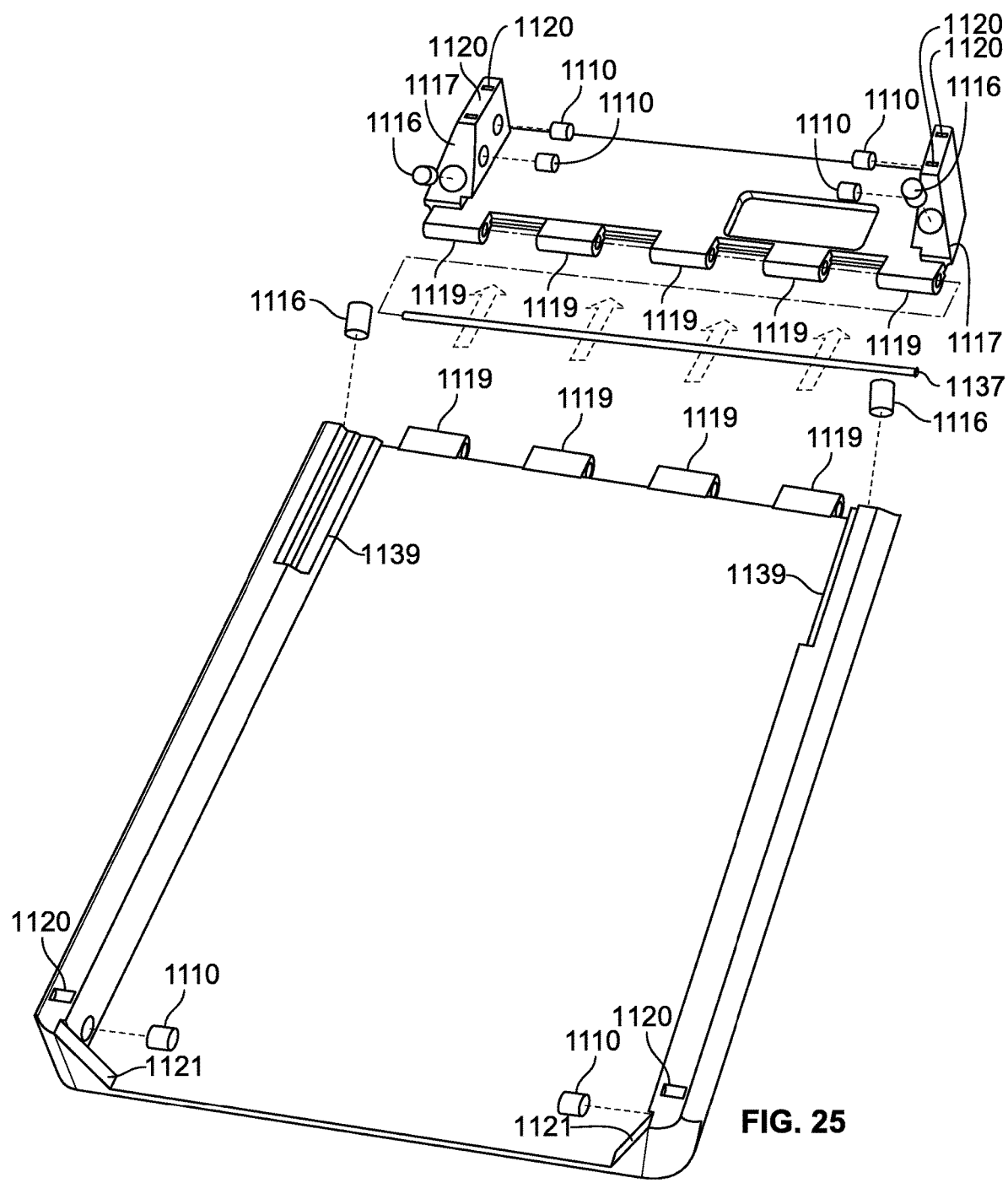
FIG. 25 illustrates an exploded view of one embodiment of an outer member, the inner cavity being face up in the illustration.

FIG. 25 shows one embodiment of an exploded view of the outer member 1103 including a base member 1104 and an extension member 1105 pivotally coupled to each other by a hinge. The hinge includes knuckles 1119 integrated into the base member 1104 and the extension member 1105, and a hinge pin inserted into the core of the interleaved knuckles 1119.

The base member and extension member includes case magnets 1110 positioned along the tracks 1115 magnet indicators 1120, and hinge magnets 1116, knuckles 1119 and a hinge pin 1137.

Figure 26:
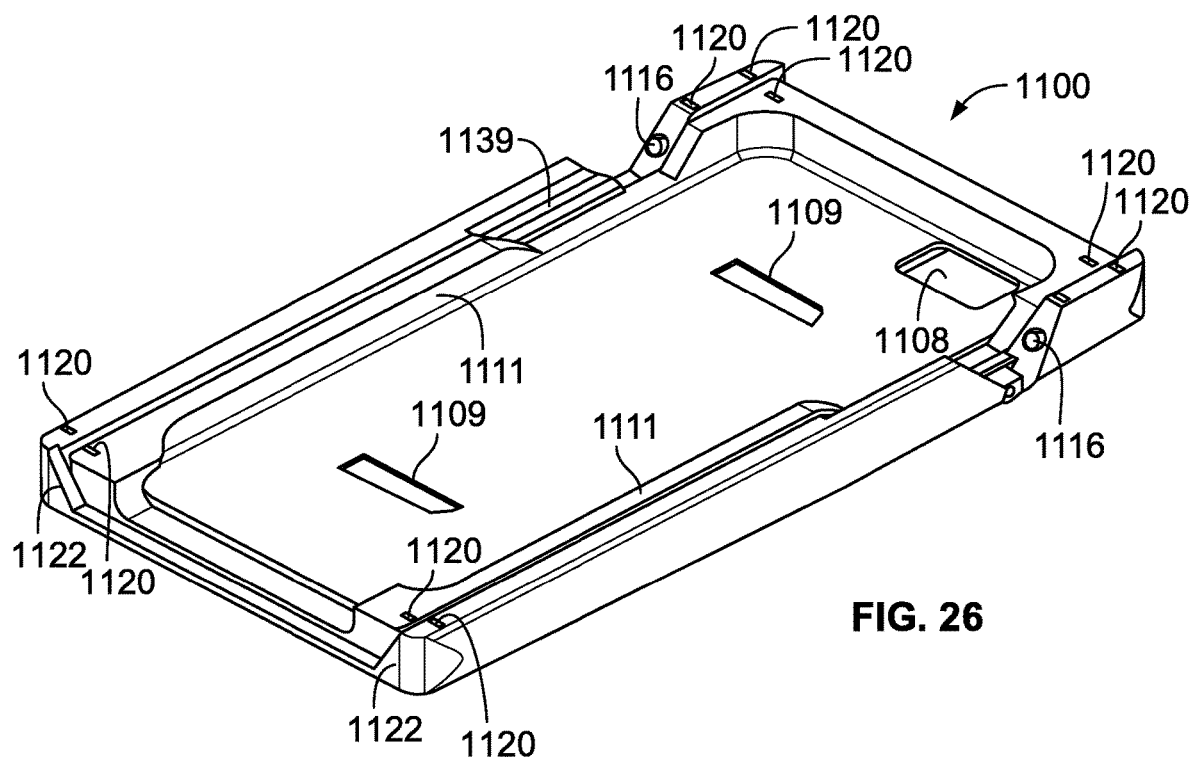
FIG. 26 illustrates one embodiment of a case comprising an outer member and an inner member.

FIG. 26 shows one embodiment of the case where the inner member 1102 is contained within the outer member 1103.

The base member 1104 and the extension member 1105 are substantially aligned so that rails of the inner member 1102 can slide through the tracks 1115 of the extension member 1105 and the base member 1104. In this embodiment, the angular position of the extension member 1105 is approximately 180 degrees relative to the base member 1104.

In a preferred embodiment, the inner member 1102 is received onto the rail guide 1121 and slides through the extension member 1105 guided by the tracks 1115 past the hinge and onto the tracks 1115 of the base member 1104. In a preferred embodiment, the inner member 1102 fits within the outer member 1103 when the inner member 1102 slides along the tracks 1115 of the extension member 1105 and the base member 1104 to the bumpers 1122.

Figure 27:
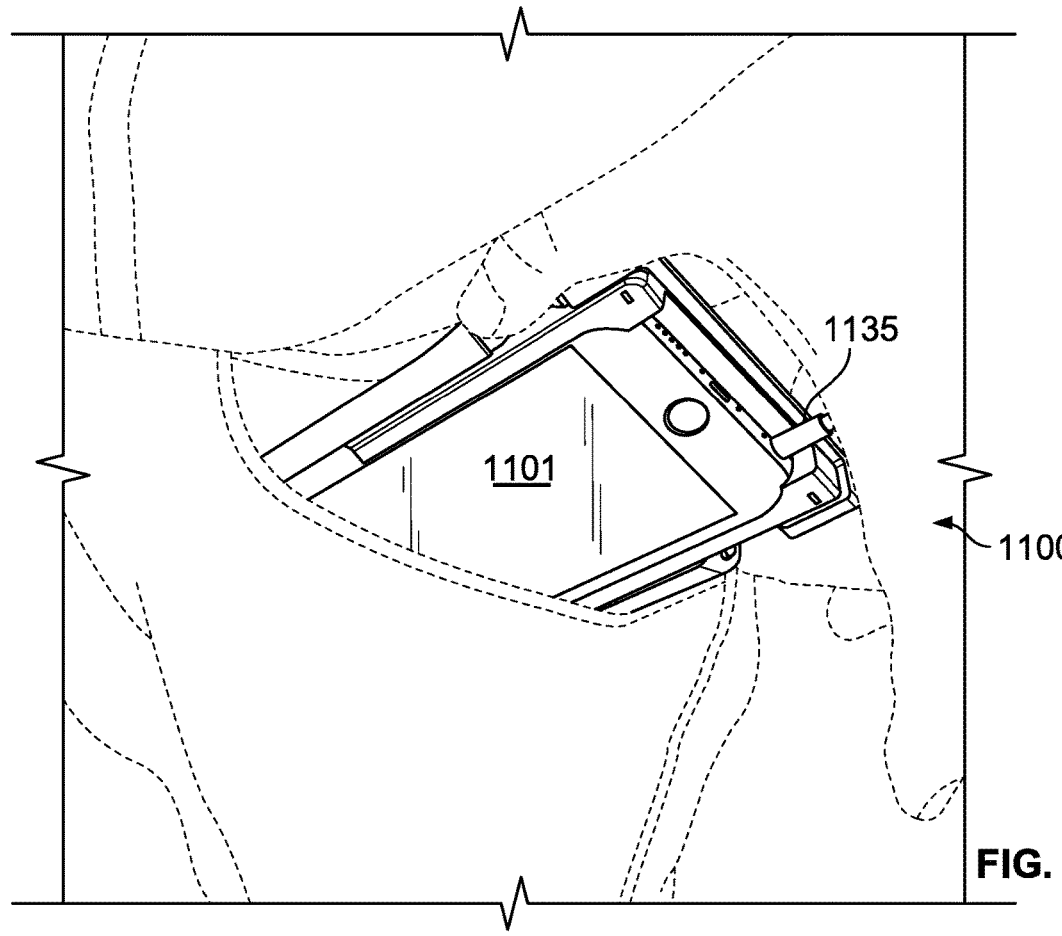
FIG. 27 illustrates one embodiment of a case being removed from a pants pocket.

FIG. 27 shows one embodiment of the case in the first configuration being removed from a pocket.

In a preferred embodiment, the corners of the case are rounded and the sides of the exposed portions of the outer member 1103 and the inner member 1102 are flat or gradually slanted so as to avoid catching on clothing when case is inserted or removed from a pocket, for example.

The inner member can slide into the open end of the outer member 1103 either top first (like the configuration illustrated in FIG. 26) or bottom first like shown in FIG. 27. In this configuration, the top portion, not the bottom portion, of the inner member butts up against the bumper 1122.

In some embodiments, in this reversed orientation, the camera opening 1108 of the inner member 1102 is not aligned with the camera opening 1108 of the outer member 1103. In some embodiments camera openings can be positioned to be aligned in either or both configurations.

In the illustrated embodiment, the portable device is playing music within the pocket. In this arrangement, the headphones are connected via an audio cable 1135 to an audio port at the bottom of the portable device 1101.

The gaps between the hinge stops 1117 on lateral sides of the outer member 1103 provide for a convenient place to position fingers to grip the case and pull it out of the pocket or push it into the pocket. The fingers may also grip the case at these gaps when holding it up against one's ear during a phone conversation, or when holding it in one hand while typing a text message with the other hand. This grip point may be particularly helpful in snowy or rainy conditions when the case may become more wet and slippery.

In alternative embodiments, a portion of the outer member 1103 may be widened to allow for a better grip on the case 1100.

Figure 28:
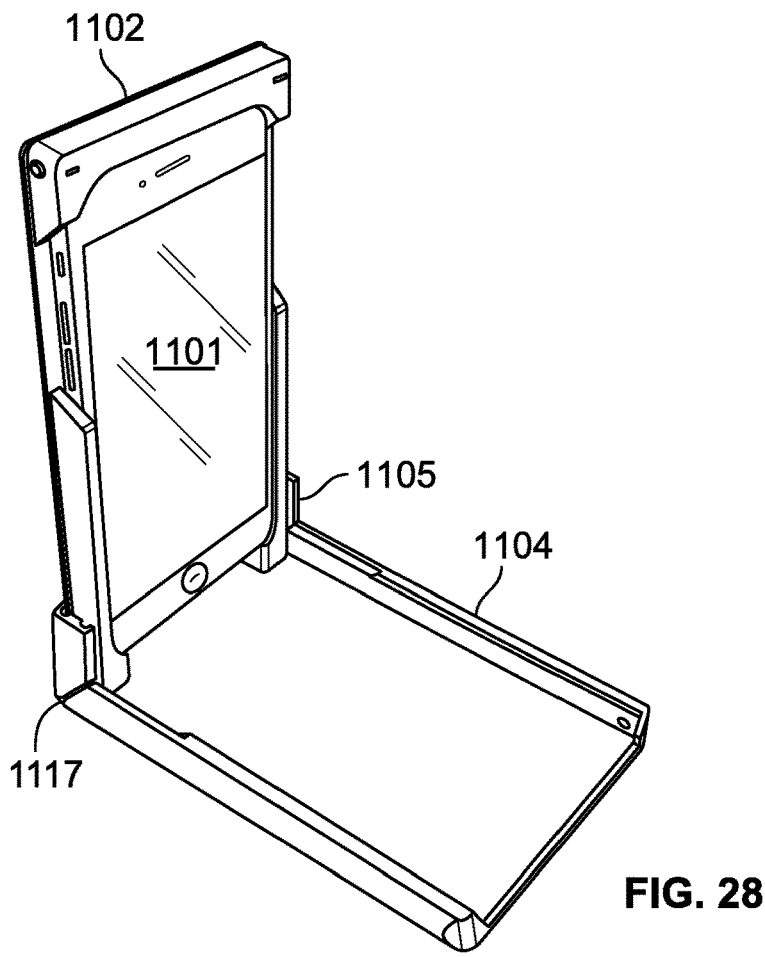
FIG. 28 illustrates one embodiment of the case configured as a portrait stand.

FIG. 28 shows an embodiment of the case configured as a stand.

The extension member 1105 is oriented at a substantially right angle to the base member 1104. The inner member 1102 is inserted into the track 1115 within the extension member 1105 until the bottom of the inner member 1102 rests on the base member 1104. Since the portable device is retained within the cavity at a raised position from the base member 1104 and there is a gap in the periphery of the inner member 1102 at the bottom of the portable device 1101, any speakers and microphones positioned on the bottom of the portable device 1101 are not obstructed.

The angular position is determined by the hinge stops 1117. These hinge stops 1117 butt up against each other when the extension member 1105 has a particular angular position relative to the base member 1104. The hinge magnets 1116 are oriented such that they are attracted to the corresponding hinge magnet 1116 in the opposing hinge stop 1117.

It is contemplated that the substantially right angle can be between 80 and 90 degrees. In a preferred embodiment, the extension member 1105 has an angular position of about 85 degrees relative to the base member 1104.

The slightly forward bias of the extension member 1105 and the phone contained within the inner member 1102 when in this configuration, allows gravity to work in support of the hinge magnets 1116 in remaining butted up against each other and maintaining the angular position.

As the angular position approaches 90 degrees, physical disturbances are more likely to cause the weight of the mobile phone cross over above 90 degrees thereby having gravity work against the magnets and cause the hinge to open up.

When positioned on a raised surface such as on top of a computer tower, on top of a desk, shelf or stack of books such that the portable device 1101 would be approximately at the elevation of their ones eyes, this orientation may be used for a hands-free video chat though the portable device 1101.

Figure 29:
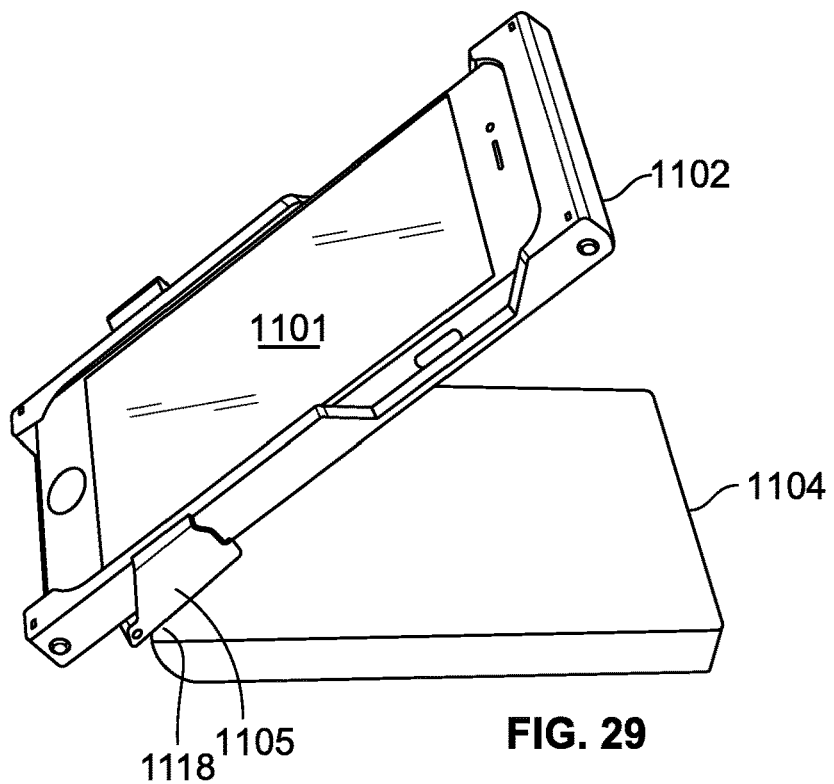
FIG. 29 illustrates one embodiment of the case configured as a portrait stand.

FIG. 29 shows an embodiment of the apparatus configured to act as a stand.

The base member 1104 is face down on the surface and the extension member is bent backwards at an angular position of more than 270 degrees relative to the inner cavity of the base member 1104. In a preferred embodiment, the angular position is about 300 degrees. In other embodiments, the angular position is between 280 and 320 degrees in this configuration.

This angular position is set by the second hinge stop. The second hinge stop butt up against the back of the extension member when the extension member 105 has a particular angular position relative to the base member 1104.

The inner member 1102 slides through the track of the extension member 105 until the base of the inner member rests on the support surface.

The weight of the extension member 1105 and the portable device 1101 contained within the inner member 1102 allows gravity to maintain the extension member 1105 and the hinge stop 1118 butted up against each other and maintaining the angular position defined by the hinge stop 1118.

Figure 30:
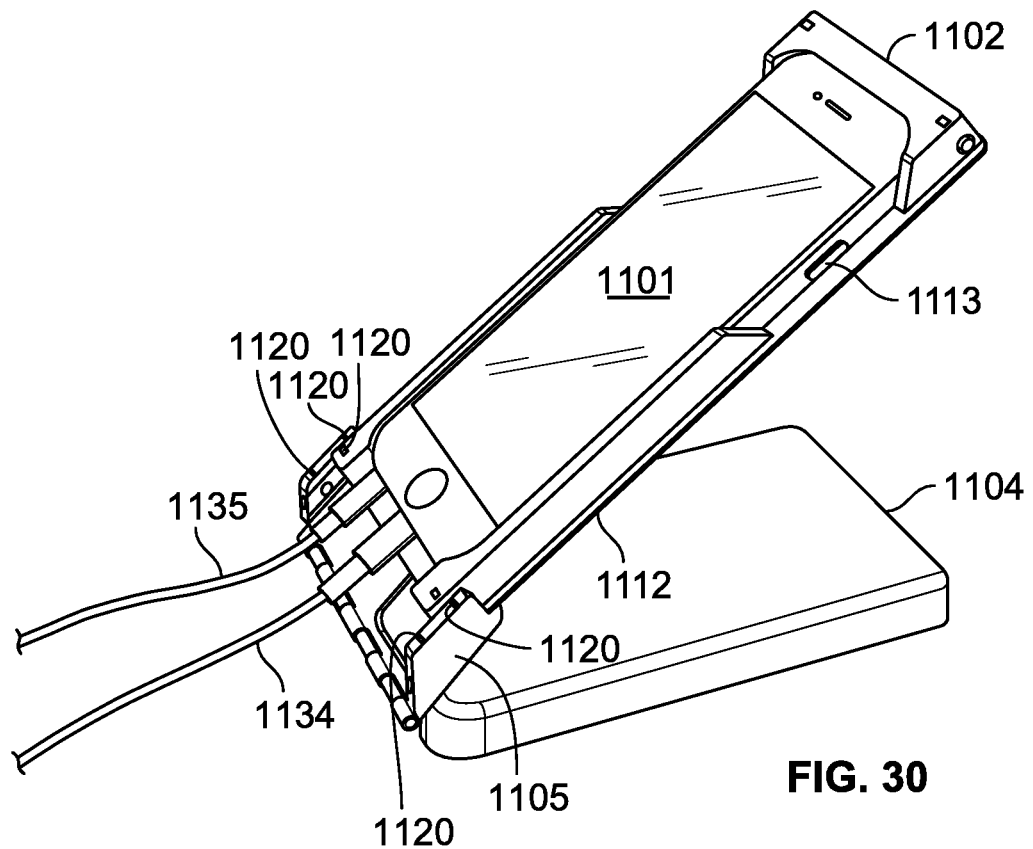
FIG. 30 illustrates one embodiment of the case configured as a portrait stand.

FIG. 30 shows an embodiment of the case configured as a stand.

The base member 1104 is face down on the surface and the extension member is bent backwards at an angular position of more than 270 degrees relative to the inner cavity of the base member 1104. In a preferred embodiment, the angular position is about 300 degrees. In other embodiments, the angular position is between 280 and 320 degrees in this configuration.

This angular position is set by the hinge stop 1118. The hinge stop 1118 butts up against the back of the extension member 1105 when the extension member 1105 has a particular angular position relative to the base member 1104.

The inner member 1102 slides through the track of the extension member 1105 but remains raised above the support surface.

The weight of the extension member 1105 and the portable device 1101 contained within the inner member 1102 allows gravity to maintain the extension member 1105 and the hinge stop 1118 butted up against each other and maintaining the angular position.

The weight of the extension member 1105 and the portable device 1101 contained within the inner member 1102 hangs over the edge of the extension member 1105. The edge of the extension member 1105 acts as a pivot point thereby causing the bottom of the inner member 1102 to be pressed up against the track 1115 within the extension member 1105. This force increases friction and tends to hold the portable device in the raised position.

In this position, the case magnets 1110 at the bottom of the inner member 1102 are aligned with the case magnets 1110 that are position second from the bottom edge of the outer member 1103. The attraction between these adjacent case magnets 1110 tends to hold the portable device in the raised position above the bottom edge of the outer member 1103. The user can easily see that the magnets are aligned by lining up the magnet indicator 1120 of the inner member 1102 with the magnet indicator 1120 of the outer member 1103.

The raised position allows the ports 1114 at the bottom of the portable device 1101 to be more accessible to power cables 1134 and audio cables 1135, for example. The portable device 1101 is positioned for use while continuing to be charged. Thus, the user does not have to choose between charging and using the phone. This may reduce the likelihood of a dead battery when leaving the office for some use cases.

The raised position allows the ports 1114 at the bottom of the portable device 1101 to be less accessible to contaminants from the surrounding environment that might get into the ports 1114. For example, when positioned on a kitchen countertop, there may be contaminants such as sugar, salt and flour that might get into ports 1114 for data and power, speakers or other openings near the bottom of the portable device 1101.

Figure 31:
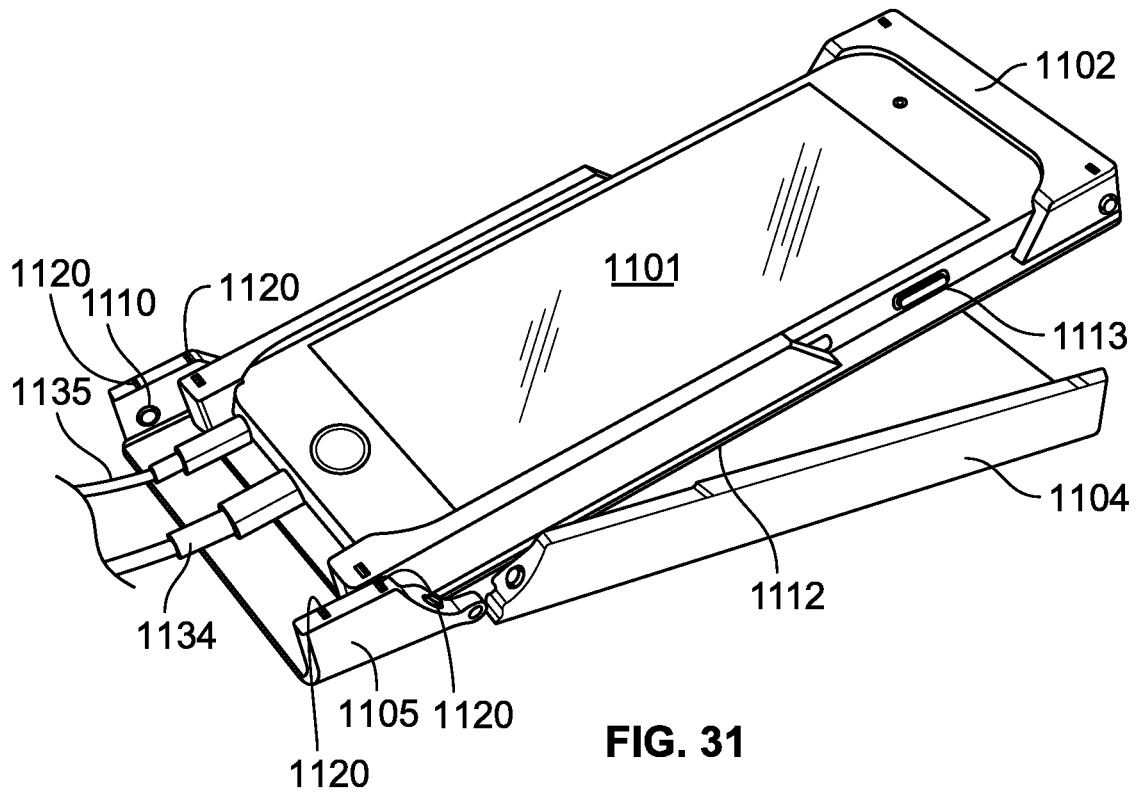
FIG. 31 illustrates one embodiment of the case configured as a portrait stand.

FIG. 31 shows an embodiment of the case configured as a stand.

The outer member 1103 is laid with the cavity face up. The inner member 1102 is inserted into the track 1115 from the hinge side of the extension member 1105.

In this position, the case magnets 1110 at the bottom of the inner member 1102 are aligned with the case magnets 1110 that are positioned second from the bottom edge of the outer member 1103. The attraction between these adjacent case magnets 1110 tends to hold the portable device in the position above the bottom edge of the outer member 1103.

The ledges 1139 (not shown) act as a hinge stop in this configuration.

The base member 1104 is face up on the surface and the ledges 1139 catch the rails 1112 of the inner member 1102. In a preferred embodiment, the angular position is about 330 degrees. In other embodiments, the angular position is between 325 and 335 degrees in this configuration.

Figure 32:
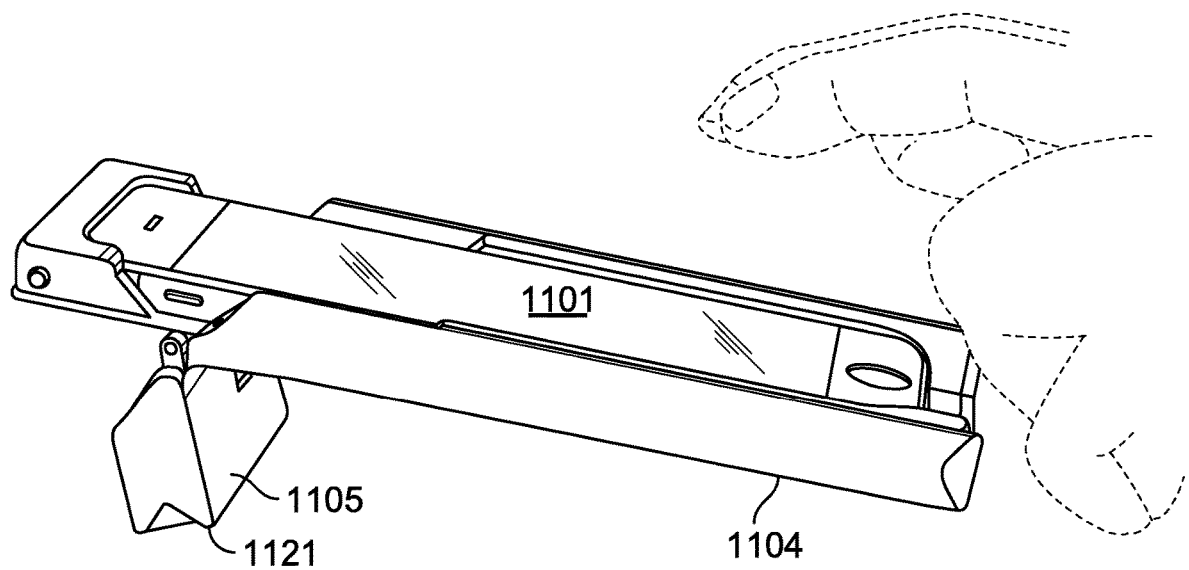
FIG. 32 illustrates one embodiment of the case configured as a portrait stand.

FIG. 32 shows an embodiment of the case configured to act as a stand.

The extension member 1105 is bent backwards and is used as a support to raise one end of the base member 1104 off of the support surface. The rail guide 1121 causes the extension member 1105 to lean in one direction.

With the extension member 1105 out of the way, the inner member 1102 can directly into the base member 1104 until the inner member 1102 reaches the bumper 1122. This position allows data or power cables to run underneath the device on a crowded desk, if working next to the phone.

Figure 33:
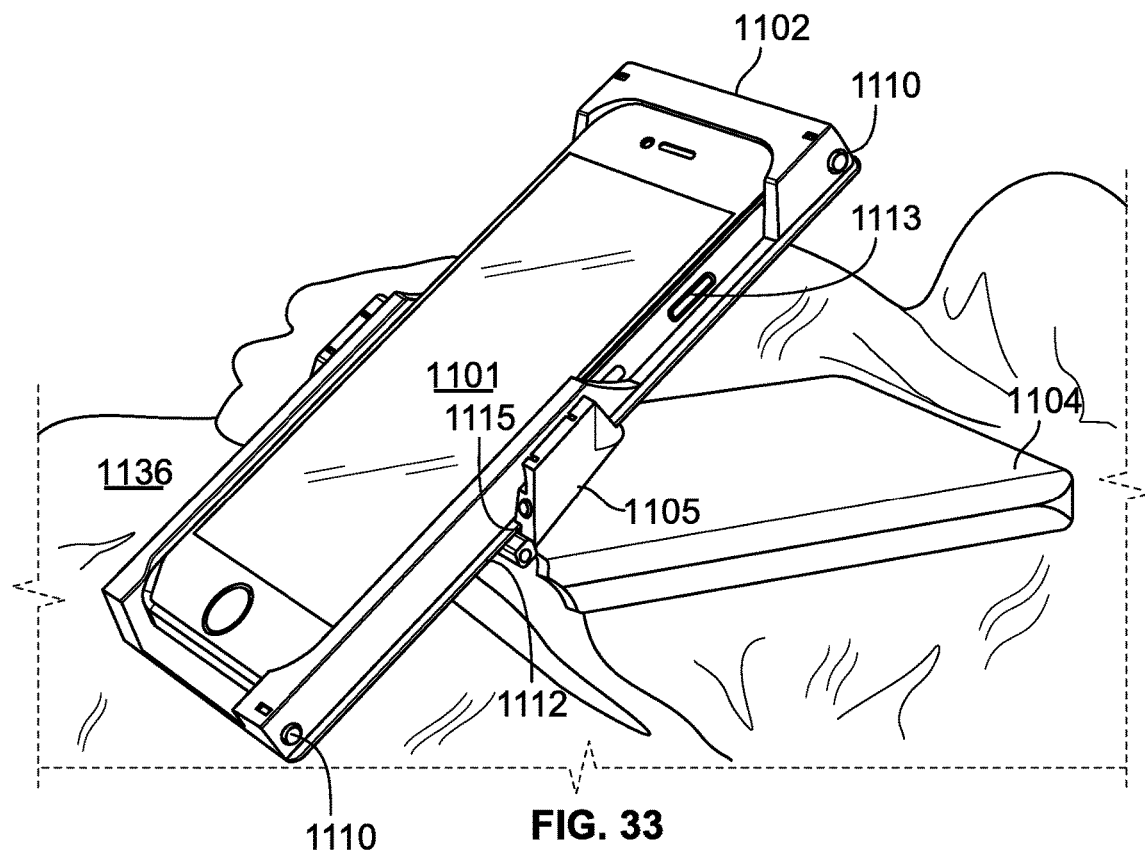
FIG. 33 illustrates one embodiment of the case configured as a portrait stand.

FIG. 33 shows an embodiment of the case configured as a stand.

The base member 1104 is face down on the surface and the extension member is bent backwards at an angular position of more than 270 degrees relative to the inner cavity of the base member 1104. In a preferred embodiment, the angular position is about 300 degrees. In other embodiments, the angular position is between 280 and 320 degrees in this configuration.

In the illustrated embodiment, the blanket 1136 has an uneven surface where the portion in contact with the inner member 1102 is lower than the portion underneath the base member 1104. One can see that it slides further through the extension member 1105 than it does as shown in FIG. 29.

The inner member 1102 slides through the track of the extension member 105 until the base of the inner member rests on the support surface. Compare this to FIG. 29 which shows a configuration that might be expected when the case is positioned on a flat surface such as a desk or table.

The weight of the extension member 1105 and the phone contained within the inner member 1102 allows gravity to maintain the extension member 1105 and the hinge stop 1118 in butted up against each other and maintaining the angular position. The "U" shaped structure of base member 1104, when in this position can also be stably placed on knees or thighs when seated in the backseat of a car, where the knee is slightly elevated from the thigh. The shelf 1139 on base member 1104 serves as stabilizers for the contours of the leg or knee. It may also be used on the contoured armrests of many couches and loveseats.

Figure 34:
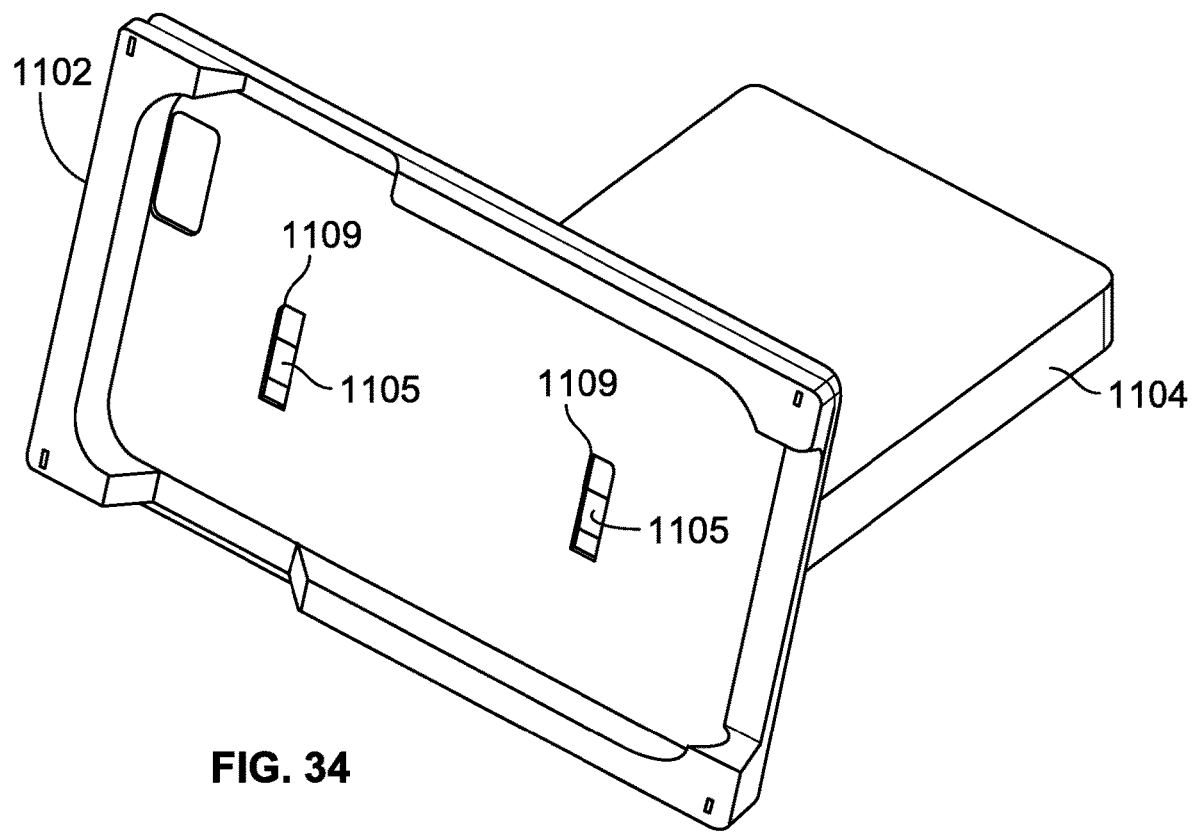
FIG. 34 illustrates one embodiment of the case configured as a landscape stand.

FIG. 34 shows an embodiment of the case configured as a landscape stand.

The base member 1104 is face down on a support surface (not shown) and the extension member 1105 is bent backwards.

Base connectors 1109 are openings in the inner member 1102 positioned to receive the protrusions from the hinge. When extension member 1105's outer tabs are inserted in the holes, the back of portable device 1101 stops the extension member 1105. The tips of the extension member 1105 then catch the base connectors 1109 when inserted into the base connectors 1109. Because extension member 1105 is flexed back, it a stabilizing "lean" angle is created for viewing and/or manipulating the screen. The angular position of the hinge can be adjusted to cause the angle of the inner member 1102 to be more vertical or slanted as desired within a predetermined range.

Figure 35:
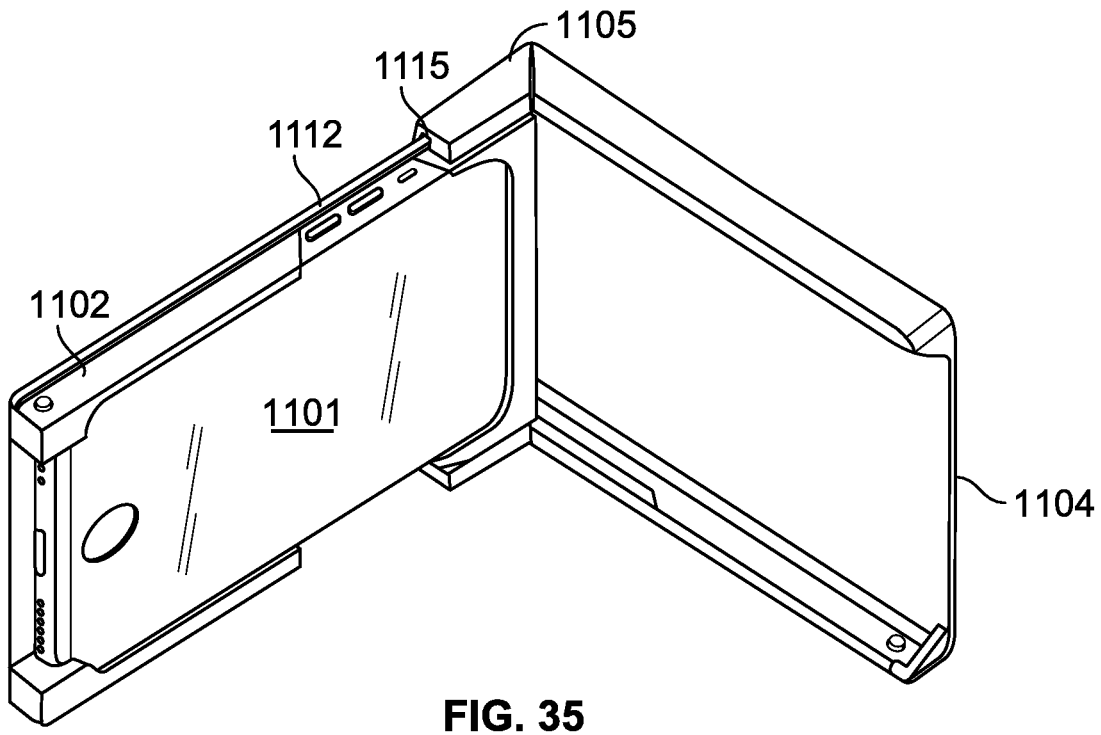
FIG. 35 illustrates one embodiment of the case configured as a landscape stand.

FIG. 35 shows an embodiment of the case configured as a landscape stand.

The base member 1104 is inserted into the outside edge of the extension member 1105, and the hinge is bent at a substantially right angle relative to the base member 1104.

Figure 36:
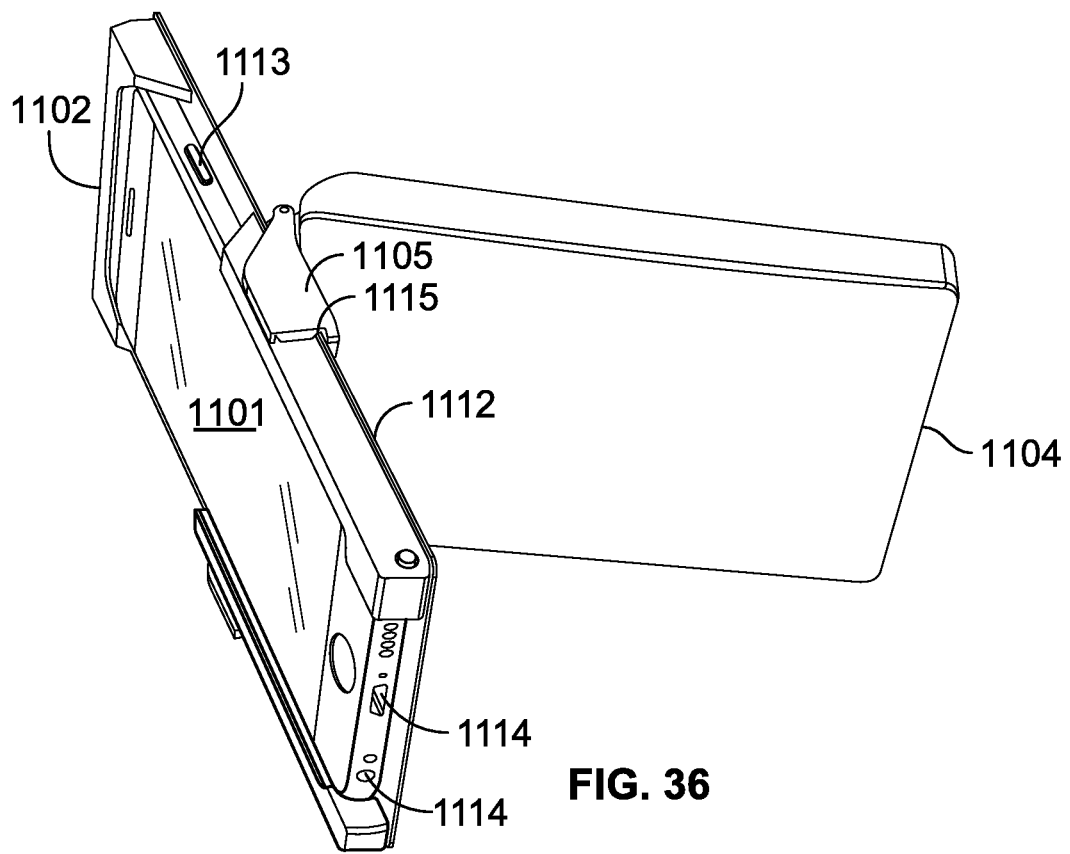
FIG. 36 illustrates one embodiment of the case configured as a landscape stand.

FIG. 36 shows an embodiment of the case configured as a landscape stand.

The extension member 1105 is bent backwards and the inner member 1102 is inserted into the hinge end of the extension member 1105.

The extension member 1105 is positioned near the middle of the inner member 1102, in the illustration shown in FIG. 36, but it can be positioned at other points as the extension member 1105 slides along the rails 1112.

The base member 1104 extends outward from the inner member to support the vertical landscape position of the inner member 1102. The base member 1104 extends back from the inner member 1102 in the illustration shown in FIG. 36, but angular position can be adjusted to that the base member 1104 extends back in other directions.

One can slide the base member 1104 to the end of the inner member 1102 and bend the hinge forward so that the base member 1104 up to the first hinge stop 1117 as shown in FIG. 35. One can bend the hinge backward so that the base member 1104 runs up against the hinge stop 1118.

When the base member is oriented to the right of the display.

Figure 37:
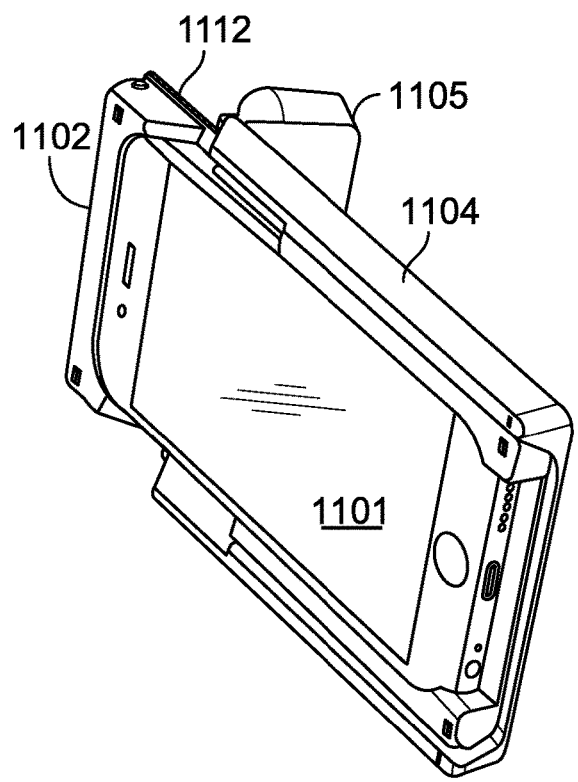
FIG. 37 illustrates one embodiment of the case configured as a landscape stand.

FIG. 37 shows an embodiment of the case configured as a landscape stand.

The extension member 1105 is bent backwards and the inner member 1102 is inserted directly into the base member 1104.

The extension member 1105 extends back from the inner member to support the vertical landscape position of the inner member 1102. The extension member 1105 extends back from the inner member 1102 in the illustration shown in FIG. 37, but angular position can be adjusted to that the base member 1104 extends back in other directions.

Figure 38:
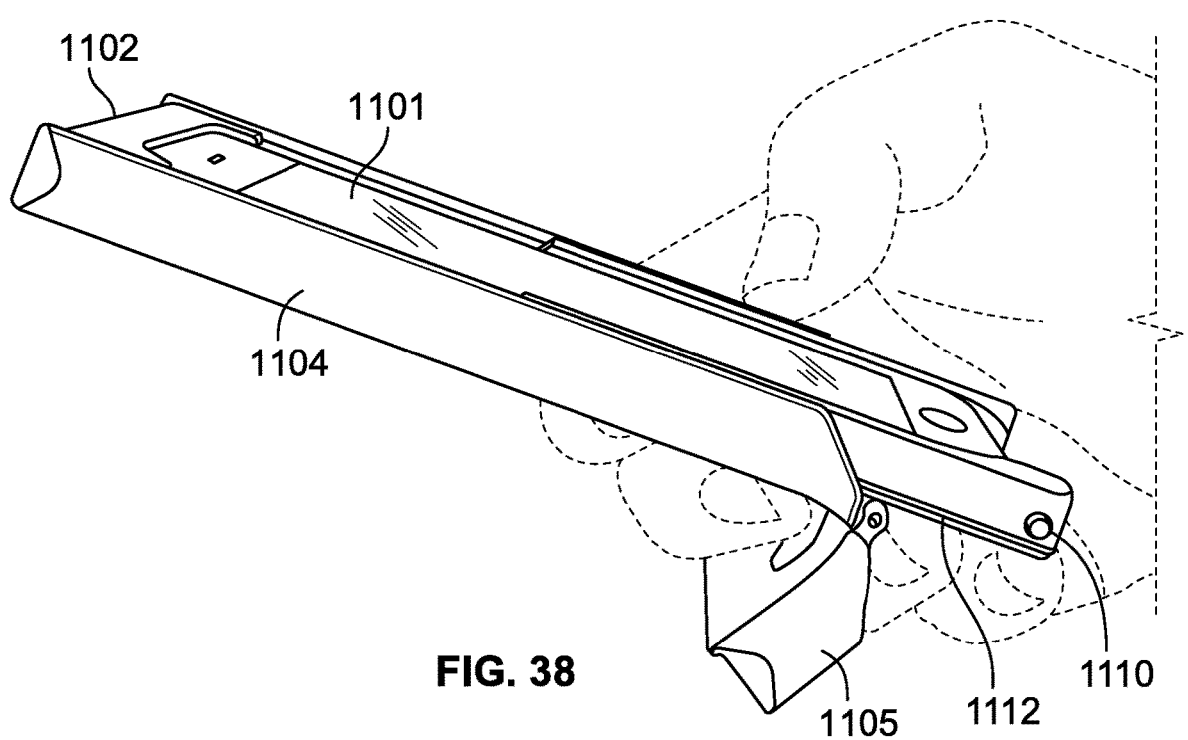
FIG. 38 illustrates one embodiment of the case configured with a grip.

FIG. 38 shows an embodiment of the case configured with a handle.

The extension member 1105 is bent backwards and the inner member 1102 is inserted directly into the base member 1104.

The extension member 1105 extends back from the inner member to act as a handle that can be positioned between fingers when the case is held in a hand. The extension may allow someone to more securely hold the portable device.

Figure 39:
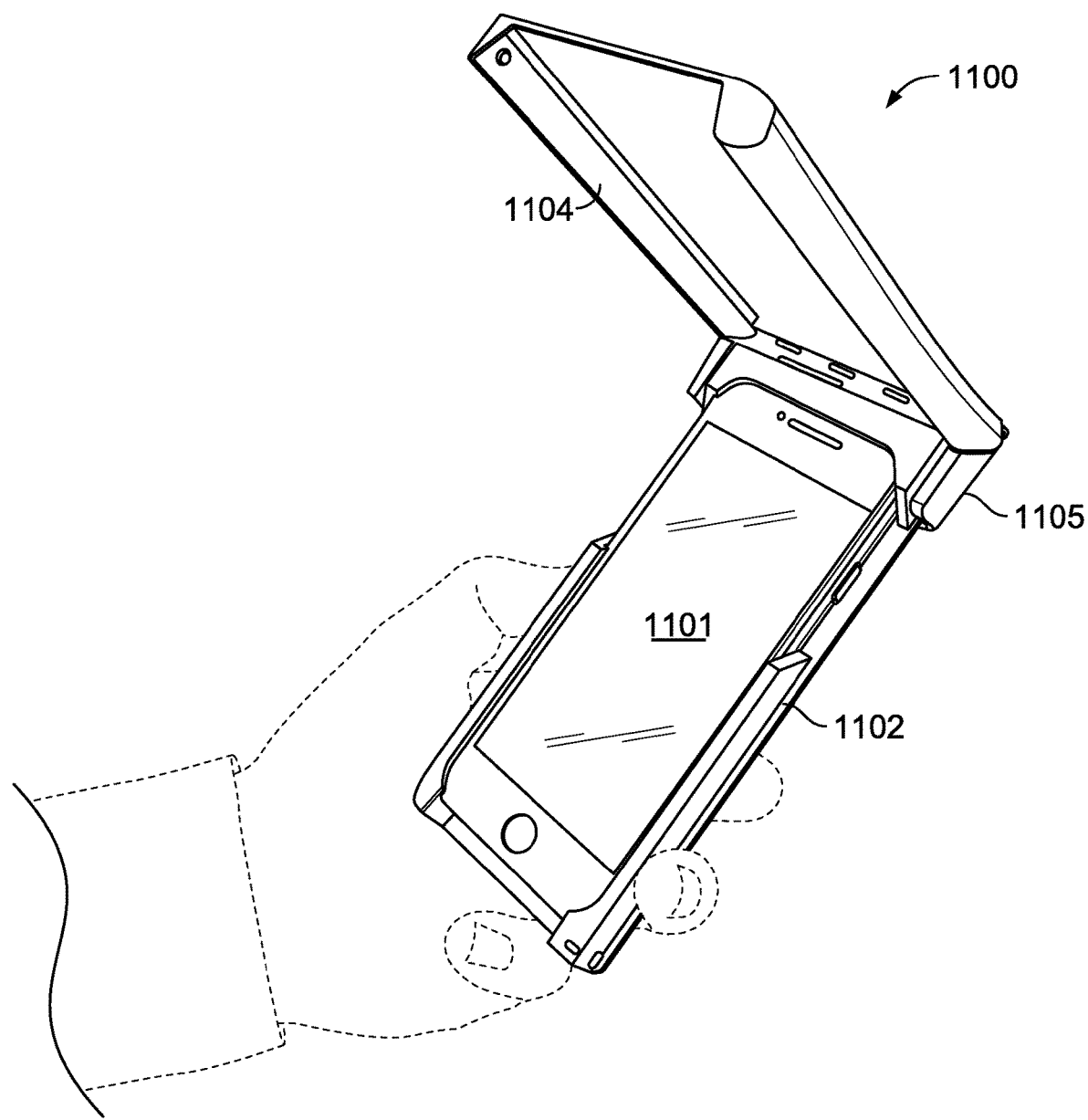
FIG. 39 illustrates one embodiment of the case configured as a screen shield.

FIG. 39 shows an embodiment of the case configured with a display shield.

The extension member 1105 is oriented at a substantially right angle to the base member 1104. The top of the inner member 1102 is inserted into the extension member 1105.

The base member 1104 overhangs the display of the portable device 1101.

The display shield may be used to block sunlight so that the display can be better viewed. It may allow for the screen intensity to be turned down thereby saving power and extending battery life.

Figure 40:
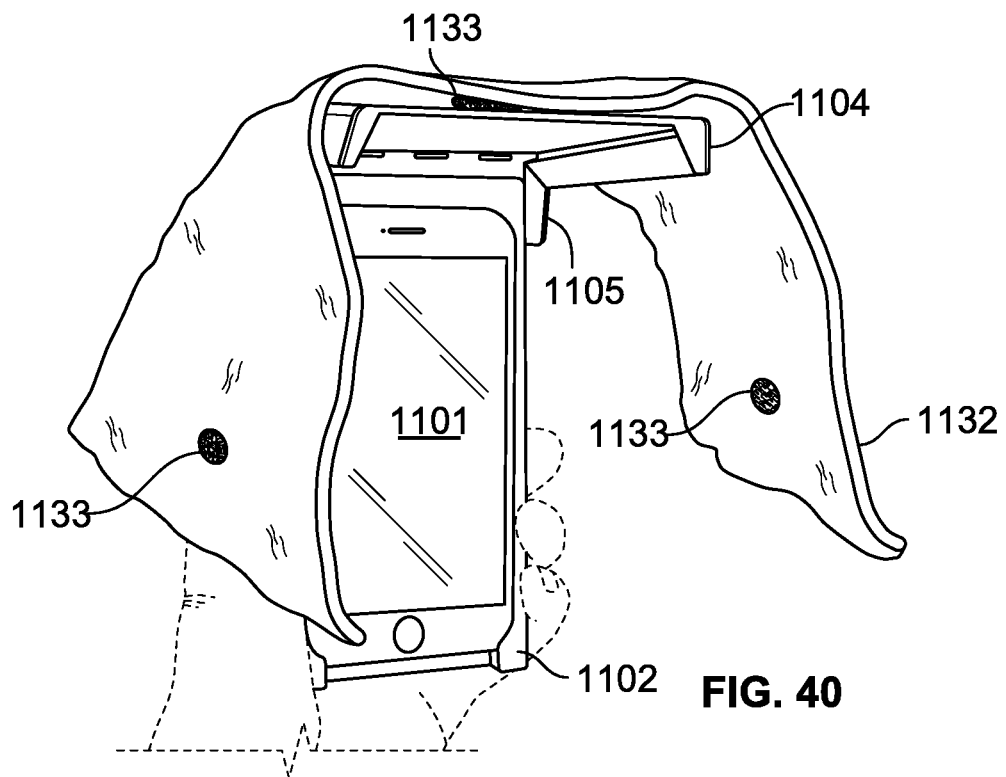
FIG. 40 illustrates one embodiment of the case configured as a screen shield with draped cloth.

FIG. 40 shows an embodiment of the case configured with a display shield.

The extension member 1105 is oriented at a substantially right angle to the base member 1104. The top of the inner member 1102 is inserted into the extension member 1105.

The base member 1104 overhangs the display of the portable device 1101.

A towel 1132 is used to drape over the display shield to provide shielding from, for example, ambient sunlight, or protection from unwanted viewing of the display by nearby persons.

In some embodiments the towel 1132 and the base member 1104 has hook and loop tape 1133 attached to securely attach the towel 1132 to the base member 1104 so that it will remain attach even as the phone is moved around.

The display shield may be used to block sunlight so that the display can be better viewed. It may allow for the screen intensity to be turned down thereby saving power and extending battery life.

Figure 41:
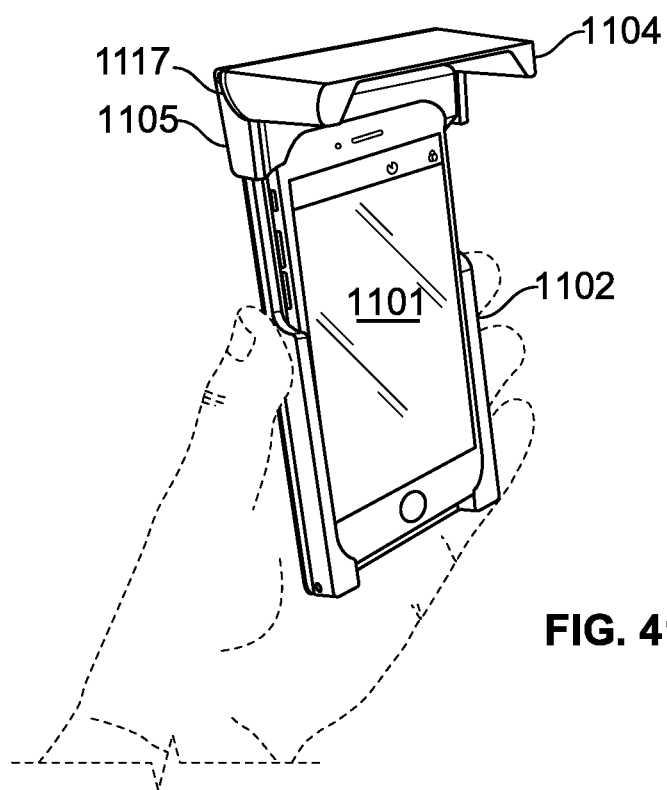
FIG. 41 illustrates one embodiment of the case having a short base member.

FIG. 41 shows an embodiment of the case configured with a display shield.

The extension member 1105 is oriented at a substantially right angle to the base member 1104. The top of the inner member 1102 is inserted into the extension member 1105.

The base member 1104 overhangs the display of the portable device 1101. In this illustrated example, the base member 1104 is short as compared to the base member in FIG. 39, for example.

In some embodiments, the base member 1104 comprises a detachably engageable portion such that the base member 1104 without the detachably engaged portion is about one-fifth the length of the base member 1104 with the detachably engagable portion attached.

In other embodiments, the user switches between an outer member 1103 with a base member 1104 that is short and outer member 1103 with a base member 1104 that is long. The short and long lengths can be a matter of design choice.

Figure 42:
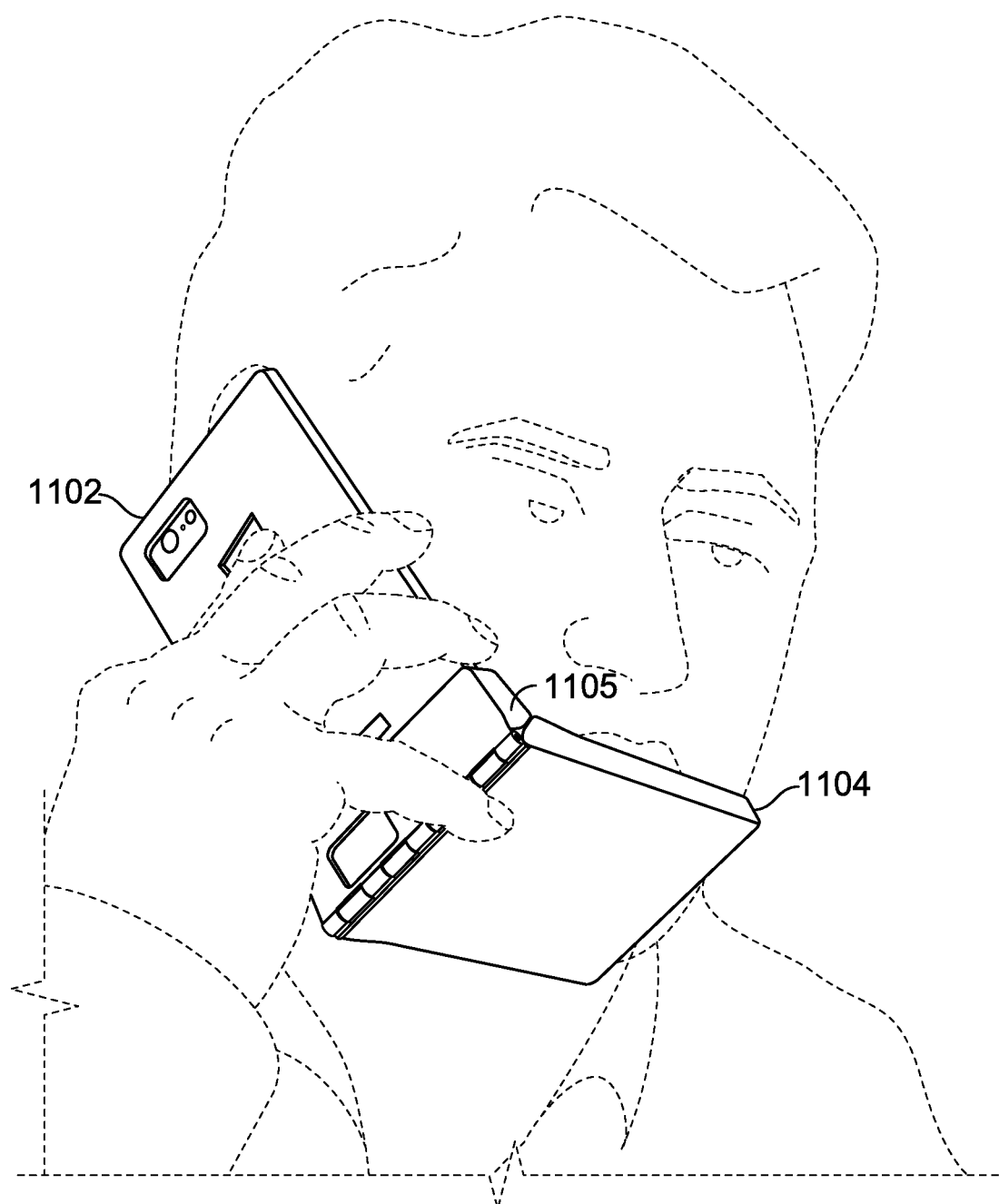
FIG. 42 illustrates one embodiment of the case configured as a voice privacy shield.

FIG. 42 shows an embodiment of the case configured with a voice shield.

The extension member 1105 is oriented at a substantially right angle to the base member 1104. The bottom of the inner member 1102 is inserted into the extension member 1105.

The base member 1104 covers a user's mouth as they talk into a microphone on the portable device 1101.

Figure 43:
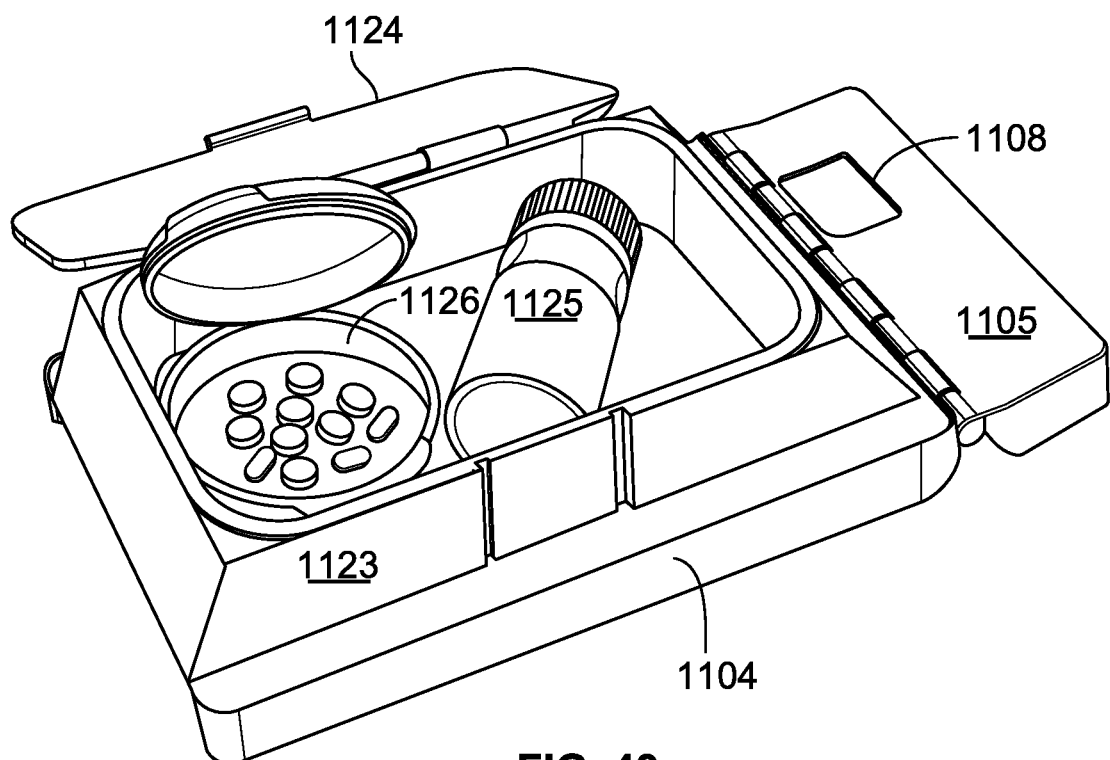
FIG. 43 illustrates one embodiment of an outer member with an integrated container, the inner cavity being face down in the illustration.

FIG. 43 shows an embodiment of the case configured with container.

The container 1123 is integrated on the back of the base member 1104.

In a preferred embodiment, the corners of the box are rounded and the sides of the exposed portions of the outer member 1103 and the inner member 1102 are flat or gradually slanted so as to avoid catching on clothing when case is inserted or removed from a pocket, for example.

The size and shape of the container is a matter of design choice. In some embodiments, the container has a lower profile which tends to make it less burdensome to carry and less difficult to insert into and remove from pockets. In other embodiments, the container has a higher profile to allow for more to be contained within.

One anticipated application for the box is to carry medication. Since a mobile phone tends to always be nearby the apparatus is a convenient location to store daily medication. Software applications on the portable device might generate alarms and other notifications to remind someone to take the medication at the appropriate times.

Patients non-adherence to a medication schedule is a serious issue. Many people keep their mobile phone on their person or nearby at all times. Applications on the phone can issue reminder notifications to take their medication. By storing the medication in a container on a mobile phone case, one is more likely to have the medication with them as necessary.

The size of anticipated items may drive the choice of box size. For example, standard pharmaceutical containers may be considered.

Figure 44:
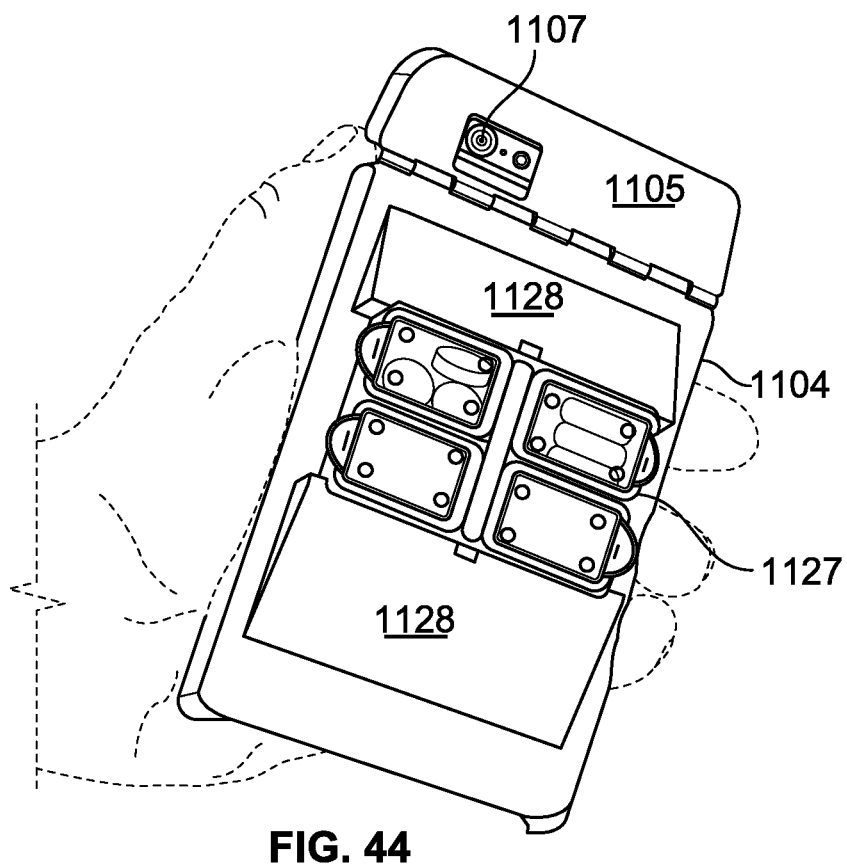
FIG. 44 illustrates one embodiment of an outer member with an integrated receptacle for a 4-dose container, the inner cavity being face down in the illustration.

FIG. 44 shows an embodiment of the outer member 1103 with a receptacle for a standard daily four-dose prescription medication pill box.

In a preferred embodiment, the corners of the receptacle are rounded and the sides of the exposed portions of the outer member 1103 and the inner member 1102 are flat or gradually slanted so as to avoid catching on clothing when case is inserted or removed from a pocket, for example.

Figure 45:
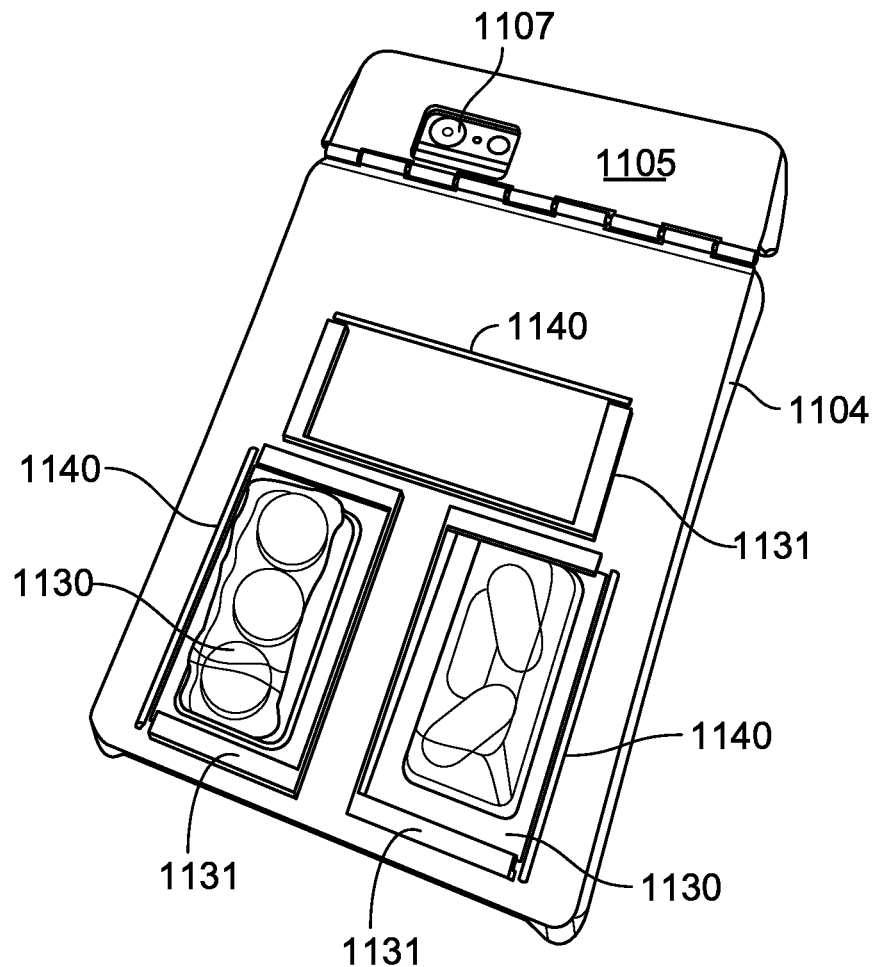
FIG. 45 illustrates one embodiment of an outer member with an integrated receptacles for blister packs, the inner cavity being face down in the illustration.
Figure 15:
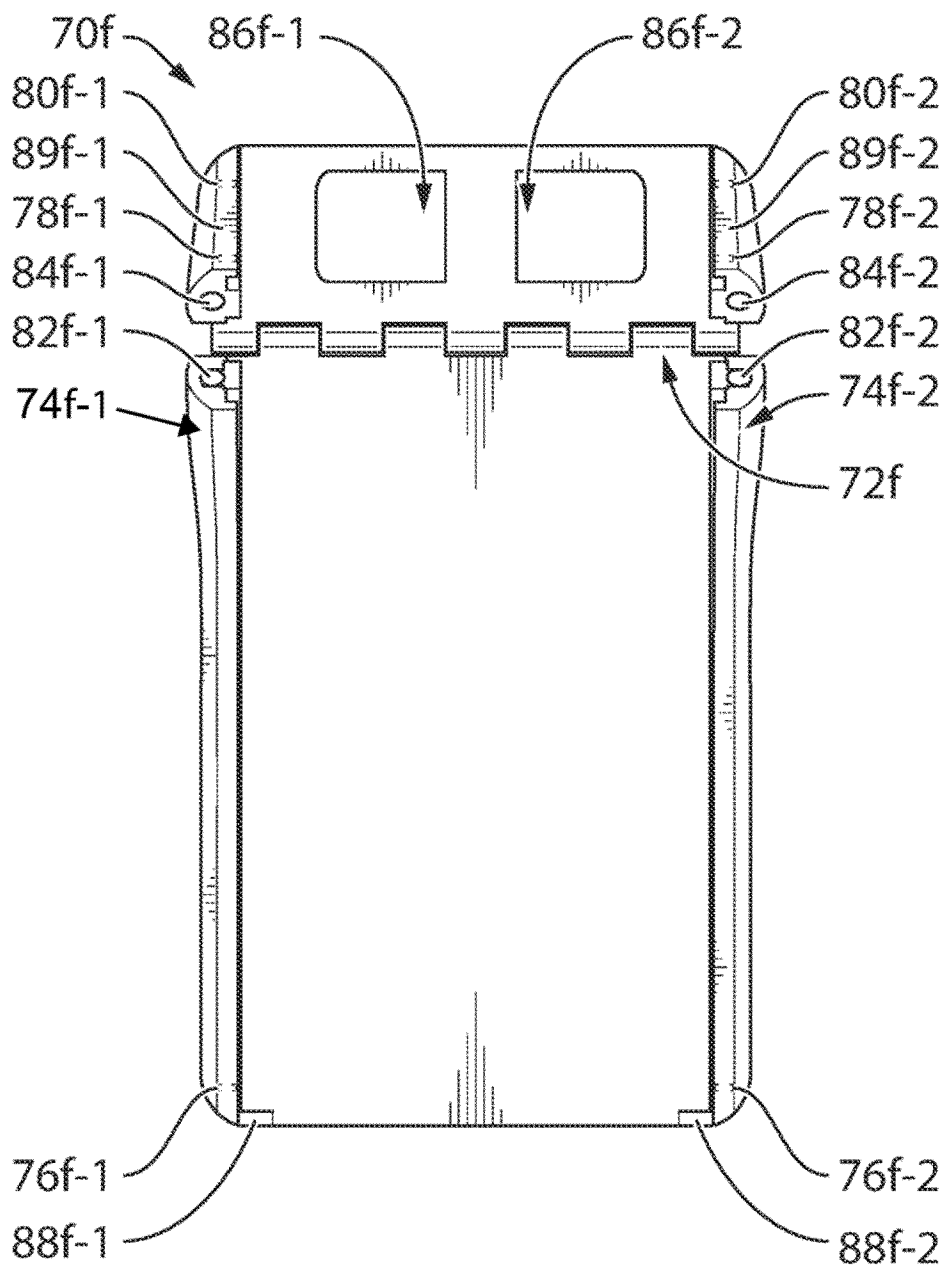
Figure 16:
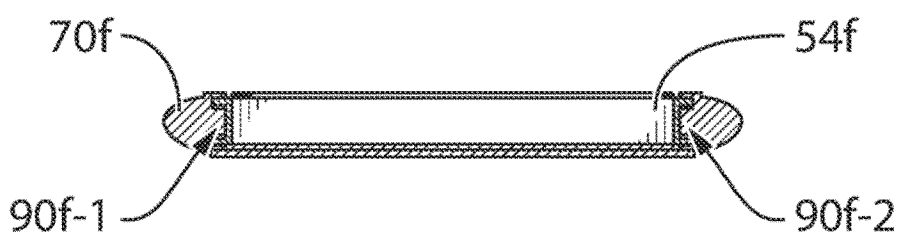
Figure 18A:
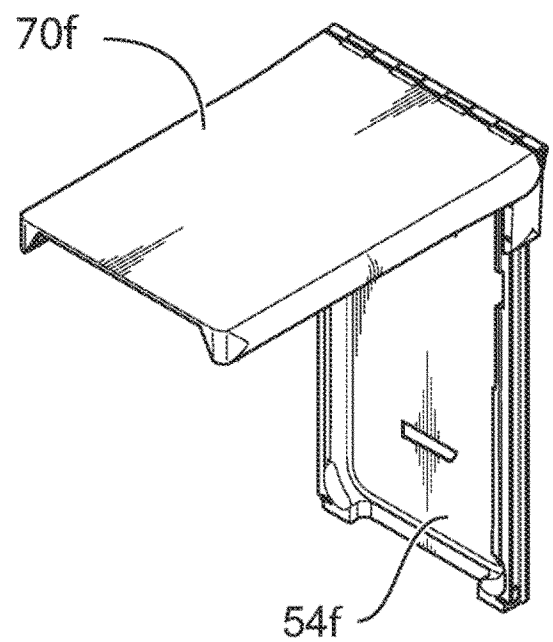
Figure 18B:
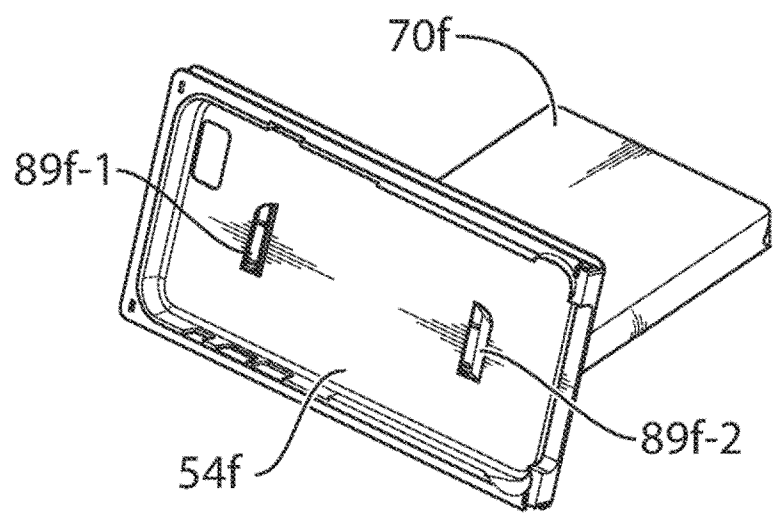
Figure 22:
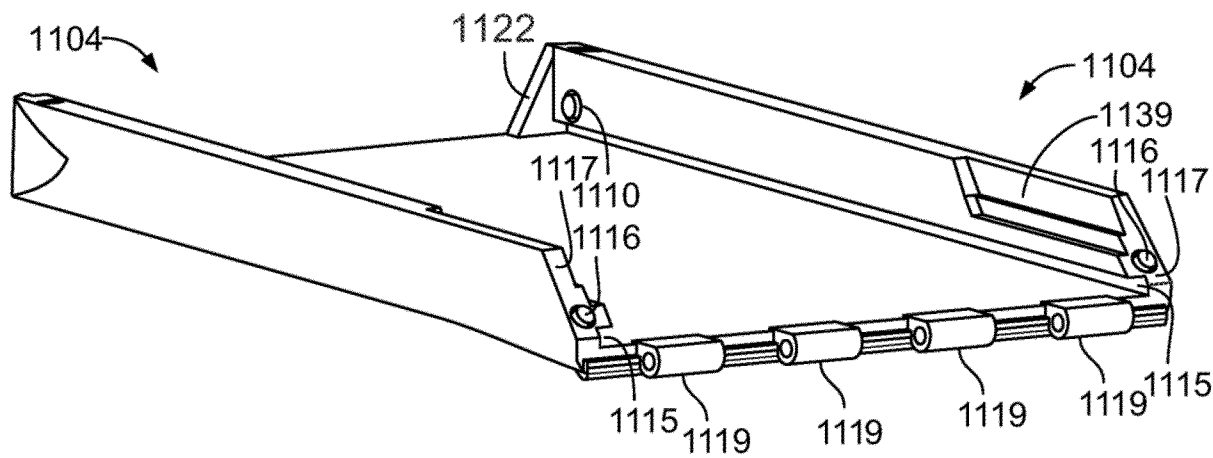
Figure 23:
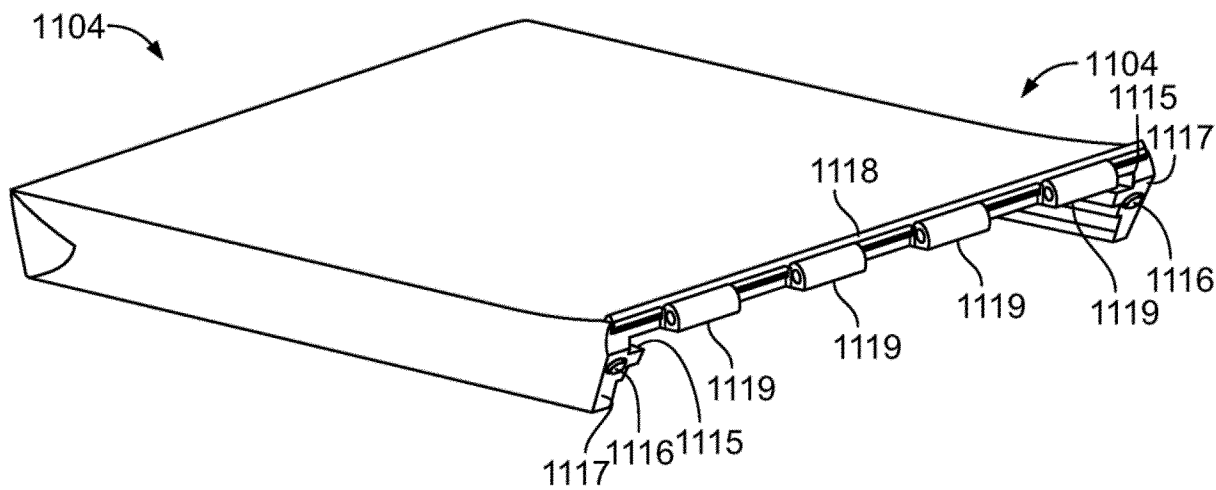
Figure 24:
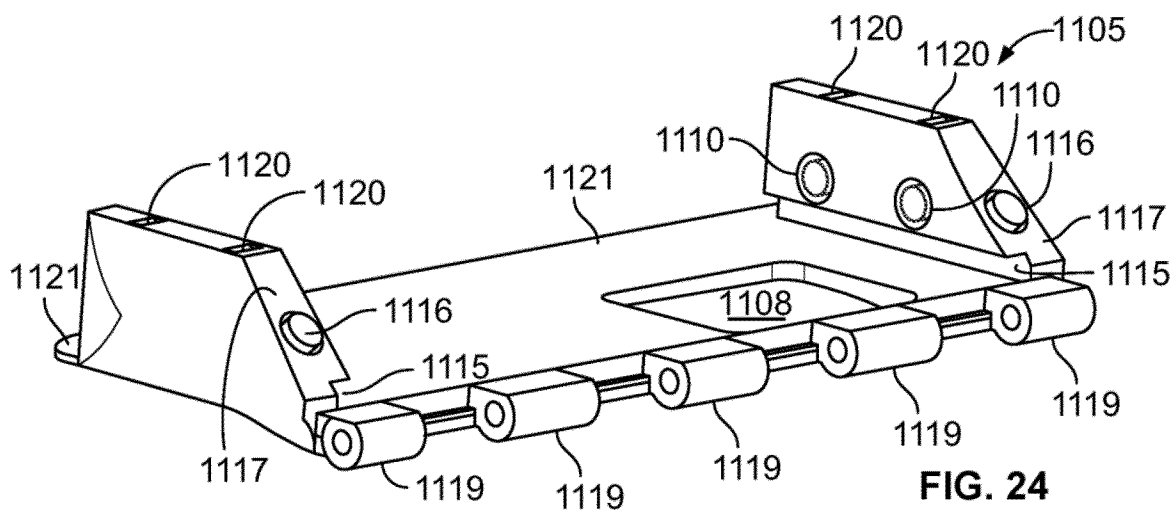
Figure 25:
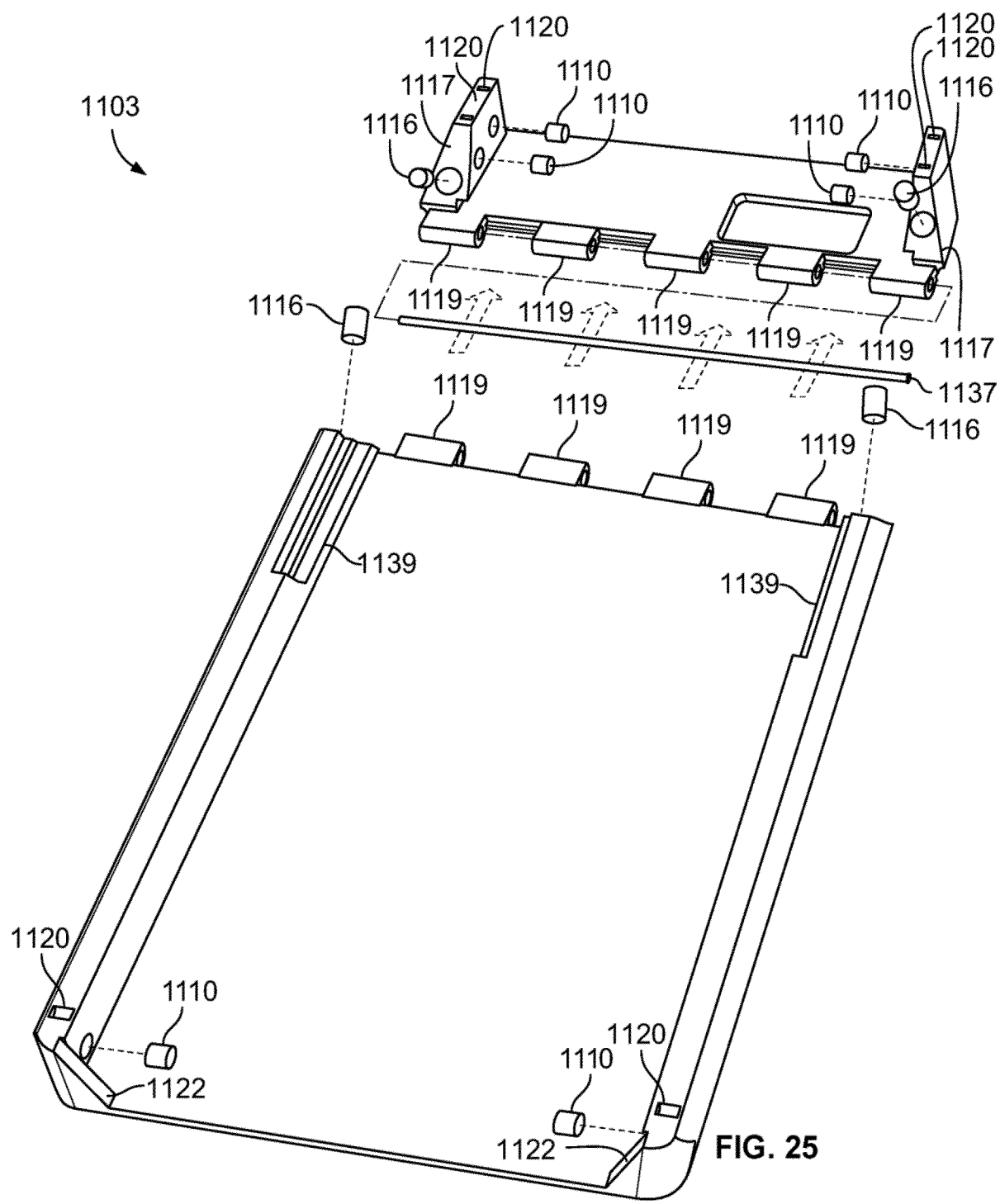

FIG. 45 illustrates one embodiment of an outer member 1103 having three blister pack receptacles on the backside of the case. Blister packs are one way to distribute pre-sorted daily medications. In one embodiment, the receptacles are labeled "breakfast," "lunch" and "dinner" to associate each blister pack with a medication schedule.

The blister packs have a cardboard base of a standard dimension. The lips of the receptacle receive the cardboard member and a retaining bump secures it from falling out.

The phone can be inserted into and removed from a pocket with the blister packs.

The cases described herein are purely exemplary and it will be apparent to those skilled in the art that variations are contemplated.

The magnets used herein may be made of any number of well-known magnetic materials.

The use of case magnets for positioning the inner member may be substituted with other mechanisms of locking the phone in position. For example, one might have a mechanism for removably inserting a locking pin between the inner member 1102 and the outer member 1103 to lock them in position.

When the locking pin is removed, the inner member 1102 would slide within the outer case as described herein.

The hinge can be substituted with other methods changing the angular relationship between the extension member 1105 and the base member 1104 between at least two positions. In some embodiments the hinge may be a flexible material such as plastic, rubber or silicon, connecting the extension member 105 and the base member 1104 to provide at least two positions by deforming. This angular motion may be alternative described as pivoting or pivotal motion The illustrated embodiments show a rail and track for supporting the sliding of the inner member 1102 within the outer member 1103. In other embodiments, more rails and tracks are used on either side of the inner member 1102. In other embodiments, ball bearings or other means may be used to improve slideability. In yet other embodiments, the path of the motion may deviate from a linear path.

While specific embodiments have been described and illustrated, such embodiments should be considered illustrative only and should not serve to limit the accompanying claims.

A number of variations may be made in the disclosed embodiments, all without departing from the scope of the invention, which is defined solely by the appended claims.

I claim:

1. A portable device accessory for blocking at least a portion of a screen of a portable device, the accessory comprising:
    an attachment mechanism for attaching the accessory to a rear face of the portable device, the rear face being opposite a front face of the portable device, the front face including the screen of the portable device;
    a hinge member pivotably attached to the attachment mechanism;
    a privacy shield pivotably attached to the hinge member and movable between a storage position and a blocking position, wherein:
        when the privacy shield is in the blocking position, the privacy shield extends over the front face of the portable device and blocks at least a portion of the screen; and
        when the privacy shield is in the storage position, the privacy shield extends over the rear face of the portable device and is positioned proximate to the attachment mechanism; and
    at least one flap, each flap being pivotably attached to the privacy shield and movable between a storage position and a blocking position, wherein:
        when any one of the flaps is in the blocking position, that flap extends away from the privacy shield and blocks at least a portion of the screen; and
        when any one of the flaps is in the storage position, that flap is positioned against the privacy shield.

2. The accessory of claim 1, wherein when the privacy shield is in the storage position, the privacy shield extends over the rear face of the portable device and is positioned against the attachment mechanism.

3. The accessory of claim 1, wherein:
    the privacy shield includes at least one recess located on the privacy shield; and
    when any one of the flaps is in the storage position, that flap is positioned within the at least one recess of the privacy shield.

4. The accessory of claim 1, wherein the at least one flap includes two flaps.

5. The accessory of claim 1, wherein:
    the privacy shield has a first thickness;
    the at least one flap has a second thickness; and
    the first thickness is greater than the second thickness.

6. The accessory of claim 1, wherein:
    the privacy shield is further movable to a stand position; and
    when the privacy shield is in the stand position, the privacy shield extends over the rear face of the portable device and is positioned away from attachment mechanism.

7. The accessory of claim 1, wherein:
    the privacy shield is further movable to a screen protector position; and
    when the privacy shield is in the screen protector position, the privacy shield is positioned against the front face of the portable device.

8. The accessory of claim 1, wherein:
    the privacy shield has a first length;
    the portable device has a second length; and
    the first length is less than the second length.

9. The accessory of claim 1, wherein the attachment mechanism is removably attachable to the rear face of the portable device.

10. The accessory of claim 9, wherein the attachment mechanism includes a case for attaching the accessory to the rear face of the portable device and encasing at least a portion of the portable device.

11. The accessory of claim 9, wherein the attachment mechanism includes at least one of a clip, a hook and pile fastening system and a magnetic attachment system.

12. The accessory of claim 1, wherein the attachment mechanism includes a moveable element for moving the hinge member and the privacy shield relative to the attachment mechanism.

13. The accessory of claim 12, wherein the attachment mechanism includes a mounting plate and the moveable element allows the hinge member and the privacy shield to move relative to the mounting plate.

14. The accessory of claim 1, further comprising:
    a cloth removably attached to the privacy shield, wherein when the privacy shield is in the blocking position, the cloth extends away from the privacy shield and blocks at least at least a portion of the screen.

15. The accessory of claim 1, wherein:
    the attachment mechanism has a first length;
    the portable device has a second length; and
    the first length is less than the second length.

16. The accessory of claim 1, wherein the portable device includes a camera positioned on the rear face of the portable device, and wherein the attachment mechanism includes a camera opening for permitting light to enter the camera through the camera opening.

17. The accessory of claim 1, wherein the portable device includes a camera positioned on the rear face of the portable device, and wherein the privacy shield includes a camera opening for permitting light to enter the camera through the camera opening when the privacy shield is in the storage position.

18. The accessory of claim 1, wherein the hinge member includes at least one stop for restricting a movement of the privacy shield relative to the attachment mechanism.

19. The accessory of claim 1, further comprising at least one magnet for holding the privacy shield in the blocking position.

20. The accessory of claim 1, further comprising at least one of a spring, a clip, and an adhesive for holding the privacy shield in the blocking position.

21. The accessory of claim 1, wherein the portable device includes a portable device case and wherein the attachment mechanism is attachable to the rear face of the portable device case.

22. The accessory of claim 1, wherein the privacy shield comprises one or more card retaining clips.

23. The accessory of claim 1, wherein the privacy shield comprises one or more storage compartments.

\* \* \* \* \*

UNITED STATES PATENT AND TRADEMARK OFFICE
CERTIFICATE OF CORRECTION

| | |
|---|---|
| PATENT NO. | : 10,728,754 B2 |
| APPLICATION NO. | : 16/393262 |
| DATED | : July 28, 2020 |
| INVENTOR(S) | : John David Lee |

It is certified that error appears in the above-identified patent and that said Letters Patent is hereby corrected as shown below:

On the Title Page

Item (54) and in the Specification, Column 1, Line 1 – The title "PORTABLE DEVICE ACESSORY" should read -- PORTABLE DEVICE ACCESSORY --

In the Drawings

Please replace Fig. 15, Fig. 18a, Fig. 22 and Fig. 25 with Fig. 15, Fig. 18a, Fig. 22 and Fig. 25 as shown on the attached pages In the Specification In Column 9, Line 15 – "poly carbonate" should read -- polycarbonate --

Figure 2:
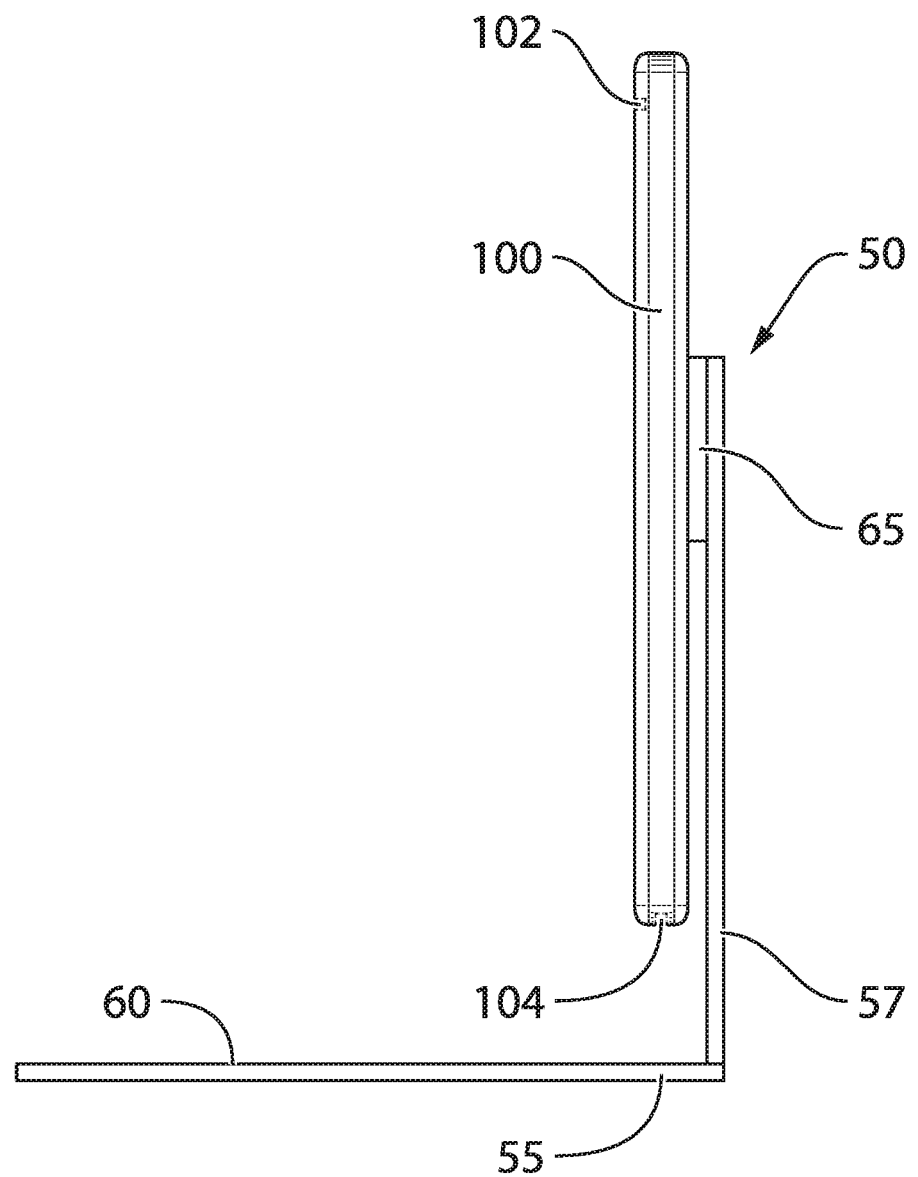
FIG. 2 is a representation of the apparatus shown in FIG. 1 in a blocking position.

In Column 10, Line 36 – "FIG. 2" should read -- FIG. 9 --

In Column 13, Line 12 – "more of less" should read -- more or less --

In Column 13, Line 65 – reference numeral "74f" should read -- 74f-1 and 74f-2 --

In Column 14, Line 1 – reference numeral "74f" should read -- 74f-1 and 74f-2 --

In Column 14, Line 3 – reference numeral "74f" should read -- 74f-1 and 74f-2 --

In Column 14, Line 6 – reference numeral "74f" should read -- 74f-1 and 74f-2 --

In Column 14, Line 7 – "more of less" should read -- more or less --

In Column 14, Line 7 – reference numeral "74f" should be deleted

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,728,754 B2

In Column 14, Line 49 – "is generally" should read -- are generally --

In Column 15, Line 24 – "as stand" should read -- as a stand --

In Column 15, Line 49 – "can rotated" should read -- can be rotated --

In Column 15, Line 50 – "an engaged" should read -- and engaged --

In Column 15, Line 52 – "for as" should read -- for use as --

In Column 15, Line 58 – "such the" should read -- such that the --

In Column 16, Line 7 – "positioned in at" should read -- positioned at --

In Column 16, Line 50 – "above describe apparatus" should read -- above-described apparatus --

In Column 18, Line 4 – "when it is inserted" should read -- when they are inserted --

In Column 18, Line 29 – "In other embodiment" should read -- In other embodiments --

In Column 19, Line 36 – "A hinge stops 1118 limit" should read -- A hinge stop 1118 limits --

In Column 19, Line 41 – "the hinge stops" should read -- the hinge stop --

In Column 24, Line 66 – "but angular position can be adjusted to that" should read -- but the angular position can be adjusted so that --

In Column 25, Line 36 – "remain attach" should read -- remain attached --

In Column 26, Line 20 – "Patients" should read -- Patients' --

In Column 26, Line 27 – "The size of anticipated items may drive the choice of box" should read -- The size of anticipated items (e.g. items 1125 and 1126) may drive the choice of box --

In Column 26, Line 32 – "medication pill box" should read -- medication pill box 1127 --

In Column 26, Line 36 – "gradually slanted" should read -- gradually slanted 1128 --

In Column 26, Line 37 – "case is inserted" should read -- the case is inserted --

In Column 26, Line 39 – "three blister pack receptacles" should read -- three blister pack receptacles 1131 --

In Column 26, Line 40 – "Blister packs" should read -- Blister packs 1130 --

In Column 26, Line 46 – "retaining bump" should read -- retaining bump 1140 --

CERTIFICATE OF CORRECTION (continued)
U.S. Pat. No. 10,728,754 B2

In Column 26, Line 66 – "silicon" should read -- silicone --

In Column 27, Line 2 – "pivotal motion" should read -- pivotal motion. --

In the Claims

In Claim 14, Column 28, Line 37 – "at least at least" should read -- at least --